(12) United States Patent  
Organ et al.

(10) Patent No.: US 11,680,955 B2  
(45) Date of Patent: Jun. 20, 2023

(54) FLUID DIVERTING MODULE

(71) Applicants: Michael Organ, Ottawa (CA); Debasis Mallik, Newmarket (CA); Wenyao Zhang, East Gwillimbury (CA)

(72) Inventors: Michael Organ, Ottawa (CA); Debasis Mallik, Newmarket (CA); Wenyao Zhang, East Gwillimbury (CA)

(73) Assignee: Total Synthesis Ltd., Ottawa (CA)

( * ) Notice: Subject to any disclaimer, the term of this patent is extended or adjusted under 35 U.S.C. 154(b) by 296 days.

(21) Appl. No.: 16/375,213

(22) Filed: Apr. 4, 2019

(65) Prior Publication Data

US 2019/0310278 A1  Oct. 10, 2019

Related U.S. Application Data

(60) Provisional application No. 62/652,360, filed on Apr. 4, 2018.

(51) Int. Cl.
*G01N 35/10* (2006.01)
*G01N 1/40* (2006.01)
*G01N 35/00* (2006.01)

(52) U.S. Cl.
CPC ....... *G01N 35/1097* (2013.01); *G01N 1/4077* (2013.01); *G01N 35/1004* (2013.01);
(Continued)

(58) Field of Classification Search
CPC ........... G01N 35/1097; G01N 35/1004; G01N 1/4077; G01N 2001/4088;
(Continued)

(56) References Cited

U.S. PATENT DOCUMENTS 3,252,768 A * 5/1966 Tibor ................. G01N 35/1097  
422/540  
5,908,599 A * 6/1999 Behringer .............. G01N 15/14  
422/50

(Continued)

FOREIGN PATENT DOCUMENTS

DE   102015117428 A1 *  4/2017 ............. G01N 30/82  
JP       2002206994 A *  7/2002 ......... F16K 99/0028  
WO  WO-2014199198 A1 * 12/2014 ............. G01N 30/20

OTHER PUBLICATIONS

JP 2002206994 A-English (Year: 2004).*

*Primary Examiner* — Daniel S Larkin  
*Assistant Examiner* — Fatemeh Esfandiari Nia  
(74) *Attorney, Agent, or Firm* — Total Synthesis Ltd.

(57) ABSTRACT

A fluid diverting module includes a multi-position fluid diverting device comprising three-dimensional movable flow-paths with minimal tortuosity in the movable portion (the rotor) of the fluid diverting device. In some embodiments, the device is also equipped with a filtration module that is capable of filtering solid particulates from fluidic samples. The invention relates to an area of non-disruptive sampling from various sample sources including ones containing solids. The fluid diverting device maintains fluid communication between the sample source and a pressure creating device in all positions of the fluid diverting device, thus conserving the pressure inside the sample source during sampling. The sampling operation is controlled from a controller, which is equipped with a software for manual or intelligent control.

17 Claims, 40 Drawing Sheets

(52) U.S. Cl.
CPC ............... *G01N 2001/4088* (2013.01); *G01N 2035/00346* (2013.01)

(58) Field of Classification Search
CPC ......... G01N 2035/00346; G01N 35/10; G01N 35/1095; G01N 30/20; G01N 30/24; G01N 30/16; G01N 2030/201; G01N 2030/202; G01N 1/34; G01N 2035/00188; G01N 2035/00178
See application file for complete search history.

(56) References Cited

U.S. PATENT DOCUMENTS

| | | | |
|---|---|---|---|
| 9,541,207 B1* | 1/2017 | Saetveit | F16K 11/0853 |
| 2005/0129584 A1* | 6/2005 | Johnson | G01N 1/14 |
| | | | 422/521 |
| 2010/0032604 A1* | 2/2010 | Wilen | G01N 30/20 |
| | | | 251/304 |
| 2013/0067997 A1* | 3/2013 | Ebsen | G01N 30/20 |
| | | | 73/61.55 |
| 2014/0087036 A1* | 3/2014 | Organ | G01N 35/1097 |
| | | | 426/241 |
| 2015/0198570 A1* | 7/2015 | Ozbal | G01N 33/6848 |
| | | | 250/282 |
| 2016/0139093 A1* | 5/2016 | Witt | G01N 30/20 |
| | | | 73/61.56 |
| 2016/0310870 A1* | 10/2016 | Olovsson | B01D 15/1842 |
| 2016/0334031 A1* | 11/2016 | Shoykhet | F16K 99/0028 |
| 2017/0146495 A1* | 5/2017 | Olovsson | B01D 15/1842 |
| 2018/0052141 A1* | 2/2018 | Stoll | G01N 30/34 |
| 2018/0106769 A1* | 4/2018 | Olovsson | F16K 11/0743 |
| 2019/0390788 A1* | 12/2019 | Ziegler | F16K 25/005 |
| 2020/0340957 A1* | 10/2020 | Nogami | G01N 30/7233 |

\* cited by examiner

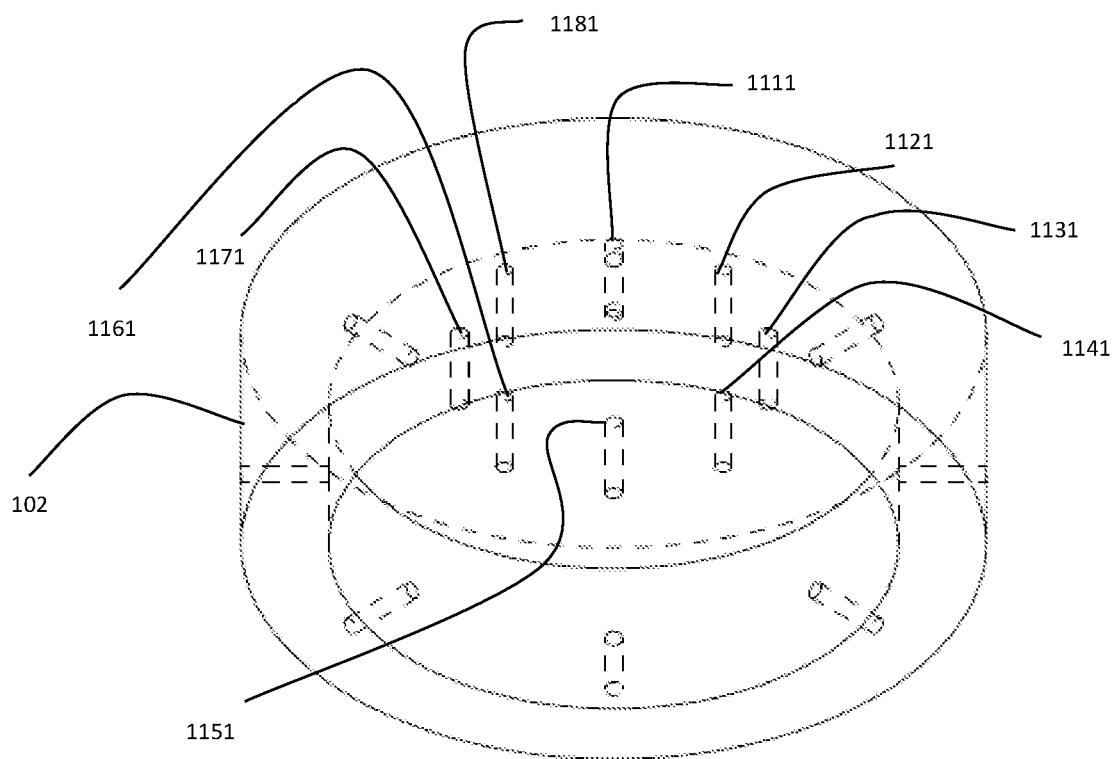
Figure 9b1
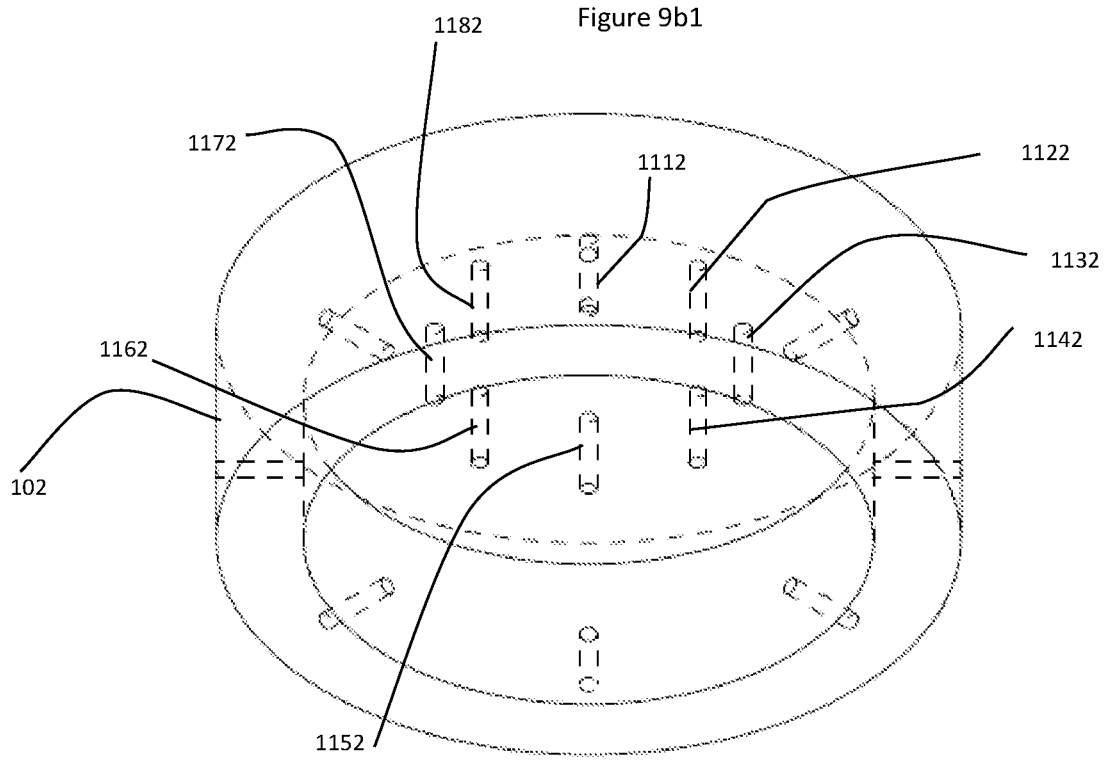
Figure 9b2

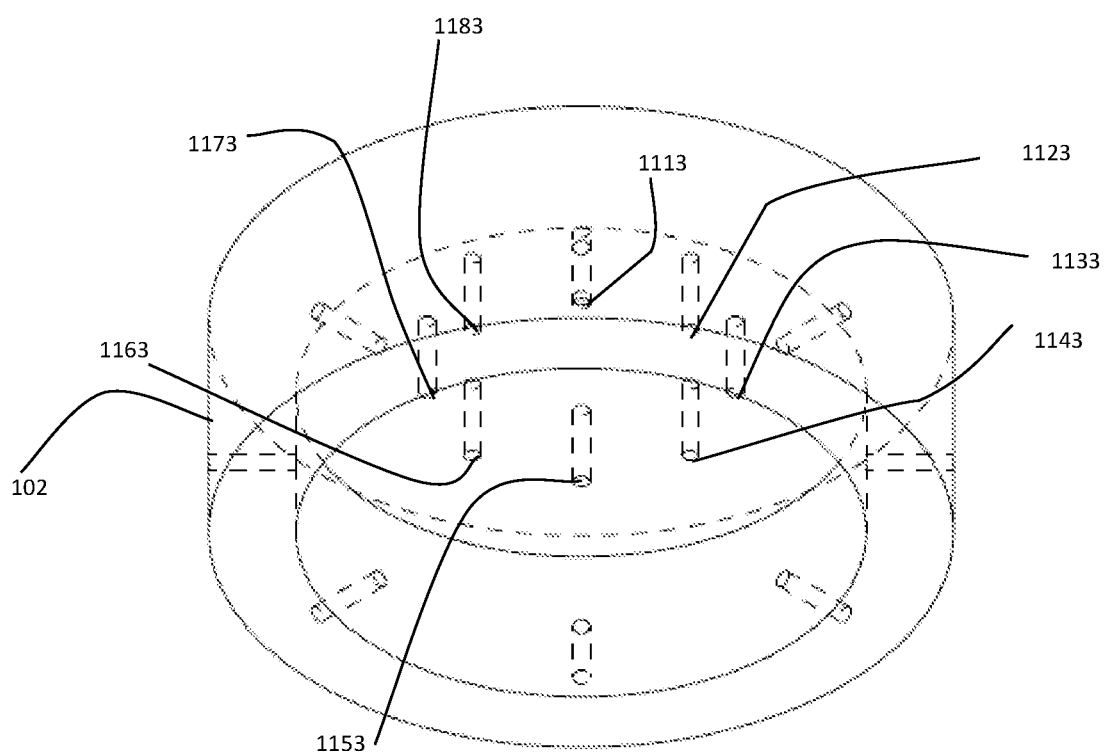
Figure 9b3

FLUID DIVERTING MODULE

BACKGROUND

Samples that contain solid particulates are often subjected to a filtration step prior to analysis. Extraction of such samples from a sample source for analytical purposes is commonly referred to as 'sampling'. Sampling is expected to occur reliably, and more importantly, must not cause any physical or chemical change in the sample or the sample source during sampling. A sampler for a pressurized flow reactor is described in U.S. Pat. No. 9,579,625. The fluid inside the reactor is expected to be free from solid particulates, which is known to cause clogging of the sampler. In other words, the equipment described in U.S. Pat. No. 9,579,625 is not designed to handle fluids containing solids.

A refinement of the inline sampler of U.S. Pat. No. 9,579,625 is described in U.S. application Ser. No. 15/441,665, which is published as US 2017/0248502 A1 and currently pending examination. The main advancement of the refined sampler is in its ability to filter solids from the fluid coming from the sample source that contains solid particulates. The sampler is said to be equipped with a multi-position fluid diverting device which utilizes a method that enables continuous cleaning of all flow-paths inside the fluid diverting device.

In some embodiments of the refined sampler described in application US 2017/0248502 A1, flow-paths of the fluid diverting device are distributed in an annular fashion on multiple concentric circles. Each circle represents a ring of ports. The multi-ring arrangement allows for different independent sampling functions (for example, addition of fluidic additives and filtration) to take place from individual rings with high synchronicity. In other words, a single movement of the configurable portion of the sampler causes individual rings to carry out different tasks, but exactly at the same time.

Referring to FIG. 1, fluid diverting device 1, which is a part of a fluid diverting module (a sampler), is shown.

Referring still to FIG. 1, different peripheral devices which are connected to fluid diverting device 1 are shown. Fluid diverting device 1 is a sampler. Generally, the peripheral devices are a controller (2), a sample source (3), a sample collection module (4), a sample delivery module (5), and a sample analysis module (6).

Referring still to FIG. 1, fluid diverting device 1 adopts at least two positions.

Referring still to FIG. 1, fluid diverting device 1 receives a portion of a fluid stream from sample source 3 from one (the first) position and diverts at least a portion of the fluid to sample delivery module 5 during sampling from the other (the second) position. In all positions, fluid diverting device 1 maintains fluid communication with sample source 3 and sample collection module 4.

Referring still to FIG. 1, in some embodiments, sample delivery module 5 moves the fluid to sample analysis module 6 for analysis.

Referring still to FIG. 1, controller 2 is connected to fluid diverting device 1, sample source 3, sample collection module 4, sample delivery module 5, and sample analysis module 6 via communication pathways 21, 23, 24, 25, and 26, respectively.

Referring still to FIG. 1, fluid diverting device 1 is connected to sample source 3 via flow-path 13. Fluid diverting device 1 is also connected to sample collection module 4 and sample delivery module 5 via flow-paths 14 and 15 respectively. Sample delivery module 5 is connected to sample analysis module 6 via flow-path 16.

Referring still to FIG. 1, a pressure creating device, which applies pressure on the fluid inside sample source 3, is in sample collection module 4.

Referring still to FIG. 1, in some embodiments, sample collection module 4 is an integral part of sample source 3. A portion of the fluid from sample source 3 is returned to the source after sampling. The pressure creating device, which is inside the shared (integral) cavity of the sample source and the sample collection module, pressurizes the fluid inside the sample source.

Referring still to FIG. 1, in some other embodiment, sample collection module 4 is a separate cavity which is in fluid communication with sample source 3 forming a single lumen. A portion of the fluid from sample source 3 is moved to sample collection module 4 during sampling. The pressure creating device, which is in the sample collection module, maintains fluid communication with the sample source in both positions of the fluid diverting device.

Referring to FIGS. 2, 3a, 3b, 4a, 4b, 5a, 5b, 6a, and 6b, fluid diverting device 1, which is a prior art, is a multi-port and multi-ring valve. In these embodiments, the fluid diverting device is a sixteen-port and two-ring (eight-by-eight) rotary valve 1a, which has eight entryways (51 to 58) all of which individually lead to the configurable portion of valve 1a. These entryways are referred to as ports from hereon. Ports 51 to 58 are uniformly distributed in an annular fashion on the stator. There are eight other ports (61 to 68) uniformly distributed in an annular fashion on the stator forming a second ring (the inner ring). Relative arrangement of the two rings (inner and outer) is concentric.

Referring still to FIGS. 2, 3a, 3b, 4a, 4b, 5a, 5b, 6a, and 6b, peripheral devices and modules are individually connected to the fluid diverting device through ports via individually connecting stationary flow-paths (connectors). Connectors are now shown in FIGS. 2 to 6 for simplicity of the illustration.

Referring to FIG. 2, valve 1a comprises of two fluid handling components, one of which is stationary, and the other is configurable (movable). The stationary portion is called the stator and the movable portion is called the rotor.

Referring to FIGS. 3a and 3b, sample source 3 and sample collection module 4 are connected to valve 1a via ports 51 and 52, respectively. A filtration module (71) is connected to valve 1a between ports 55 and 58.

Referring still to FIGS. 3a and 3b, movable flow-paths, which are etched on the two-dimensional surface of the rotor, between any two ports are shown as straight lines to indicate connectivity between two adjacent ports.

Referring to FIG. 3a, valve 1a is connected to four fluid moving devices. The first fluid moving device (75) is connected to sample source 3, which maintains a fluid communication to port 51. When fluid moving device 75 is upstream of valve 1a, the fluid in the sample source is pushed toward valve 1a.

Referring to FIG. 3b, valve 1a is connected to four fluid moving devices. The first fluid moving device (75) is connected to sample collection module 4, which maintains a port 52. When fluid moving device 75 is downstream of valve 1a, the fluid in the sample source is pulled toward valve 1a.

Referring back to FIGS. 3a and 3b, three other fluid moving devices (the second, the third, and the fourth) 76, 77, and 78 are connected to valve 1a via ports 56, 66, and 68, respectively. Three fluid holding devices 73a, 73b, and 74 are connected to valve 1*a* between ports 54 and 64, 53 and 63, 62 and 67 respectively. Port 61 is connected to waste 99.

Referring still to FIGS. 3*a* and 3*b*, filtration module 71 includes a semipermeable flow-path 72. Flow-path 72 permits liquids to permeate through and traps solids upstream. Flow-path 72 is referred to as filtration barrier 72 from hereon.

Referring still to FIGS. 3*a* and 3*b*, sample delivery module 5 is connected to port 65 via flow-path 15. The sample delivery module transports fluids from valve 1*a* to sample analysis module 6 via flow-path 16.

Referring still to FIGS. 3*a* and 3*b*, port 57 is connected to waste 99.

Referring to FIGS. 4*a* and 4*b*, sample delivery module 5 includes a programmable robotic device, which is connected to valve 1*a* both at ports 57 and 65. The sample delivery module establishes independent fluid communications to ports 57 and 65 and transporting one fluid stream at a time from valve 1*a* to the sample analysis module. In some embodiments, the robotic device, when programmed appropriately, is also capable of flowing fluids from ports 57 or 65 to waste.

Referring to FIGS. 3*a*, 3*b*, 4*a* and 4*b*, the stator and the rotor of valve 1*a* comprise of stationary and movable flow-paths respectively. Flow-paths on the stator establish fluid communications between the peripheral objects (i.e., devices, modules, and the sample source) and the movable flow-paths via ports on the stator.

Referring still to FIGS. 3*a*, 3*b*, 4*a* and 4*b*, stationary flow-paths entering through ports 52 and 53, 54 and 55, 56 and 57, 58 and 51, 61 and 62, 63 and 64, 65 and 66, 67 and 68 are connected by eight movable flow-paths on the rotor. This is a 'load' position of valve 1*a*. In this position, sample source 3 is in fluid communication with filtration module 71 and fluid holding devices 73*a* and 73*b*. When a fluid stream approaches valve 1*a*, the valve diverts at least a portion of the fluid to fluid holding device 73*a* (or fluid holding devices 73*a* and 73*b*) via filtration module 71. At the same time, fluid moving device 78 is capable of loading fluid in fluid holding device 74.

Referring still to FIGS. 3*a*, 3*b*, 4*a* or 4*b*, when the rotor is rotated by 90° clockwise or 270° counter-clockwise, valve 1*a* adopts a second 'load' position. Similarly, there are two other 'load' positions. Valve 1*a* adopts last two load positions when the rotor is moved by 180° clockwise (or 180° counter-clockwise) and 270° clockwise (or 90° counter-clockwise) from the first load position. All four load positions, which are functionally degenerate, set valve 1*a* in a configuration wherein at least a portion of the fluid from the sample source is moved to at least one fluid holding device via the filtration module. This is the 'load configuration' of valve 1*a*.

Referring to FIGS. 5*a* and 5*b*, fluid diverting module of FIGS. 3*a* and 3*b* are shown.

Referring still to FIGS. 5*a* and 5*b*, the rotor of valve 1*a* is moved to establish fluid communications between flow-paths entering ports 51 and 52, 53 and 54, 55 and 56, 57 and 58, 62 and 63, 64 and 65, 66 and 67, 68 and 61. This is an 'inject' position of valve 1*a*. In this position, sample source 3 is still in fluid communication with sample collection module 4. In FIG. 5*a*, fluid in the sample source is pushed by fluid moving device 75 toward valve 1*a*. In FIG. 5*b*, fluid in the sample source is pulled by fluid moving device 75 toward valve 1*a*.

Referring still to FIGS. 5*a* and 5*b*, filtration module 71 and fluid holding devices 73*a* and 73*b* are not in fluid communication with the sample source in this position. Fluid moving device 77 is in fluid communication with all fluid holding devices (73*a*, 73*b*, and 74) and is capable of moving fluids from all fluid holding devices to sample delivery module 5.

Referring to FIGS. 6*a* and 6*b*, fluid diverting modules of FIGS. 4*a* and 4*b* are shown in one of the four 'inject' positions.

Referring to FIGS. 5*a*, 5*b*, 6*a* or 6*b*, when the rotor is moved by 90° clockwise or 270° counter-clockwise, valve 1*a* adopts a second 'inject' position. Similarly, there are two other 'inject' positions. Valve 1*a* adopts last two inject positions when the rotor is moved by 180° clockwise (or 180° counter-clockwise) and 270° clockwise (or 90° counter-clockwise) from the first inject position. All four inject positions, which are functionally degenerate, set valve 1*a* in a configuration wherein fluids collected in the fluid holding devices are transported to the sample delivery module. This is the 'inject configuration' of valve 1*a*. Also in all inject positions, fluid moving device 76 is capable of moving fluid through filtration module 71 from port 56 to port 57.

Referring to FIGS. 3*a*, 3*b*, 4*a*, 4*b*, 5*a*, 5*b*, 6*a*, and 6*b*, when valve 1*a* is rotated by an integral multiple of 45° angle clockwise or counter-clockwise, valve 1*a* toggles between the load and the inject configurations. In other words, if valve 1*a* is in the load configuration, a rotation by an integral multiple of 45° angle clockwise or counter-clockwise sets the valve in the inject configuration. Similarly, if valve 1*a* is in the inject configuration, a rotation by an integral multiple of 45° angle clockwise or counter-clockwise sets the valve in the load configuration.

Referring back to FIGS. 3*a*, 3*b*, 4*a* or 4*b*, if fluid from sample source 3 contains solid particulates, filtration module 71 traps the particulates upstream of filtration barrier 72 in the load configuration of valve 1*a*. The unfiltered fluid enters valve 1*a* via port 51 and exits valve 1*a* via port 58 to move toward the filtration barrier. During the journey of the fluid from port 51 to port 58, the fluid is not filtered and undertakes a difficult fluidic journey depending on the nature of the solid and its concentration.

Referring back to Figures 5*a*, 5*b*, 6*a* or 6*b*, solids are trapped upstream of filtration barrier 72. When fluid moving device 76 moves fluid from port 56 to port 57, fluid upstream of filtration barrier 72, which contains solids, undertakes a difficult fluidic journey between ports 57 and 58. The degree of difficulty depends on the nature of the solid and its concentration. If sample source 3 continues to move fluid toward valve 1*a* during this time, the unfiltered fluid also undertakes a difficult journey between ports 51 and 52.

Referring to FIG. 7, which is a prior art, a cross-sectional view of flow-paths between port 51 and 58 is shown. The flow-paths are shown to encounter a slurry flow at the load configuration. The rotor and stator of the valve are labeled as 101 and 102, respectively. Vertical stationary flow-paths (1211 and 1281) of the stator connect port 51 and 58 through a horizontal movable flow-path (999) on the rotor.

Referring to FIGS. 5*a*, 5*b*, and 7, fluid containing solid particulates enters valve 1*a* through port 51 and exits the valve through 58. The journey through the lumen formed by flow-paths 1211, 999, and 1281 requires particulates to make at least two tortuous turns of approximately 90° each. Depending on the mobility of solids in the slurry, fluidic movement is disrupted. In extreme cases, fluidic motion is interrupted due to the accumulation of solids at the corner edges causing clogging of the valve 1*a*.

Referring to FIGS. 3*a*, 3*b*, 4*a*, 4*b*, 5*a*, 5*b*, 6*a*, and 6*b*, according to one aspect of application US 2017/0248502 A1, valve 1*a* is a multi-position valve and capable of establishing fluid communications between fluid moving device 76 and any movable flow-path on the outer ring of the rotor. Anytime fluid moving device 76 moves a fresh batch of fluid through a movable flow-path of interest, the flow-path is freed of solids. For example, when the valve is in the inject configuration (Figure 5a, 5b, 6a or 6b), movable flow-path connecting ports 56 and 57 is being cleared of solids. Similarly, when valve 1a is in the load configuration (FIG. 3a, 3b, 4a or 4b), movable flow-path connecting ports 57 and 58 is cleared of solids.

Referring back to FIG. 7, clearing of solid is impacted (compromised) when the solids are moved through a combination of stationary and movable flow-paths forming a single lumen with high tortuosity. Samplers in prior arts have movable flow-paths etched on the surface of the rotor. When a movable flow-path of the rotor establishes fluid communications with two adjacent stationary flow-paths of the stator, a lumen, which requires at least two tortuous turns for fluidic motion, forms. Depending on the nature of the solid or its concentration accumulation of solids at the corner edges of the lumen is possible. When accumulation of solids is sufficient, fluidic motion is prevented and the sampling operation fails using prior art samplers.

According to one aspect of the current invention, a fluid diverting module includes a fluid diverting device with at least one movable (configurable) three-dimensional flow-path in the movable (configurable) portion of the device. The three-dimensional disposition of the movable flow-path(s) is confined within the three-dimensional boundary of the movable portion. The movable is curved so that an entirety of the movable flow-path has bend radius that is greater than zero. The definition of bend radius is derived from the standard arc length formula. According to the standard arc length formula, arc length is equal to the product of arc angle (in radian) and the radius. Thus, bend radius is calculated by dividing the length of the bending body (the bend allowance) by the bend angle. For a straight tunnel, bending is not present. In other words, bend angle is non-existent or infinite. Hence bend radius is zero.

According to one aspect of the invention, when bend radius of a curved movable flow-path has a numerical value of a positive number across its length, the flow-path is continuously bending across its length. When bend radius of the flow-path assumes a constant positive value throughout, bending of the flow-path is uniform (for example, a portion of an incomplete circle). When bend radius of the flow-path is positive, but not constant across its length, bending of the flow-path is non-uniform (for example, spiraling form).

SUMMARY

According to one aspect of the invention, a fluid diverting module includes a fluid diverting device (e.g. valves, chips, switches) with configurable three-dimensional flow-paths in the configurable portion of the device. The device receives a fluid stream from a sample source and diverts at least a portion of the fluid to at least one fluid holding device (e.g., loops, tubes, pipes) when at least one component of the module is configured appropriately.

In some embodiments, the fluid diverting device is a rotary valve sampler.

According to another aspect of the invention, the sampler is a non-disruptive sampling device.

The term 'non-disruptive' used in this summary is intended to describe an event of diverting at least a portion of a fluid stream from a sample source without significantly altering any physicochemical properties (for example, viscosity, chemical composition or other physicochemical properties) of the sample or the physical state of the sample source (for example, pressure and temperature inside the sample source or other physical properties).

In some embodiments, the sampler maintains fluid communication with a pressure creating device, which pressurizes a cavity that is in fluid communication with the sample source in all configurations of the fluid diverting device. Uninterrupted fluid communication between the pressurized cavity and the sample source helps preserve pressure inside the sample source during configurational changes of the fluid diverting device.

In some embodiments, the pressure creating device is inside a sample collection module connected downstream of the sampler and applies pressure directly on the sample collection module. The pressure is transmitted to the sample source via the sampler, which maintains fluid communication between the sample collection module and the sample source in all configurations.

In some other embodiments, the sample collection module is an integral part of the sample source. In those embodiments, the pressure creating device pressurizes both the sample source and the sample collection module. The sampler, which maintains fluid communication with the sample source in all configurations, experiences the same pressure as that of the sample source and the sample collection module.

In some embodiments, delivery of fluid from the sample source to the sampler is achieved by a positive pressure gradient from the sample source to the sampler (for example, a fluid moving device upstream of the sample source and the sampler). In some other embodiments, delivery of the fluid stream is achieved by a negative pressure gradient from the sample source to the sampler (for example, a fluid moving device downstream of the sampler and the sample source).

In some embodiments, the sampler is a multi-port, multi-position rotary valve, which is comprised of two separate components. The component which hosts a plurality of stationary flow-paths into which all peripheral modules and devices (for example, the sample source, the sample collection module, and fluid moving, filtering, and holding devices) is referred to as the 'stator'. On the other hand, the configurable component which hosts three-dimensional movable flow-paths (for example, channels, grooves, slits) to establish fluid communications among the stationary flow-paths is referred to as the 'rotor'. The movable flow-paths are embedded inside the three-dimensional boundary of the rotor. Each movable flow-path establishes a fluid communication with the stationary flow-paths forming a lumen in the three-dimensional boundary of the valve. Fluid experiences less tortuous turns due to the gradual bending of the lumen during its journey through the valve. It is important to note here that, in prior arts, movable flow-paths are etched on the two-dimensional surface of the rotor and the fluid makes at least two sharp (tortuous) turns.

In some other embodiments, the rotor comprises of a plurality of templating parts with appropriate embossed and debossed surfaces. The parts are tightly adjoined to give a single bodied rotor with three-dimensional arcuates. In some cases, materials with suitable malleability and chemical resistance is sandwiched between two adjacent parts to build seals around the formed arcuates.

In all embodiments, movable flow-paths form arcuates in the three-dimensional boundary of the rotor. In some embodiments, the plane, the curvature and the angle of inclination (with respect to the surface of the rotor contacting the stator) of the arcuates are different from rotor to rotor.

In some embodiments, the stationary flow-paths of the stator are distributed annularly. Ports, which are entryways of the stationary flow-paths on the surface of the stator, also form an annular distribution (a ring) on the stator. The stator has one or more than one rings of ports.

In some embodiments, curvature or the plane of the movable arcuates are varied to keep swept volume of all arcuates across all rings identical. In some other embodiments, internal diameter of the arcuates are varied to keep swept volume of all arcuates across all rings identical.

In some embodiments, two ports from two different rings are connected using at least one fluid holding device; the rotor, whenever configured appropriately, establishes fluid communication between at least one port of one ring and at least one other port of one other ring through this externally replaceable fluid holding device.

In some embodiments, any number of arcuates are connected by additional interconnecting flow-paths inside the three-dimensional boundary of the rotor; connectivity between the arcuates in question does not change due to the movement of the rotor, but overall configuration of the sampler changes due to the movement of the rotor.

In some embodiments, arcuates in the rotor comprise split flow-paths forming fractal arrangements inside the three-dimensional boundary of the rotor. In those cases, at least one port of one ring establishes fluid communication with at least two other ports of the same ring or a different ring whenever the rotor is configured appropriately.

In some embodiments, arcuates form geometric shapes other than a singular shape of the letter 'U' of the English alphabet. In other words, in some embodiments, an arcuate may be carved in any shape or form inside the three-dimensional boundary of the rotor.

In some embodiments, one of the two cross-sectional areas between a stationary flow-path and a movable flow-path is greater than the other at the contacting interface. In other words, the area of contact (the footprint) of one flow-path (stationary or movable) exceeds that of the other (movable or stationary). In some embodiments, a terminus or both termini of an arcuate are oriented in such a way so that the arcuate either does not connect to any flow-path of the stator or connects to a single flow-path of the stator when the rotor is moved by a certain angle. This is an intermediate position, which is neither a 'load' nor an 'inject' position of the sampler. In this position, an arcuate is isolated from one or both adjacent stationary flow-paths. The configuration derived from this position of the rotor is termed as the 'isolation configuration' from hereon. The same arcuate connects to at least two flow-paths either from a 'load' or an 'inject' configuration.

In some embodiments, the area of contact (the footprint) of the movable flow-path of the rotor is larger than that of the stationary flow-path of the stator. The footprint of the movable flow-path of the rotor is chosen in a way so that, when rotor is configured appropriately, only one of the two termini of the movable flow-path maintains fluid communication with the stationary flow-paths in question.

In some other embodiments, the area of contact (the footprint) of the movable flow-path of the rotor is smaller than that of the stationary flow-path of the stator. The footprint of the movable flow-path is chosen in a way so that, when the rotor is configured appropriately, only one of the two termini of the movable flow-path maintains fluid communication with the stationary flow-paths in question.

According to some other aspect of the invention, the sampler receives a fluid stream that contains solid particulates (e.g., a slurry or a suspension) from the sample source. The sampler is equipped with a filtration module situated upstream of at least one fluid holding device and downstream of the sample source. The filtration module includes at least one inline filtration barrier.

In some embodiments, the sampler comprises two fluid holding devices downstream of the filtration module.

In some embodiments, the filtration module and the downstream fluid holding device(s), which are responsible for storing fluids from the sample source during sampling, are connected to ports distributed in an annular fashion on the stator (the first ring). In one configuration of the sampler, the sampler diverts at least a portion of a slurry stream from the sample source to the sample collection module via the filtration module. The filtered fluid is moved into the downstream fluid holding device(s). This configuration of the sampler is termed as the 'load' configuration, which is achieved from a number of functionally degenerate 'load' positions. In one other configuration of the sampler, the sampler channels fluid from the sample source to the sample collection module bypassing the filtration module. The filtration module is in fluid communication with a second fluid moving device. Also, in this configuration, the fluid holding devices are in fluid communication with a third fluid moving device, which is capable of transporting the fluid from the fluid holding devices to a sample delivery module. This configuration is termed as the 'inject' configuration, which is achieved from a number of functionally degenerate 'inject' positions.

In some embodiments, the fluid diverting module includes a fourth fluid moving device capable of moving fluidic additives to a third fluid holding device mounted on a second ring of the stator. The third fluid holding device is loaded with fluidic additives at the load configuration of the sampler. The third fluid moving device, which is responsible for moving fluid from the first and the second fluid holding devices to the sample delivery module, is located upstream of the third fluid holding device and moves fluids from all fluid holding devices to the sample delivery module at the inject configuration of the sampler.

In some embodiments, the sample delivery module moves fluids from the sampler to a sample analysis module for analysis.

According to some other aspect of the invention, in some embodiments, all flow-paths responsible for sampling from the sample source constitute primary flow-paths of the sampler. A plurality of secondary stationary flow-paths, which have separate fluid communications with at least one secondary movable flow-path in the rotor, maintain a fluid communication with the secondary movable flow-path in all configurations of the sampler. The secondary flow-paths (stationary and movable) do not have any fluid communication with the primary flow-paths of the sampler. The fluid communication in the secondary stationary and movable flow-paths does not break during the movement of the rotor.

In some embodiments, the secondary flow-paths are used to move heat-transferring fluids through the rotor to maintain isothermal state of the rotor.

According to some other aspect of the invention, the movable portion (the rotor) of the fluid diverting device of the fluid diverting module is made from chemically resistant materials. In some other embodiments, the rotor is made of materials which are suitable for precise fabrication of three-dimensional hollow arcuates inside a solid embodiment. In some cases, exposed surface of the rotor which contacts fluids are coated with chemically resistant materials.

According to some other aspect of the invention, in some embodiments, the fluid diverting module is connected to a controller device (for example, a computer) physically (for example, via a communication cable). In some other embodiments, the fluid diverting module is connected to the controller device wirelessly (for example, by some wireless networking technology); the controller device sends signals to the fluid diverting module to control the functioning of the configurable portion of the fluid diverting module.

In some other embodiments, the fluid diverting module is connected to a controller device, which is equipped with a controller software; the software sends commands to the configurable portion of the fluid diverting module either via a communication cable or wirelessly.

In another embodiment, the fluid diverting module is equipped with a handheld device capable actuating the configurable portion of the fluid diverting module directly from the handheld device.

According to some other aspect of the invention, a method for sampling using the fluid diverting module comprises a) preparing a sample source and a fluid moving device to receive a fluid stream; b) configuring a fluid diverting device to a load position (the 'load' configuration); c) flowing at least a portion of the fluid stream from the sample source to a filtration module; d) allowing the filtered fluid stream to flow into one or two fluid holding devices for a period of time; e) configuring the fluid diverting device to an inject position (the 'inject' configuration); f) actuating a second fluid moving device, which is in fluid communication with the filtration module, to move fluid through the filtration module; and g) actuating a third fluid moving device, which is in fluid communication with the fluid holding devices (the first and the second) and a sample delivery module, to move the fluid from the fluid holding devices to the sample delivery module.

In some methods, a fourth fluid moving device is actuated to move at least one fluidic additive to a third fluid holding device at the load configuration of the fluid diverting device.

In some methods, loading of fluid from the sample source to the first fluid holding device is not executed from a single load position, but from a number of consecutive load positions, all representing the same load configuration of the fluid diverting device. In some of those methods, a specific movable flow-path of the rotor does not receive fluid from the sample source in two consecutive load positions.

In some methods, injection of fluid from the fluid holding device(s) to the sample delivery module is not executed from a single inject position, but from a number of consecutive inject positions all representing the same inject configuration of the fluid diverting device. In some of those methods, a specific movable flow-path of the rotor does not receive fluid from the sample source in two consecutive inject positions.

In some method, the method comprises configuring the fluid diverting device to move to a second position so that a movable flow-path, which was receiving fluid from the sample source at the first (previous) position, comes in fluid communication with the second fluid moving device and a second movable flow-path receives fluid from the sample source at the second position. This sequence is applicable irrespective of two consecutive configurations of the fluid diverting device. In other words, the method is applicable when the fluid diverting device moves from a load position to a second load position or from an inject position to a second inject position or from a load to an inject position or vice versa.

In some method, the second fluid moving device is configured in a manner so the direction of flow through the movable flow-path during a load position is in the forward direction (i.e., the same direction as that of the flow of fluid through the same movable flow-path in the position immediately prior to the position in question) or in the reverse direction (i.e., the opposite direction as that of the flow of fluid through the same movable flow-path in the position immediately prior to the position in question).

In some methods, actuations of some of the configurable devices are not sequential, but concurrent.

In some methods where the sampler adopts the 'isolation configuration', the method includes moving the rotor by a certain angle so that at least one of the movable flow-paths of the rotor does not maintain fluid communications with adjacent stationary flow-paths at both termini of the movable flow-path (the arcuate). In some of those methods, the method includes actuation of other configurable devices to pressurize or depressurize fluids which is in isolation. When the pressurization or depressurization is judged complete, the rotor is moved to establish fluid communications with the adjacent stationary flow-paths from both termini from either a load or an inject position.

In some methods where the sampler adopts the 'isolation configuration' before the load configuration, the method includes rotating the sampler to available load positions until a particular load position that is suitable for isolating a particular movable flow-path (arcuate) from a particular stationary flow-path is achieved. Sequence of load positions to achieve the load position in question is done in such a way so that a movable flow-path (arcuate) which was receiving fluid from the sample source at a previous position comes in fluid communication with the second fluid moving device and a new movable flow-path receives fluid from the sample source at the current position.

In some methods where the sampling valve adopts the 'isolation configuration' before the inject configuration, the method includes rotating the sampler to available inject positions until a particular inject position that is suitable for isolating a particular movable flow-path (arcuate) from a particular stationary flow-path is achieved. Sequence of inject positions to achieve the inject position in question is done in such a way so that a movable flow-path which was receiving fluid from the sample source at a previous position, comes in fluid communication with the second fluid moving device and a new movable flow-path receives fluid from the sample source at the current position.

In some methods, actuations of configurable devices of the fluid diverting module are done based on a pre-defined algorithm.

In some methods, actuations of configurable devices of the fluid diverting module are done based on the results obtained from the inline sample analysis module.

According to some other aspect of the invention, a method of manufacturing a three-dimensional embodiment of the rotor includes printing at least a part of the rotor from a printer which prints object in three-dimensions from a digital file.

In some methods of manufacturing the rotor, printing of the rotor is done in two stages. Arcuates, which are meant to form hollow flow-paths in the rotor, are printed first using a printable fluid (the first stage). The solid embodiment is printed next using a second printable fluid around the solid arcuates (the second stage). The material forming the solid arcuates is then removed using a chemical or mechanical means to give the hollow arcuates.

In some methods of manufacturing the rotor, arcuates are printed on an auxiliary support in the three-dimensional space during the first stage printing. The support is then removed and the three-dimensional print of the arcuates, which resembles a circular pattern of 'hanging ropes from equidistant poles', is mounted on the printer platform for the second stage printing. In some methods, the second stage printing is replaced with a casting method. In some other method, the auxiliary support is not removed after the first stage printing. The second stage printing or casting leaves the support embedded inside the solid portion of the rotor. The material forming the solid arcuates is removed using a chemical or mechanical means to give the hollow arcuates at the finish.

In some methods manufacturing the rotor, exposed surface that contacts fluids during the operation of the fluid diverting module is coated with a third fluid which cures and seals the surface for chemical resistance.

In some methods of manufacturing the rotor wherein, the rotor comprises of a plurality of templating parts with appropriate embossed and debossed surfaces, the parts are separately printed using a three-dimensional printer. The method also includes tightly joining the parts to form a single bodied rotor with three-dimensional arcuates. In some cases, the method further includes layering with at least one suitably malleable material between two adjacent parts to form seals around the arcuates.

BRIEF DESCRIPTION OF THE DRAWINGS

The drawings included herewith are for illustrating various examples of articles, methods, modules and devices of the present specification and are not intended to limit the scope of what is taught in any way.

FIGS. 9*a*, 9*b*1, 9*b*2, and 9*b*3 are three-dimensional cross-sectional POVs of the fluid diverting device of FIGS. 8*a*, 8*b*, 8*c*, 8*d*, and 8*e* from two POVs (top-down and top-side respectively). Stationary flow-paths on the outer ring of the stator are shown as linear cavities. Stationary flow-paths on the inner ring of the stator are seen as the vertical projection of the vertical flow-paths. They appear as circles in FIG. 9*a*. Drawings in FIGS. 9*b*1, 9*b*2, and 9*b*3 represent the same cross-sectional view from a bottom-side POV. Three separate figures are used to clearly label various portions of the stationary and movable flow-paths.

FIGS. 10 and 19 are degenerate.

SUMMARY OF INVENTION

Figure 1:
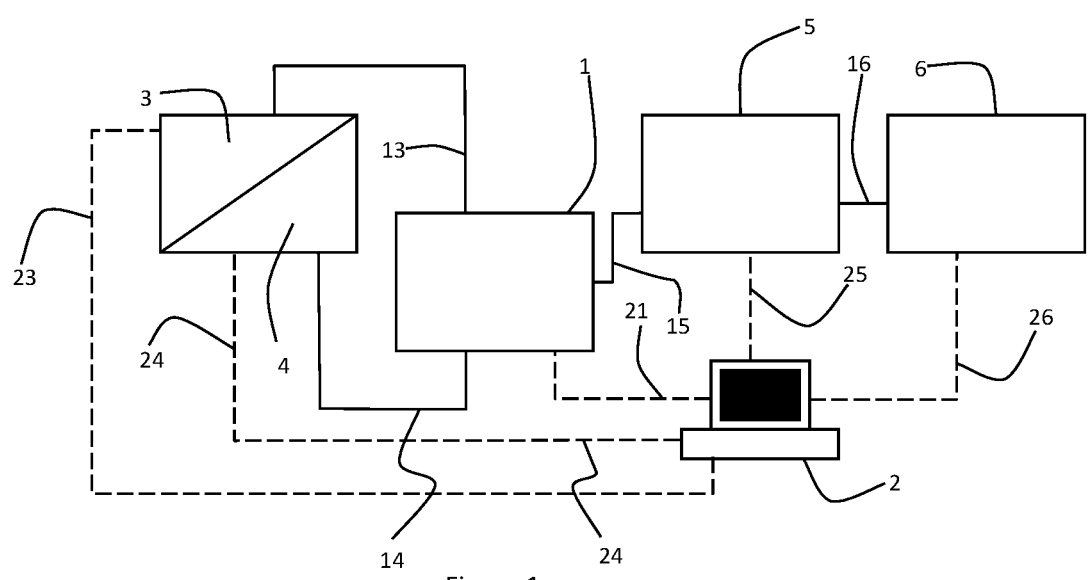
FIG. 1 is a flow diagram of the fluid diverting module including fluidic connectivity among relevant peripheral modules (fluid diverting device, sample source, sample collection module, sample delivery module, and sample analysis module).

The fluid diverting module according to the subject of invention includes design and method of handling fluid in a fluid diverting device which receives samples from a sample source including ones containing solid particulates. The fluid diverting device is configurable and comprises two main components; a stationary part, which hosts a number of stationary flow-paths, is called a stator, and a movable part, which establishes temporary fluid communications with the stationary flow-paths of the stator, is called a rotor. The movable flow-paths, which forms a temporary lumen with the stationary flow-paths, are narrow two-dimensional slits etched into the surface of the rotor in prior arts. The temporary lumen comprises of at least two tortuous turns at the junctions between the movable and the stationary flow-paths making fluidic motion through it tortuous. When a sample contains solid particulates, the flow of the resulting slurry is impacted due to restricted mobility of solids at the junctions. Frequent cleaning using fluids that can either dissolve the solids or mechanically drive the particulates away from the junctions is a critical step for the operation of the prior art devices. The present invention includes three-dimensional movable flow-paths inside the rotor as opposed to the two-dimensional movable flow-paths on the surface of the rotor. The flow of fluid through the temporarily formed lumen at any given configuration of the fluid diverting device is more facile than that in the prior art devices. The rotor, which hosts a number of three-dimensional curved flow-paths, is either made from or coated with chemically resistant materials. The fluid diverting device, which is also equipped with a filtration module, is capable of filtering at least a portion of the slurried fluid and transporting the filtered fluid to a sample delivery module. The fluid diverting device is a multi-position device capable of adopting a multiple number of functionally degenerate positions all representing either load or inject configurations of any prior art fluid diverting devices. Three-dimensional orientations of the movable flow-paths and the multi-position capability allow the fluid diverting device, which is the subject invention, to reliably handle slurried fluid streams. According to another aspect of the invention, movable flow-paths in the rotor, which form arcuates in the three-dimensional boundary of the rotor, establish fluid communications with stationary flow-paths either through both termini or through one of the two termini or completely disengage fluid communications at both termini and remain isolated at a given position. This allows the fluid diverting device to temporarily adjust at least one physicochemical property (for example, pressure) of a slurried flow during configurational change. According to another aspect of the invention, the fluid diverting device is also capable of handling a secondary flow, which is not in fluid communication with the sample source in any configuration of the device, inside the rotor. The secondary flow, when equipped with a heat-transferring mechanism, helps maintain a steady-state temperature of the rotor in applications where pressurized sample source is kept at an elevated temperature.

DETAILED DESCRIPTION

Various modules or methods will be described below to provide examples of embodiments of the invention. No embodiment described below limits any claimed invention and any claimed invention may cover methods or modules that differ from those described below. The claimed invention is not limited to modules or methods having all of the features of any one device or method described below or to features common to multiple or all of the devices described below. It is possible that a device or method described below is not an embodiment of any exclusive right granted by issuance of this patent application. Any invention disclosed in a device or method described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Referring to all figures from FIGS. 8*a* to 8*e*, the fluid diverting module of the present invention includes a fluid diverting device, which is, in these illustrations, a multi-port, multi-ring, and multi-position valve (1*b*).

Figure 8A:
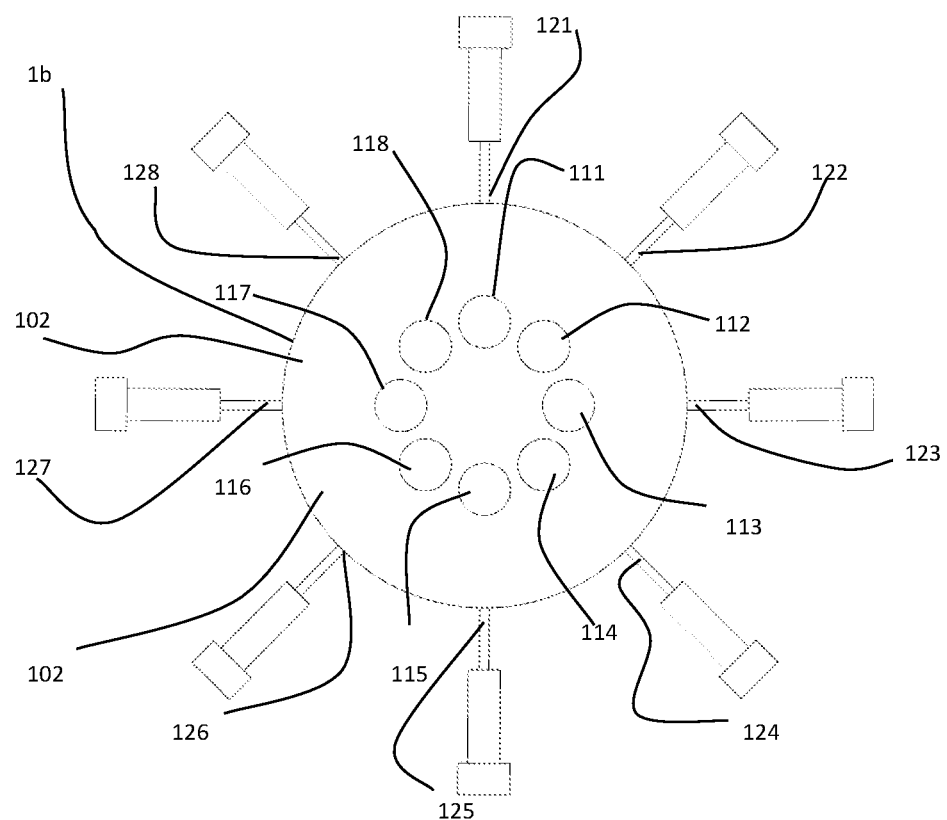
FIG. 8*a*, 8*b*, 8*c*, 8*d*, and 8*e* are three-dimensional illustrations of a fluid diverting device of the fluid diverting module of FIG. 1, which is a part of the subject invention (i.e., the fluid diverting module), from various positions (top-down, bottom-up, top-side, bottom-side, and side respectively) from which the module is observed (i.e., the points of view or POVs).

Referring to FIG. 8*a*, a top-down view of valve 1*b*, which is, in this illustration, an 8×8-port (eight-by-eight) and a 2-ring rotary valve. Stator 102 of valve 1*b*, which hosts two rings of ports (eight ports on the inner ring and eight ports on the outer ring), is shown. Each port leads to a stationary flow-path (passageway) situated inside the stator portion of valve 1*b* and a second set of stationary flow-path situated outside the stator portion of valve 1*b*. Connectors, which are the stationary flow-paths outside the stator portion of valve 1*b*, are numbered from 111 to 118 for the inner ring and from 121 to 128 for the outer ring.

Figure 8B:
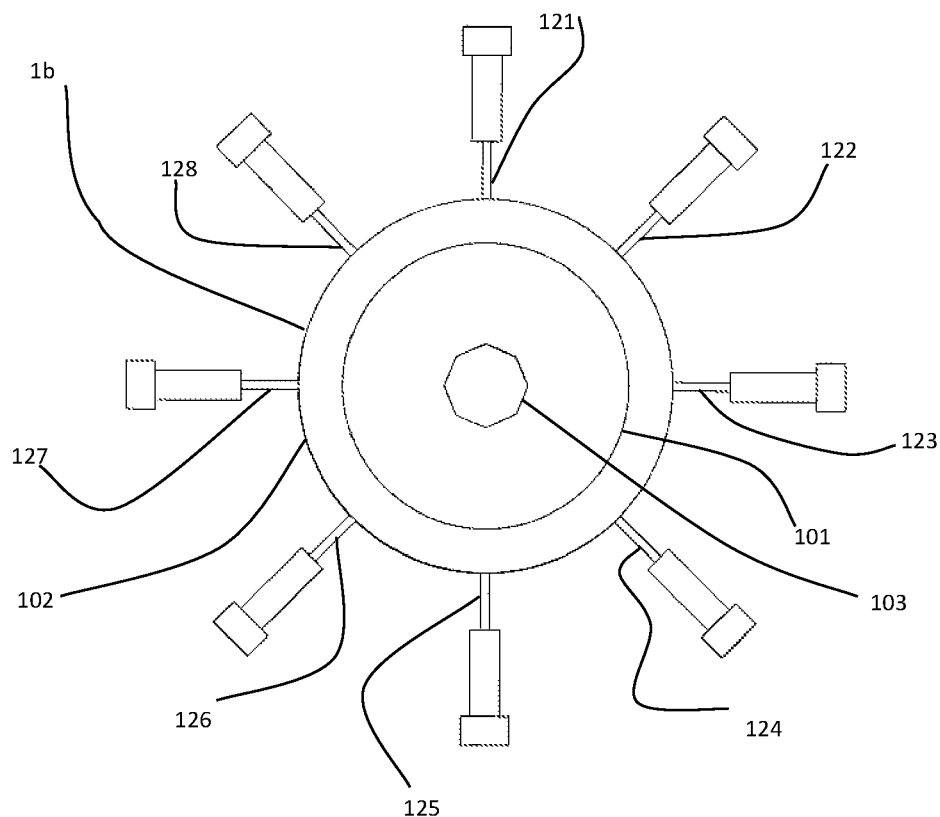

Referring to FIG. 8*b*, a bottom-up POV of valve 1*b* is shown. The configurable portion of valve 1*b* (the rotor) is shown as 101, which contacts with stator 102 from the side as well as from the face (not shown in FIG. 8*b*). In other words, rotor 101, in this illustration, situated inside the hollow portion of stator 102.

Referring still to FIG. 8*b*, an adapter 103, which is designed to rotate 101 by a motor drive, is also shown.

Figure 8C:
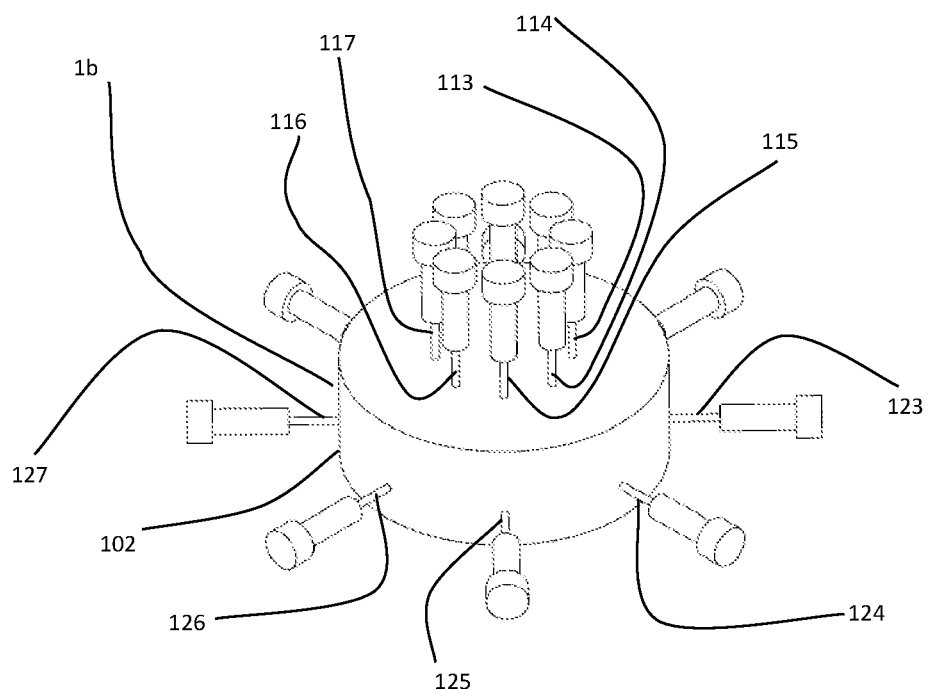
Figure 8D:
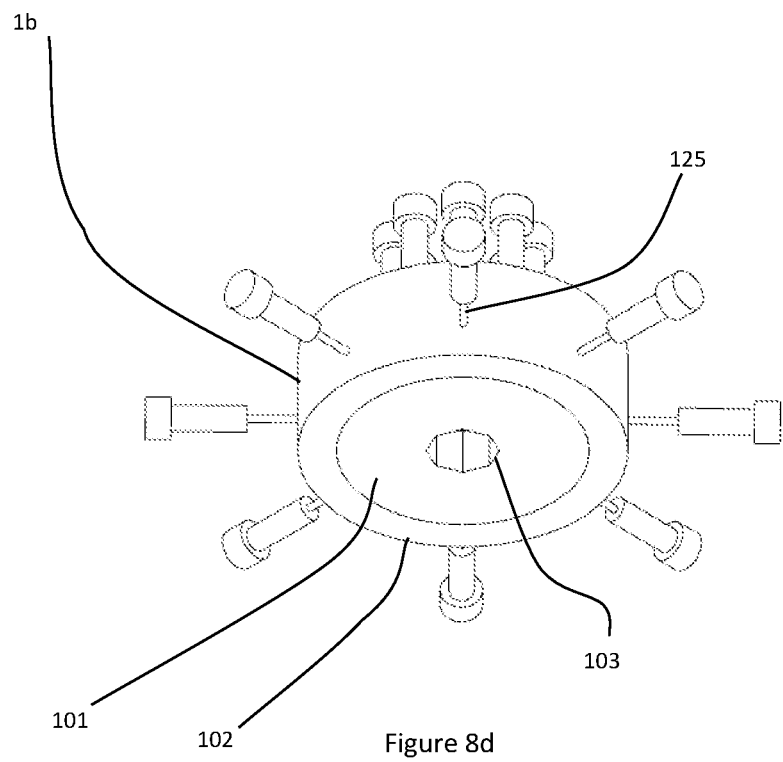
Figure 8E:
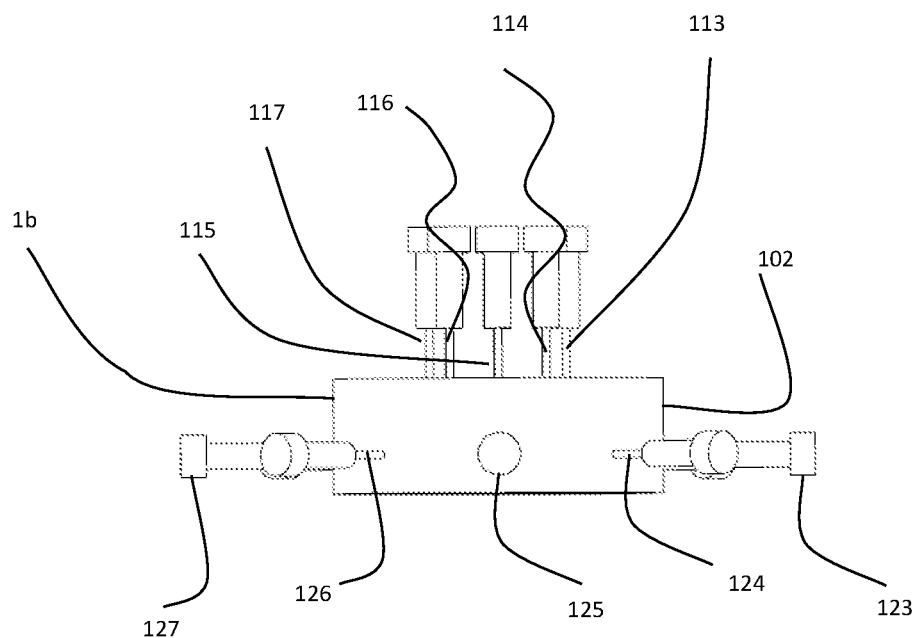

Referring to FIGS. 8*c*, 8*d*, and 8*e*, top-side, side, and bottom-side POV of valve 1*b* are shown for better understanding of relative orientations of the valve components (the rotor, the stator, adapter 103, and the connectors).

Referring to FIGS. 8*b* and 8*d*, adapter 103 has an octagonal imprint. In some other embodiment, adapter 103 is of some other geometric imprint (for example, a cross).

Referring to FIG. 8*e*, relative orientations of the connectors on the outer ring (121 to 128; only 126 and 124 are shown in the side POV) and the connectors on the inner ring (111 to 118; from 113 to 117 are shown in the side POV) are orthogonal. In other words, connectors of the inner ring are vertical and those of the outer ring are horizontal.

Figure 9A:
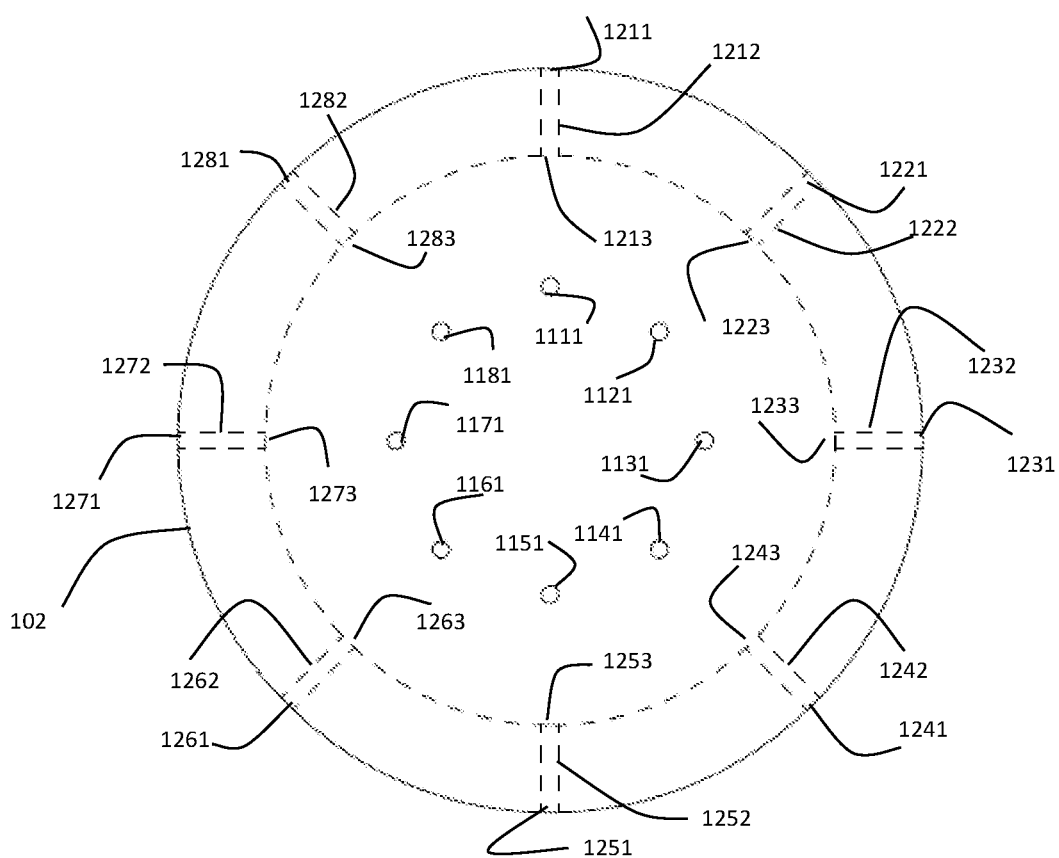

Referring to FIG. 9*a*, a top-down cross-sectional POV of stator 102 is shown. Stationary flow-paths of the outer ring (passageway), which have radially outward orientations, are shown as 1212, 1222, 1232, 1242, 1252, 1262, 1272, and 1282. These flow-paths are responsible for making fluid communications between the rotor and the outer connectors of valve 1*b*. In this illustration, stationary flow-paths are cylindrical in shape.

Referring still to FIG. 9*a*, each stationary flow-paths (passageways) of the outer ring has two open termini; one contacting the rotor (1213, 1223, 1233, 1243, 1253, 1263, 1273, and 1283) and the other contacting the connectors of the outer ring of valve 1*b* (1211, 1221, 1231, 1241, 1251, 1261, 1271, and 1281).

Referring still to FIG. 9*a*, stationary flow-paths (passageways) of the inner ring are not visible. Only open terminus of the stationary flow-paths of the inner ring of valve 1*b* are shown as 1111, 1121, 1131, 1141, 1151, 1161, 1171, and 1181. These termini contact the connectors of the outer ring of valve 1*b*.

Figure 2:
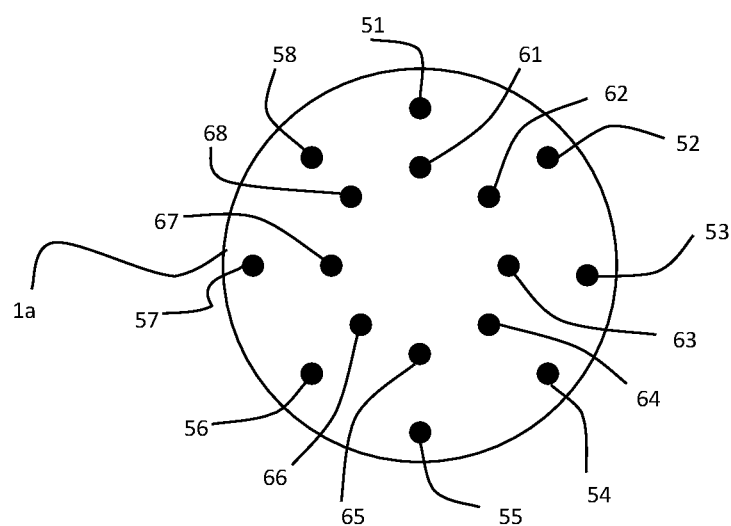
FIG. 2, which is a prior art, is a cross-sectional (top-down) view of a multi-ring fluid diverting device of the fluid diverting module of FIG. 1. In this illustration, the stationary portion (the stator) of the fluid diverting device has sixteen ports uniformly distributed in two rings to form an eight-by-eight network of ports on the stator.
Figure 3A:
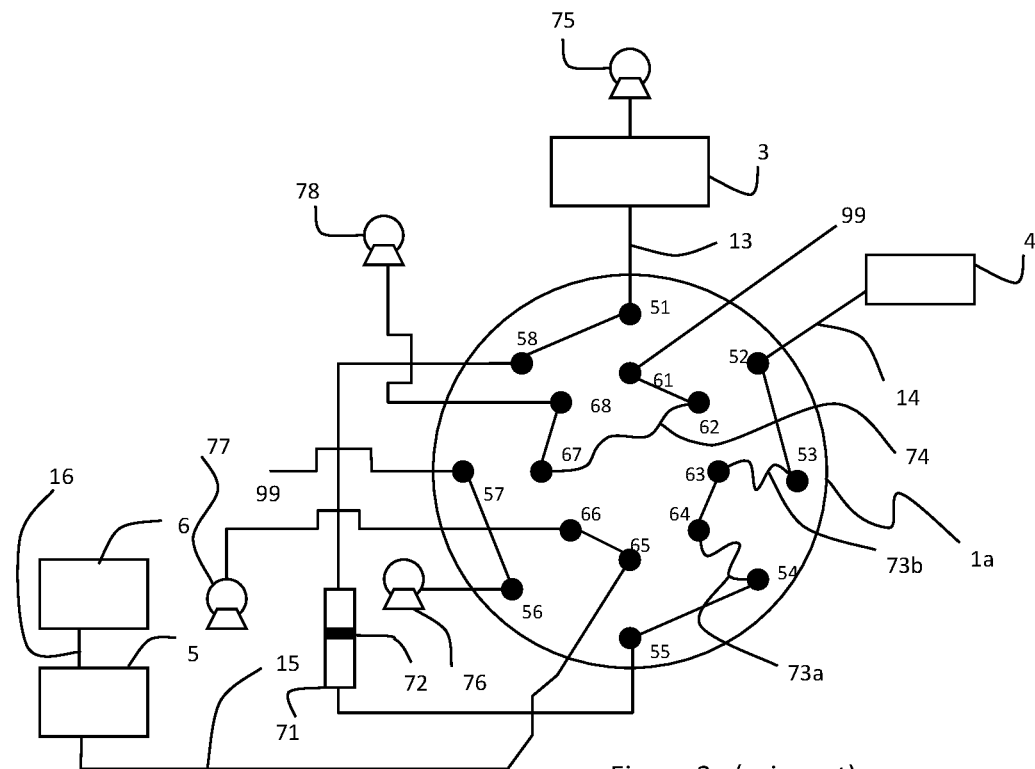
FIGS. 3*a* and 3*b*, which are prior art, are flow diagrams of the fluid diverting module of FIG. 1, showing an example of fluidic connectivity of the peripheral modules and other fluid handling devices (four fluid moving devices, three fluid holding devices, and a filtration module) to the fluid diverting device; the first fluid moving device, which is in fluid communication with the first and the second fluid holding devices, is upstream of the fluid diverting device in FIG. 3*a* and downstream of the fluid diverting device in FIG. 3*b*; the second fluid moving device which is responsible for moving fluid through the filtration module is connected to waste; the third fluid moving device is connected to the sample delivery module bypassing the fluid holding devices; the fourth fluid moving device is in fluid communication with the third fluid holding device. The fluid diverting device is in one of the four load positions.
Figure 3B:
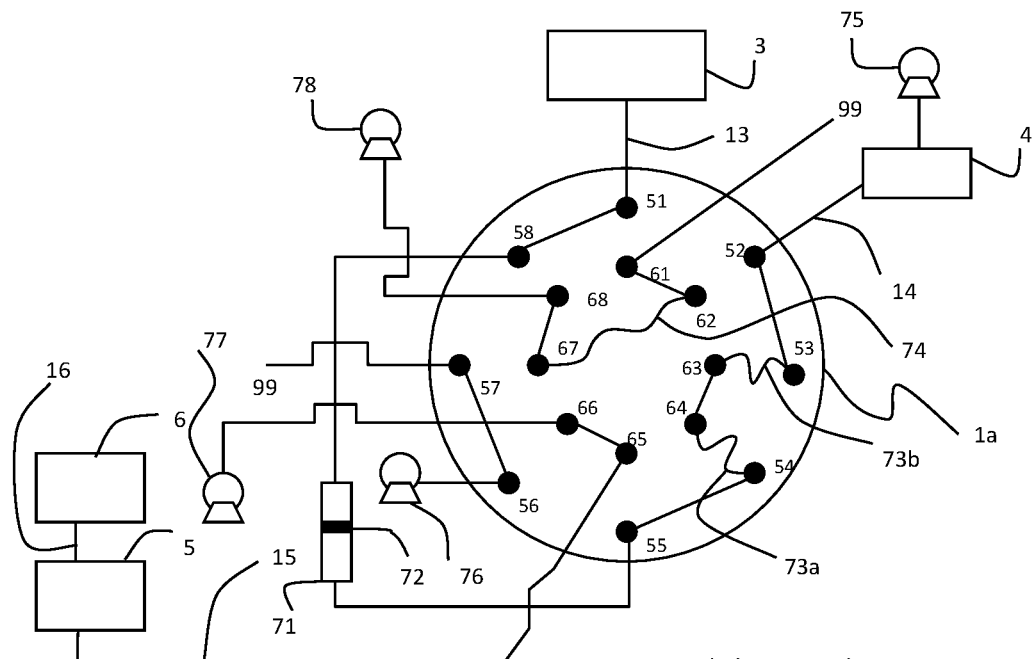
Figure 4A:
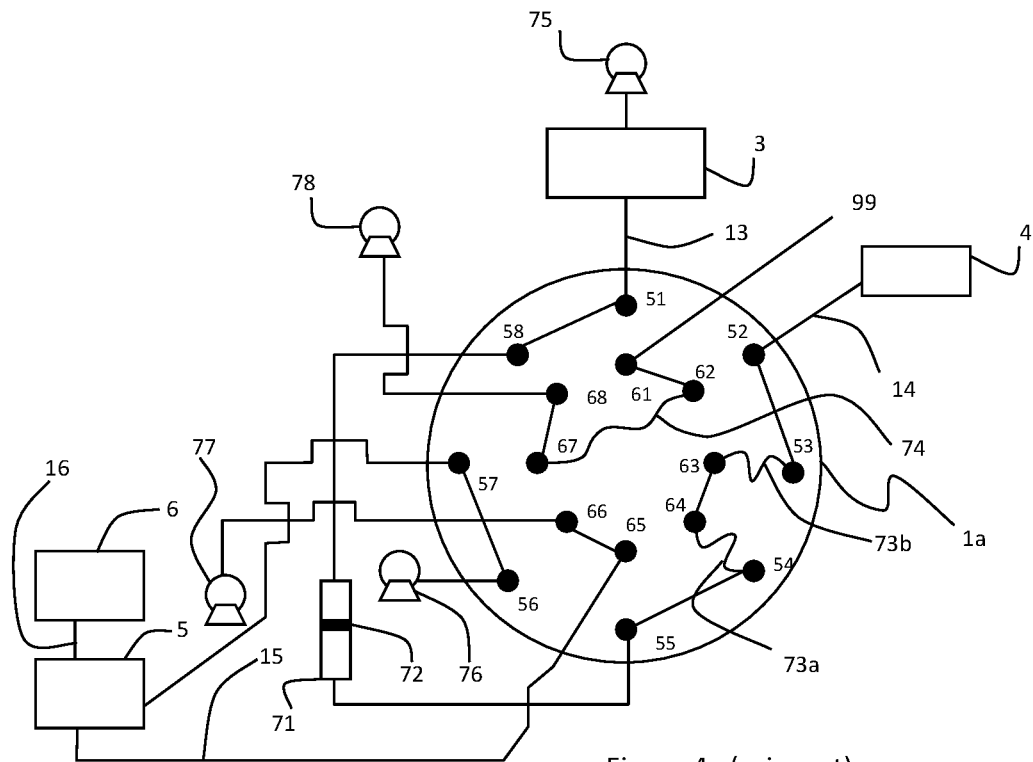
FIGS. 4*a* and 4*b*, which are prior art, are flow diagrams of the fluid diverting module of FIG. 1, showing an example of fluidic connectivity of the peripheral modules and other fluid handling devices (three fluid moving devices, three fluid holding devices, and a filtration module) are connected to the fluid diverting device; the first fluid moving device, which is in fluid communication with the first and the second fluid holding devices, is upstream of the fluid diverting device in FIG. 4*a* and downstream of the fluid diverting device in FIG. 4*b*; the second fluid moving device which is responsible for moving fluid through the filtration module is connected to the sample delivery module; the sample delivery module is equipped with a robotic device which moves fluid to the sample analysis module or to waste; the third fluid moving device is connected to the sample delivery module bypassing the fluid holding devices; the fourth fluid moving device is in fluid communication with the third fluid holding device. The fluid diverting device is in one of the four load positions.
Figure 4B:
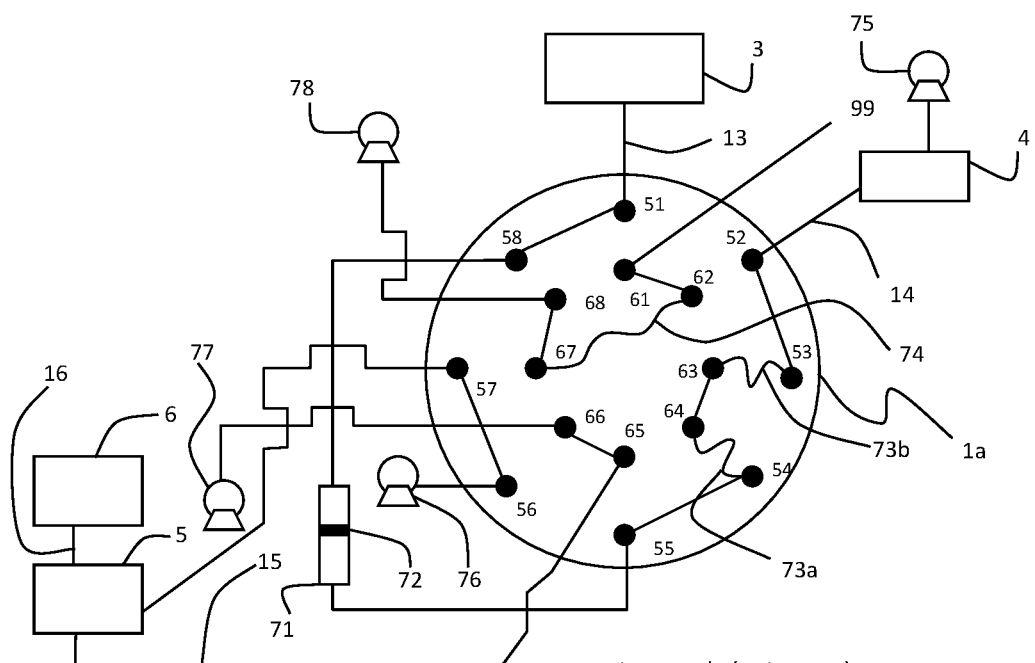
Figure 5A:
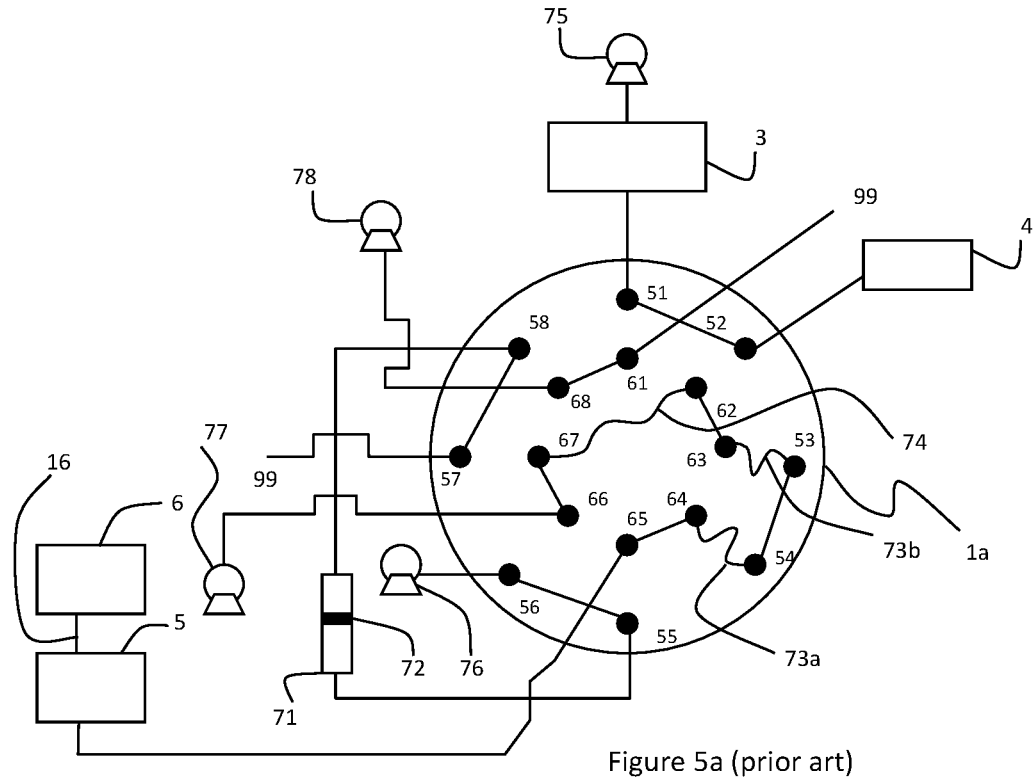
FIGS. 5*a* and 5*b*, which are prior art, are flow diagrams of the fluid diverting module of FIG. 1, showing an example of fluidic connectivity of the peripheral modules and other fluid handling devices (four fluid moving devices, three fluid holding devices, and a filtration module) to the fluid diverting device; the first fluid moving device, which is not in fluid communication with the first and the second fluid holding devices, is upstream of the fluid diverting device in FIG. 5*a* and downstream of the fluid diverting device in FIG. 5*b*; the second fluid moving device which is responsible for moving fluid through the filtration module is connected to waste via the filtration module; the third fluid moving device is connected to the sample delivery module via the fluid holding devices; the fourth fluid moving device is connected to waste. The fluid diverting device is in one of the four inject positions.
Figure 5B:
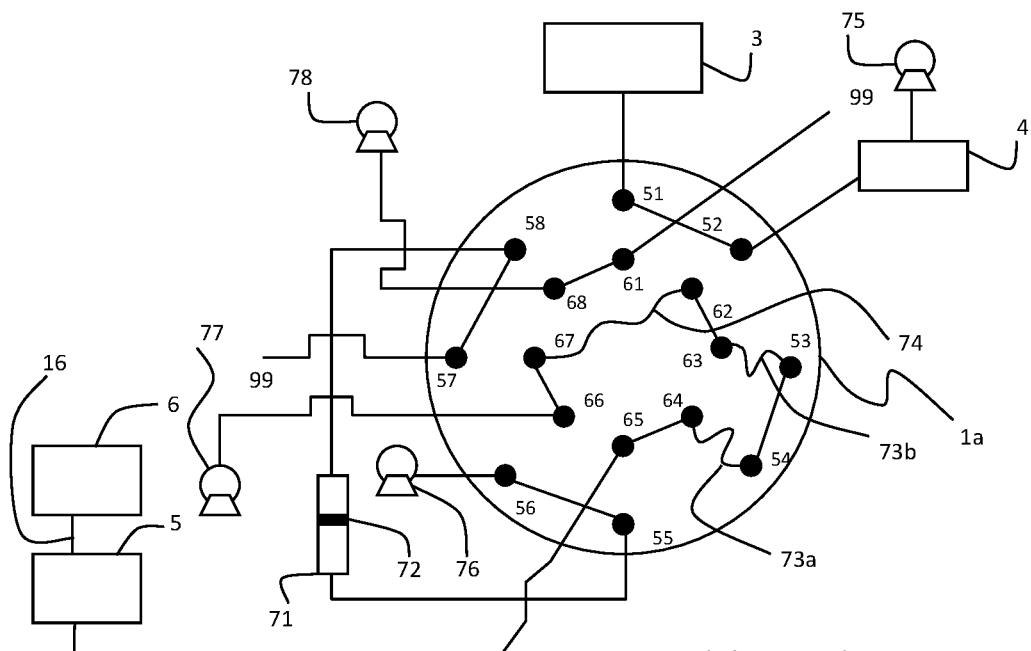
Figure 6A:
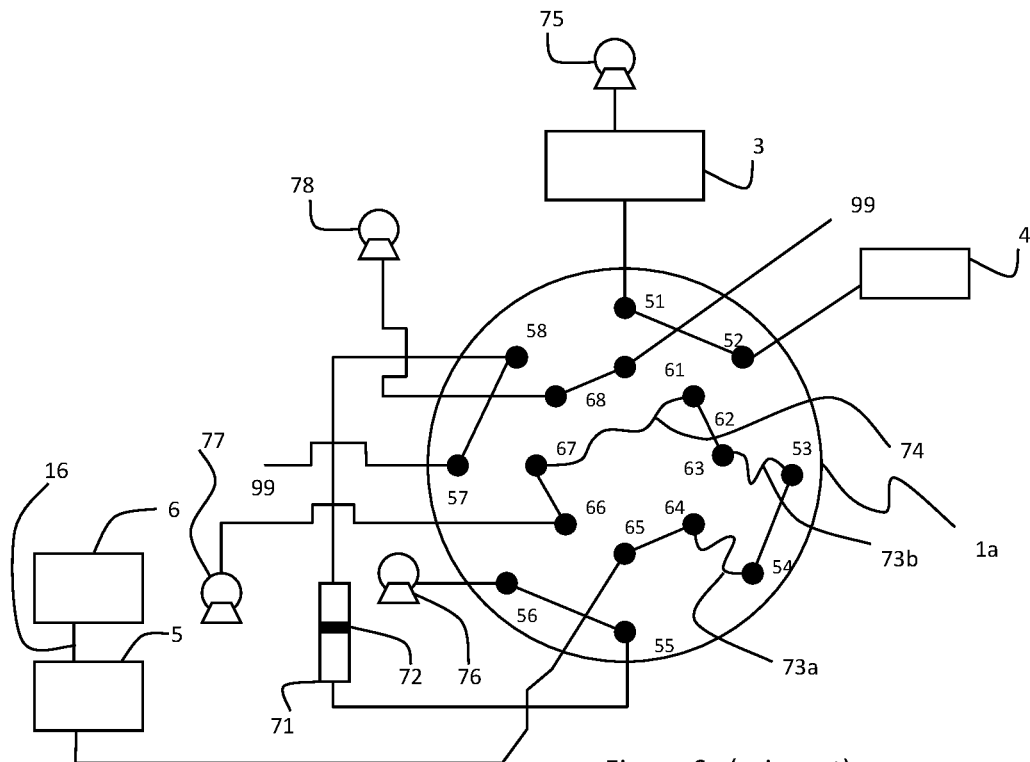
FIGS. 6*a* and 6*b*, which are prior art, are flow diagrams of the fluid diverting module of FIG. 1, showing an example of fluidic connectivity of the peripheral modules and other fluid handling devices (three fluid moving devices, three fluid holding devices, and a filtration module) are connected to the fluid diverting device; the first fluid moving device, which is not in fluid communication with the first and the second fluid holding devices, is upstream of the fluid diverting device in FIG. 6*a* and downstream of the fluid diverting device in FIG. 6*b*; the second fluid moving device which is responsible for moving fluid through the filtration module is connected to the sample delivery module via the filtration module; the sample delivery module is equipped with a robotic device which moves fluid to the sample analysis module or to waste; the third fluid moving device is connected to the sample delivery module via the fluid holding devices; the fourth fluid moving device is connected to waste. The fluid diverting device is in one of the four inject positions.
Figure 6B:
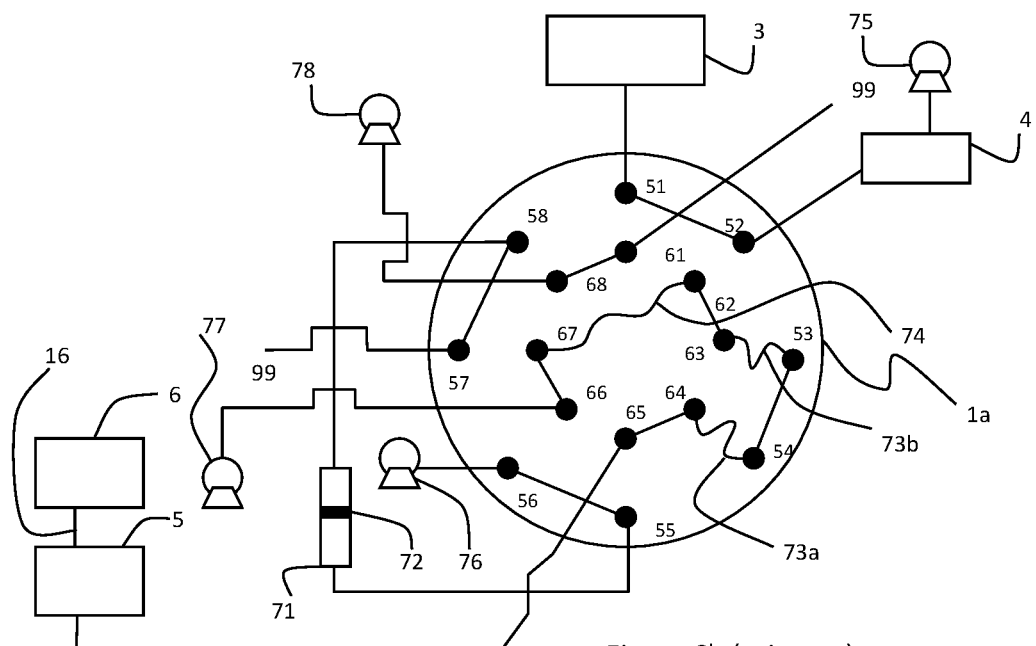
Figure 7:
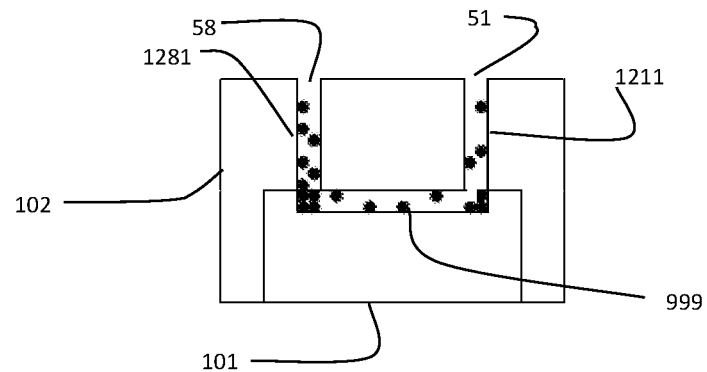
FIG. 7, which is a prior art, is a cross-sectional (side) view of a configured lumen, which is formed out of two stationary flow-paths and one movable flow-path inside the fluid diverting device of FIG. 2. Physical location of solid particulates (shown in solid black color) inside the lumen is randomly assigned for illustration purposes only.

Referring to FIGS. 9*b*1, 9*b*2, and 9*b*3, a cross-sectional bottom-side POV of stator 102 is shown. All three figures have the same view of the same object. The purpose of three separate figures is to clearly label all relevant components. Eight stationary flow-paths (passageways) of the inner ring (1112, 1122, 1132, 1142, 1152, 1162, 1172, and 1182) are shown (FIG. 9*b*2). These flow-paths (passageways) are responsible for making fluid communications between connectors 111 to 118 and the rotor. Each stationary flow-paths of the inner ring has two open termini; one contacting the rotor (1113, 1123, 1133, 1143, 1153, 1163, 1173, and 1183; FIG. 9*b*3) and the other contacting the connectors of the outer ring of valve 1*b* (1111, 1121, 1131, 1141, 1151, 1161, 1171, and 1181; FIG. 9*b*1).

Figure 10:
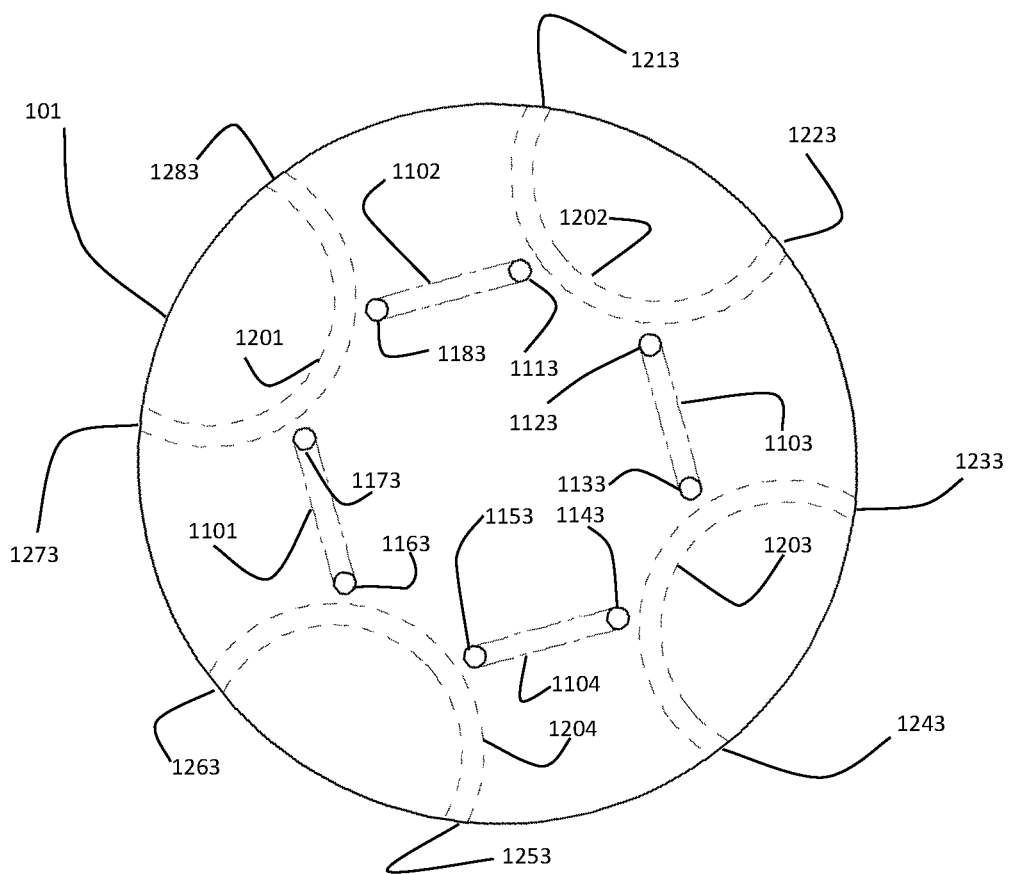
FIG. 10 is a top-down cross-sectional POV of the rotor of the fluid diverting device of the fluid diverting module of FIG. 1. Arcuates inside the rotor are shown. The inner (shown as linear cavities) and the outer (shown as semi-circular cavities) ring arcuates are embedded inside the three-dimensional boundary of the rotor. Each plane formed by the individual inner ring arcuates is parallel to the longitudinal axis (the axis of rotation) of the rotor of the fluid diverting device. Hence projections of the inner ring arcuates appear as linear although the arcuates are curved. The linear appearance of the inner ring arcuates is from a simulated aggregate of all projections from infinitesimally small slices along the longitudinal axis (the axis of rotation). They are simplified as linear cavities in the inner ring for clarity. The planes of the outer ring arcuates are perpendicular to the axis of rotation of the rotor of the fluid diverting device. Hence the projections of the outer ring arcuates appears semi-circular (similar to their real shapes). The fluid diverting module is in one of the four load positions.

Referring to FIG. 10, a top-down POV of rotor 101 is shown. Four out of eight movable flow-paths (1201 to 1204) of rotor 101 are responsible in establishing fluid communications between two adjacent stationary flow-paths of the outer ring of stator 102. The movable flow-paths form arcuates in three-dimensional boundary of the rotor so that the flow to and from valve 1*b* experiences minimal tortuosity during the movement of the fluid. Arcuates 1201 to 1204 are shown by dashed lines.

Referring still to FIG. 10, the plane formed by the individual inner ring arcuates is parallel to the longitudinal axis (the axis of rotation) of rotor 101. Hence projections of the inner ring arcuates (1101 to 1104) appear as linear cavities although the arcuates are curved. The linear appearance of the inner ring arcuates (shown by alternating longer and shorter dashes) is from a simulated aggregate of all projections from infinitesimally small slices along the longitudinal axis (the axis of rotation). They are drawn as linear cavities in the inner ring for simplicity of the illustration.

Referring still to FIG. 10, movable flow-paths 1101 to 1104 are responsible for establishing fluid communications between two adjacent stationary flow-paths of the inner ring of stator 102. The movable flow-paths form arcuates in three-dimensional boundary of the rotor so that the flow to and from valve 1*b* experiences minimal tortuosity during the fluidic movement.

Referring still to FIG. 10, each movable flow-paths have two termini, each contacting a stationary flow-path of stator 102 through the respective terminus of the stationary flow-paths (passageways).

Referring to FIGS. 8*a*, 9*b*2 and 10, movable flow-path 1101, in this particular position of valve 1*b*, connects stationary flow-paths 1162 and 1172. In other words, movable flow-path 1101, in this particular valve position, makes fluid communications between connectors 116 and 117. Similarly, movable flow-path 1102, in this particular valve position, connects stationary flow-paths 1182 and 1112, which, in turn, makes fluid communications between connectors 118 and 111. Movable flow-paths 1103 and 1104 make similar fluid communications from connector 112 to 113 and 114 to 115, respectively.

Referring still to FIGS. 8*a*, 9*b*2 and 10, movable flow-path 1201, in this particular valve position, connects stationary flow-paths 1272 and 1282, which, in turn, makes fluid communications between connectors 127 and 128. Similarly, movable flow-path 1202, in this particular valve position, connects stationary flow-paths 1212 and 1222, which, in turn, makes fluid communication between connectors 121 and 122. Movable flow-paths 1203 and 1204 make similar fluid communications from connector 123 to 124 and 125 to 126, respectively.

Figure 11:
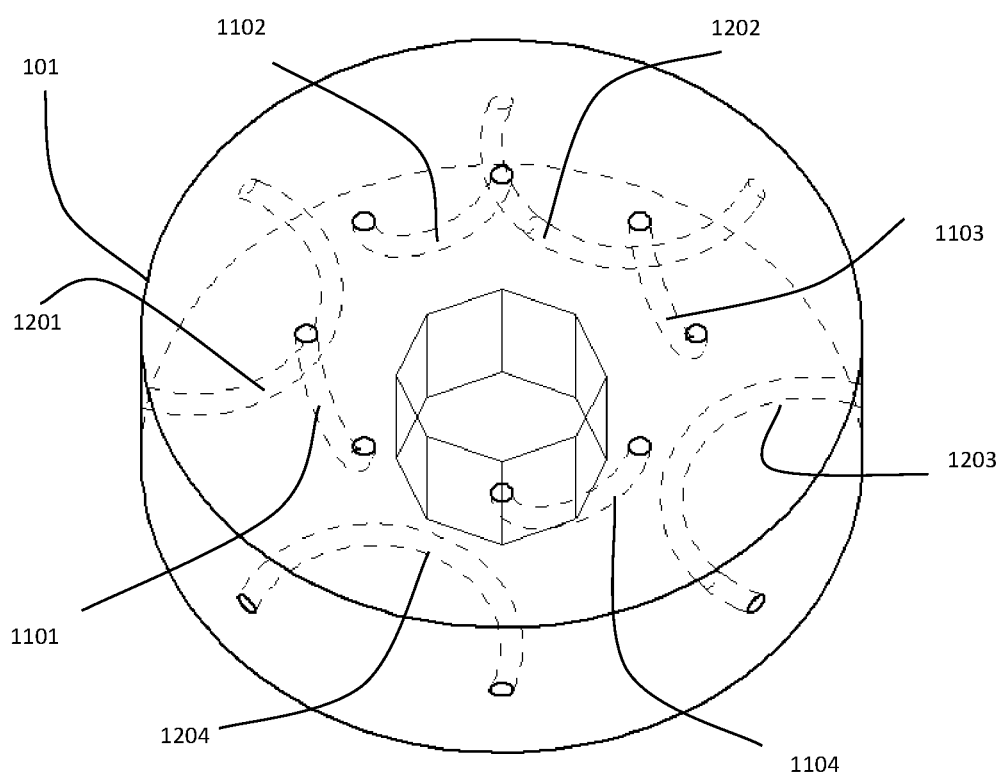
FIG. 11 is a top-side POV of the rotor of the fluid diverting device of the fluid diverting module of FIG. 1, which is in the same load position as FIG. 10.

Referring to FIG. 11, a top-side POV of rotor 101 is shown for the same valve position of FIG. 10. All eight movable flow-paths, which establish fluid communications between respective adjacent ports, are shown. Inner ring flow-paths (1101, 1102, 1103, and 1104), which are represented as linear cavities for simplicity in FIG. 10, are visible in their actual shapes in FIG. 11.

Figure 12:
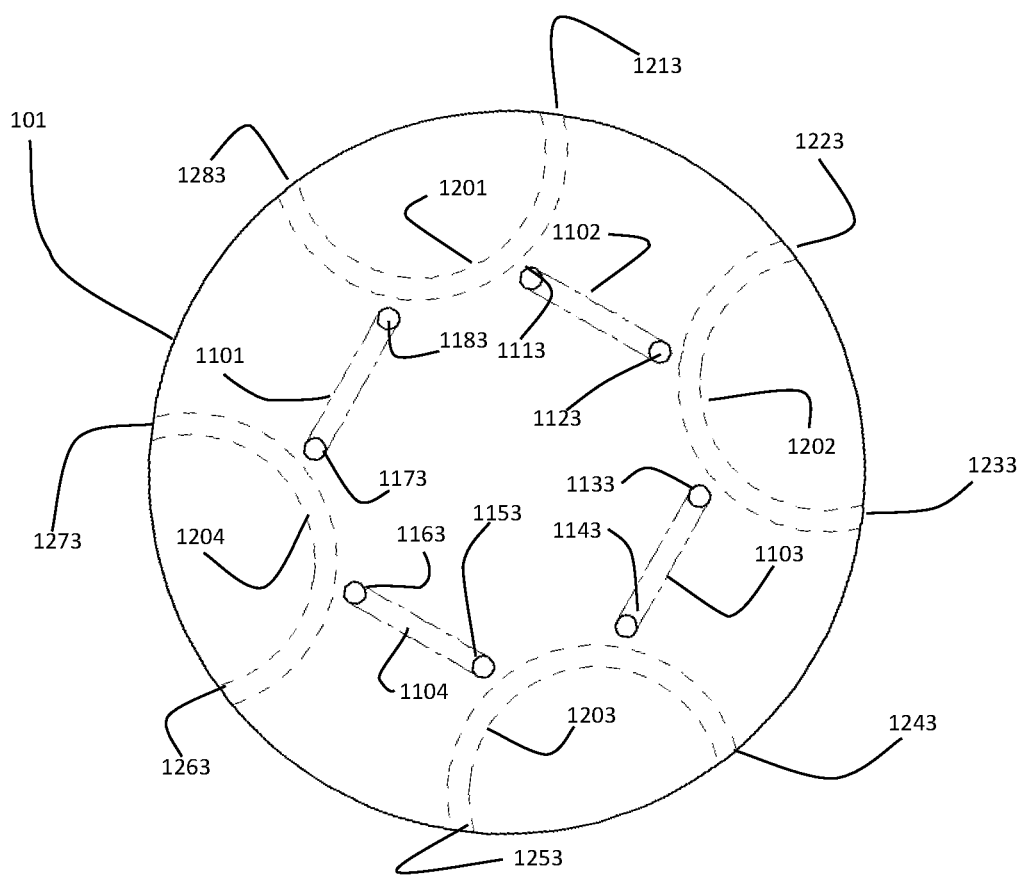
FIG. 12 is a top-down cross-sectional POV of the rotor of the fluid diverting device of FIG. 10. Arcuates inside the rotor are shown. The valve is in one of the four inject positions. The rotor is moved by an angle of 45° clock-wise from the position shown in FIG. 10.

Referring to FIG. 12, a second position of valve 1*b* is shown. The rotor has been moved by 45° clockwise (or 315° anti-clockwise) from the position shown in FIG. 10 to establish a second set of fluid communications.

Referring still to FIG. 12, in the second valve position, movable flow-paths 1101, 1102, 1103, and 1104 establish fluid communications between 117 and 118, 111 and 112, 113 and 114, and 115 and 116, respectively. Also, in this position, movable flow-paths 1201, 1202, 1203, and 1204 establish fluid communications between 128 and 121, 122 and 123, 124 and 125, and 126 and 127, respectively. Inner ring flow-paths are shown as linear cavities following simplicity as described above for FIG. 10.

Figure 13:
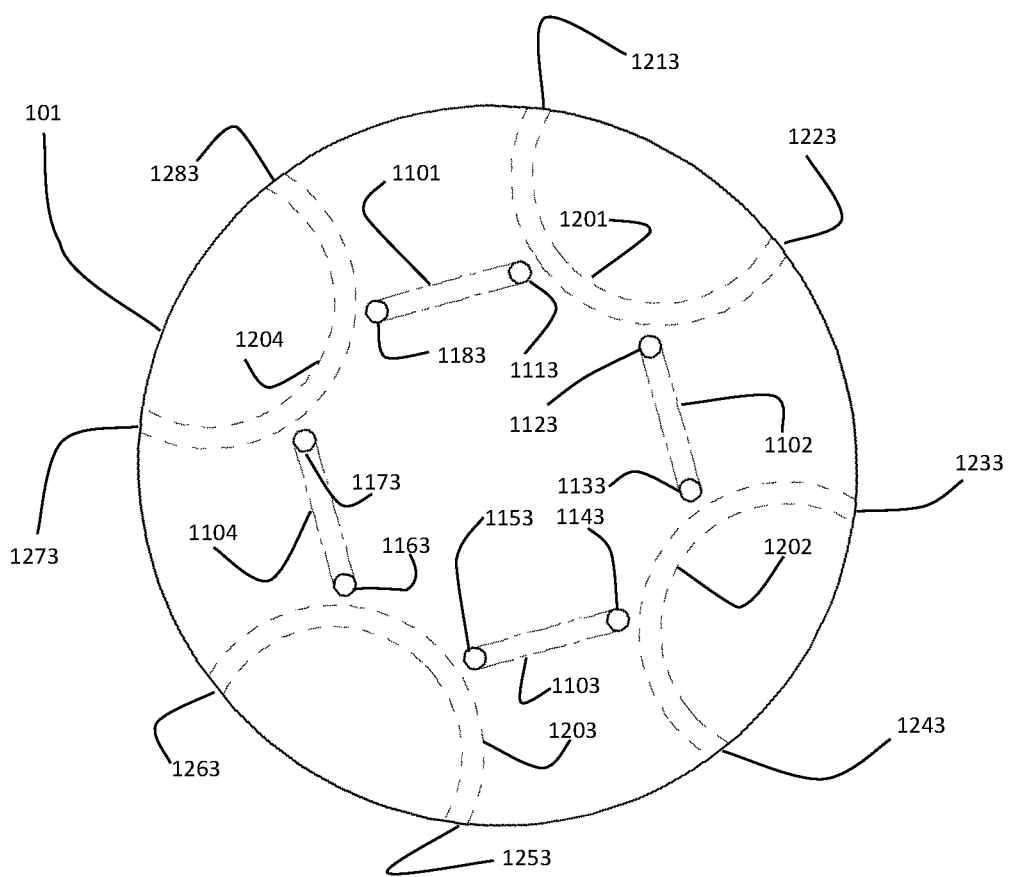
FIG. 13 is a top-down cross-sectional POV of the rotor of the fluid diverting device of FIG. 10. The rotor is moved by an angle of 45° clock-wise from the position shown in FIG. 12.

Referring to FIG. 13, a third position of valve 1*b* is shown. The rotor has been moved by 45° clockwise (or 315° anti-clockwise) from the position shown in FIG. 12 to establish a third set of fluid communications.

Referring still to FIG. 13, in the third valve position, movable flow-paths 1101, 1102, 1103, and 1104 establish fluid communications between 118 and 111, 112 and 113, 114 and 115, and 116 and 117 respectively. Also, in this position, movable flow-paths 1201, 1202, 1203, and 1204 establish fluid communications between 121 and 122, 123 and 124, 125 and 126, and 127 and 128, respectively. Inner ring flow-paths are shown as linear cavities following simplicity as described above for FIG. 10.

Figure 14:
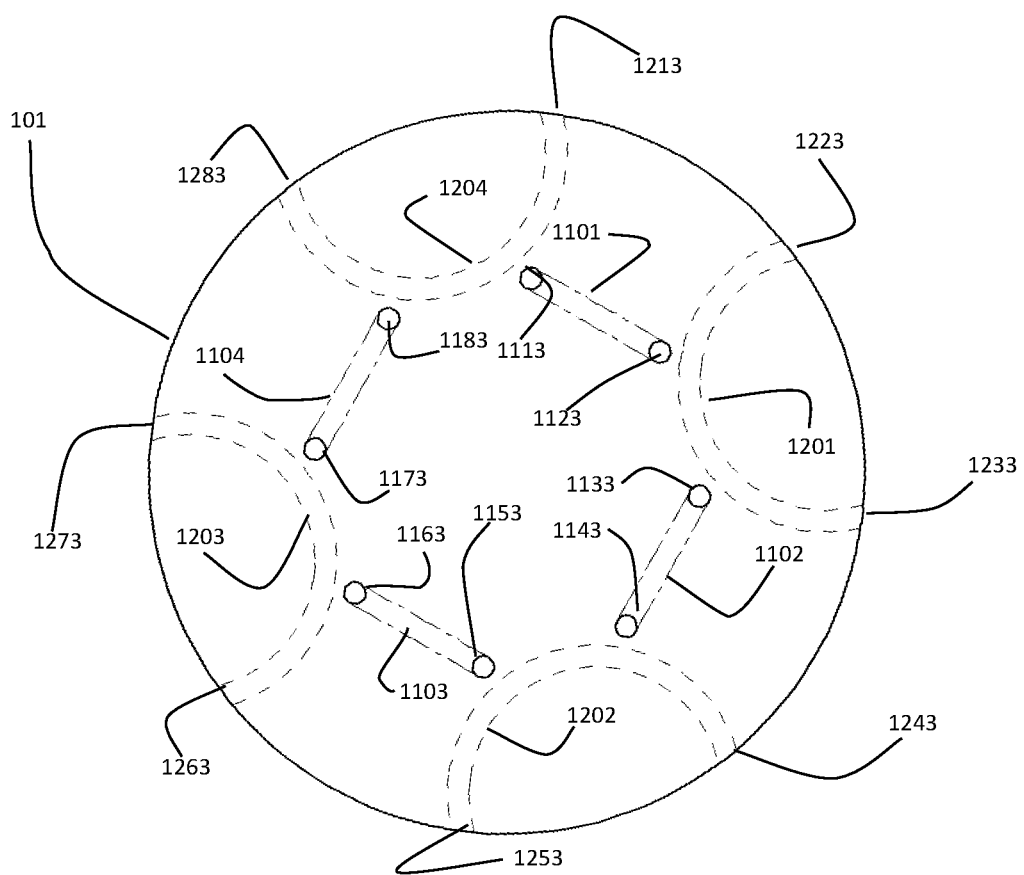
FIG. 14 is a top-down cross-sectional POV of the rotor of the fluid diverting device of FIG. 10. The rotor is moved by an angle of 45° clock-wise from the position shown in FIG. 13.

Referring to FIG. 14, a fourth position of valve 1*b* is shown. The rotor has been moved by 45° clockwise (or 315° anti-clockwise) from the position shown in FIG. 13 to establish a fourth set of fluid communications.

Referring still to FIG. 14, in the fourth valve position, movable flow-paths 1101, 1102, 1103, and 1104 establish fluid communications between 111 and 112, 113 and 114, 115 and 116, and 117 and 118 respectively. Also, in this position, movable flow-paths 1201, 1202, 1203, and 1204 establish fluid communications between 122 and 123, 124 and 125, 126 and 127, and 128 and 121, respectively. Inner ring flow-paths are shown as linear cavities following simplicity as described above for FIG. 10.

Figure 15:
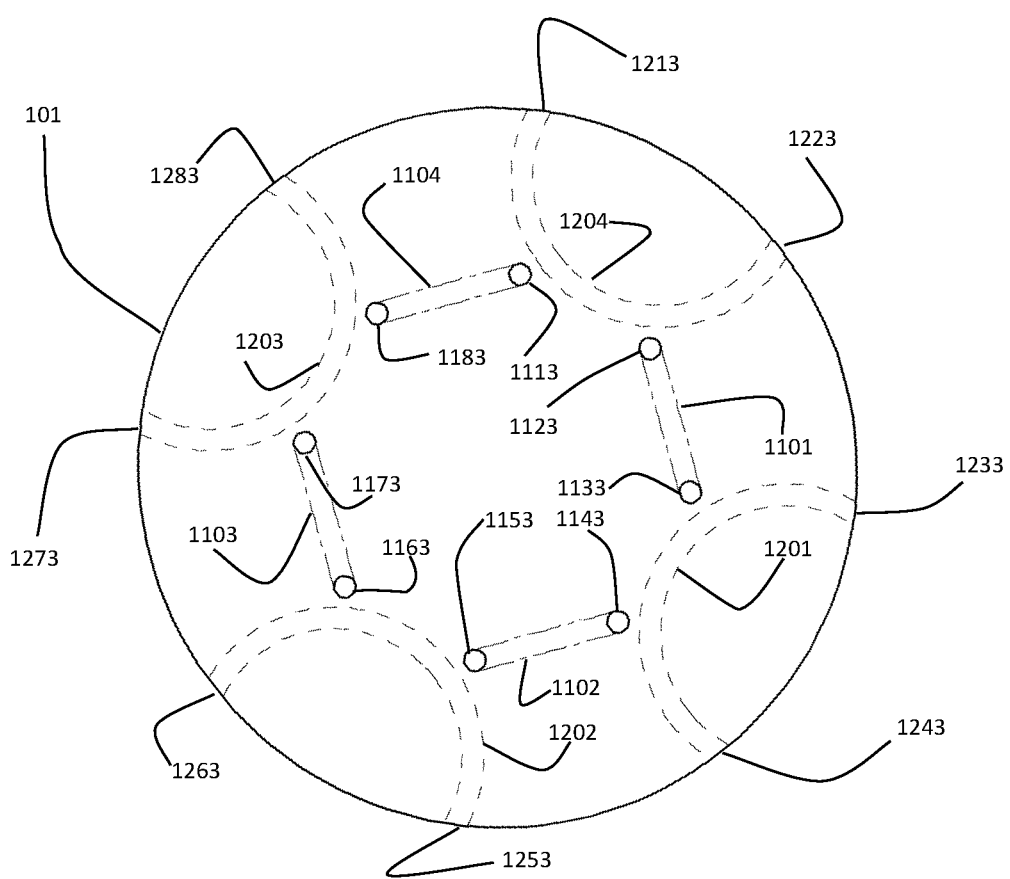
FIG. 15 is a top-down cross-sectional POV of the rotor of the fluid diverting device of FIG. 10. The rotor is moved by an angle of 45° clock-wise from the position shown in FIG. 14.

Referring to FIG. 15, a fifth position of valve 1*b* is shown. The rotor has been moved by 45° clockwise (or 315° anti-clockwise) from the position shown in FIG. 14 to establish a fifth set of fluid communications.

Referring still to FIG. 15, in the fifth valve position, movable flow-paths 1101, 1102, 1103, and 1104 establish fluid communications between 112 and 113, 114 and 115, 116 and 117, and 118 and 111, respectively. Also, in this position, movable flow-paths 1201, 1202, 1203, and 1204 establish fluid communications between 123 and 124, 125 and 126, 127 and 128, and 121 and 122, respectively. Inner ring flow-paths are shown as linear cavities following simplicity as described above for FIG. 10.

Figure 16:
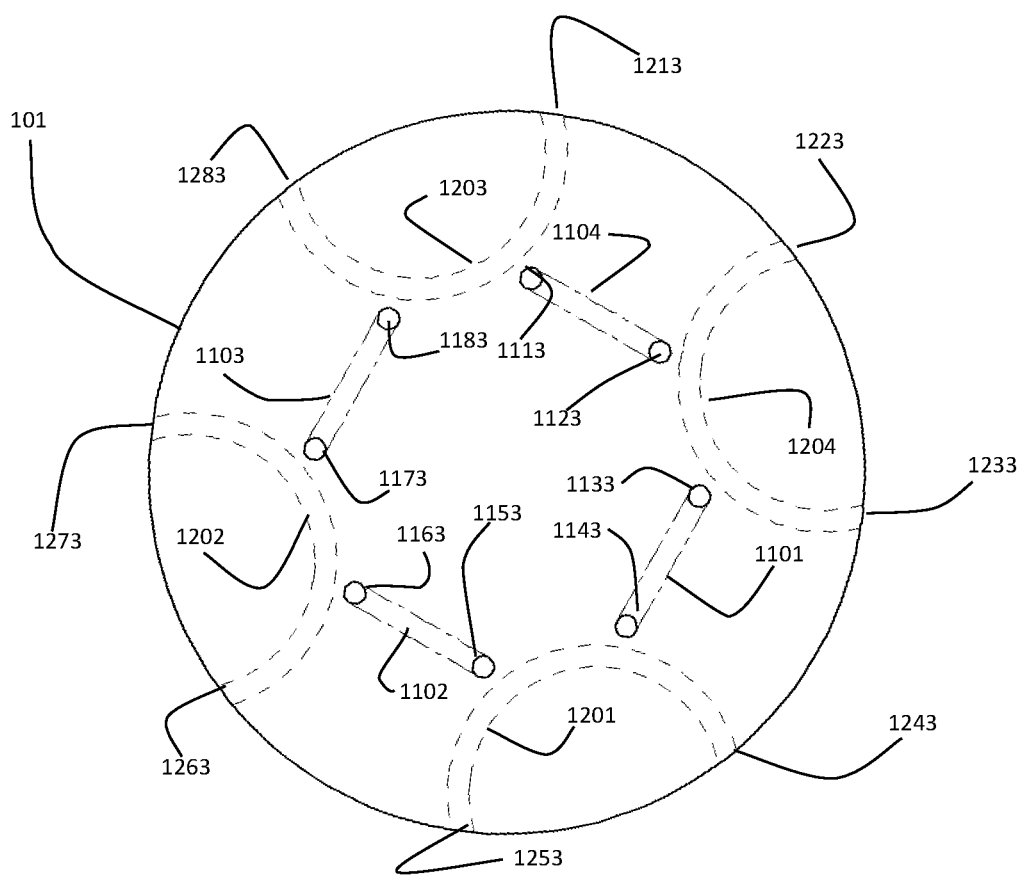
FIG. 16 is a top-down cross-sectional POV of the rotor of the fluid diverting device of FIG. 10. The rotor is moved by an angle of 45° clock-wise from the position shown in FIG. 15.

Referring to FIG. 16, a sixth position of valve 1*b* is shown. The rotor has been moved by 45° clockwise (or 315° anti-clockwise) from the position shown in FIG. 15 to establish a sixth set of fluid communications.

Referring still to FIG. 16, in the sixth valve position, movable flow-paths 1101, 1102, 1103, and 1104 establish fluid communications between 113 and 114, 115 and 116, 117 and 118, and 111 and 112 respectively. Also, in this position, movable flow-paths 1201, 1202, 1203, and 1204 establish fluid communications between 124 and 125, 126 and 127, 128 and 121, and 122 and 123, respectively. Inner ring flow-paths are shown as linear cavities following simplicity as described above for FIG. 10.

Figure 17:
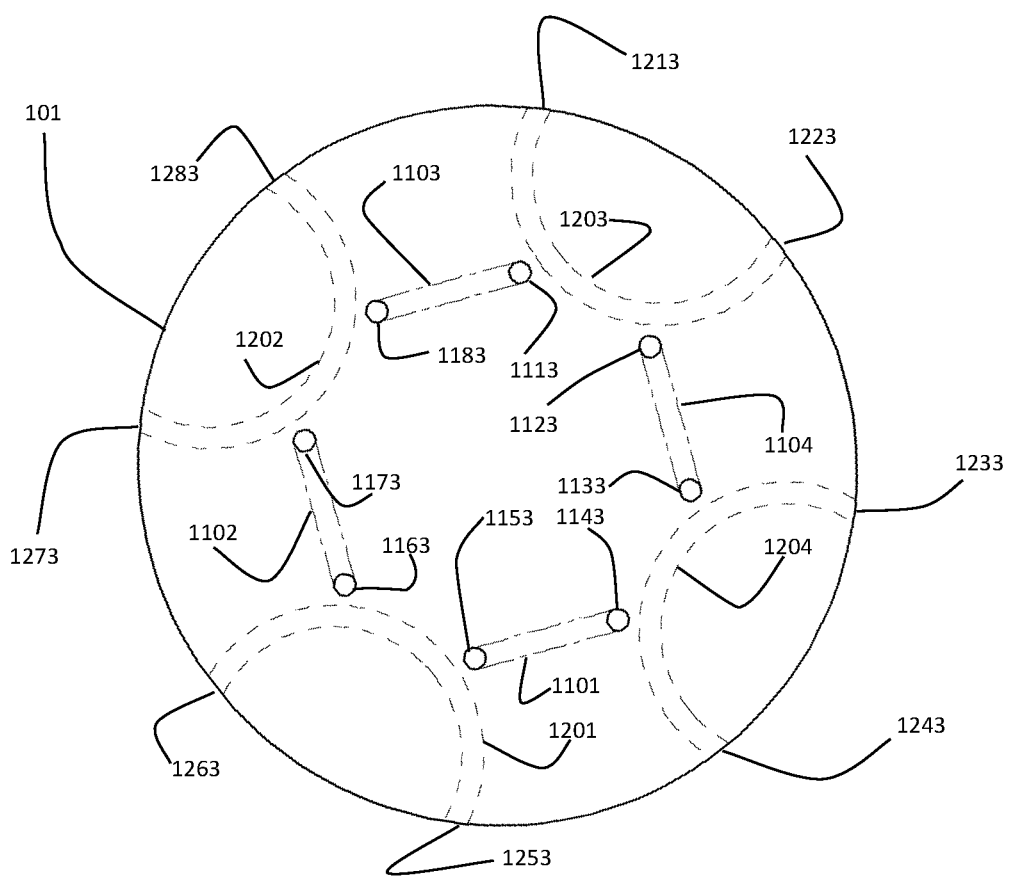
FIG. 17 is a top-down cross-sectional POV of the rotor of the fluid diverting device of FIG. 10. The rotor is moved by an angle of 45° clock-wise from the position shown in FIG. 16.

Referring to FIG. 17, a seventh position of valve 1*b* is shown. The rotor has been moved by 45° clockwise (or 315° anti-clockwise) from the position shown in FIG. 16 to establish a seventh set of fluid communications.

Referring still to FIG. 17, in the seventh valve position, movable flow-paths 1101, 1102, 1103, and 1104 establish fluid communications between 114 and 115, 116 and 117, 118 and 111, and 112 and 113 respectively. Also, in this position, movable flow-paths 1201, 1202, 1203, and 1204 establish fluid communications between 125 and 126, 127 and 128, 121 and 122, and 123 and 124, respectively. Inner ring flow-paths are shown as linear cavities following simplicity as described above for FIG. 10.

Figure 18:
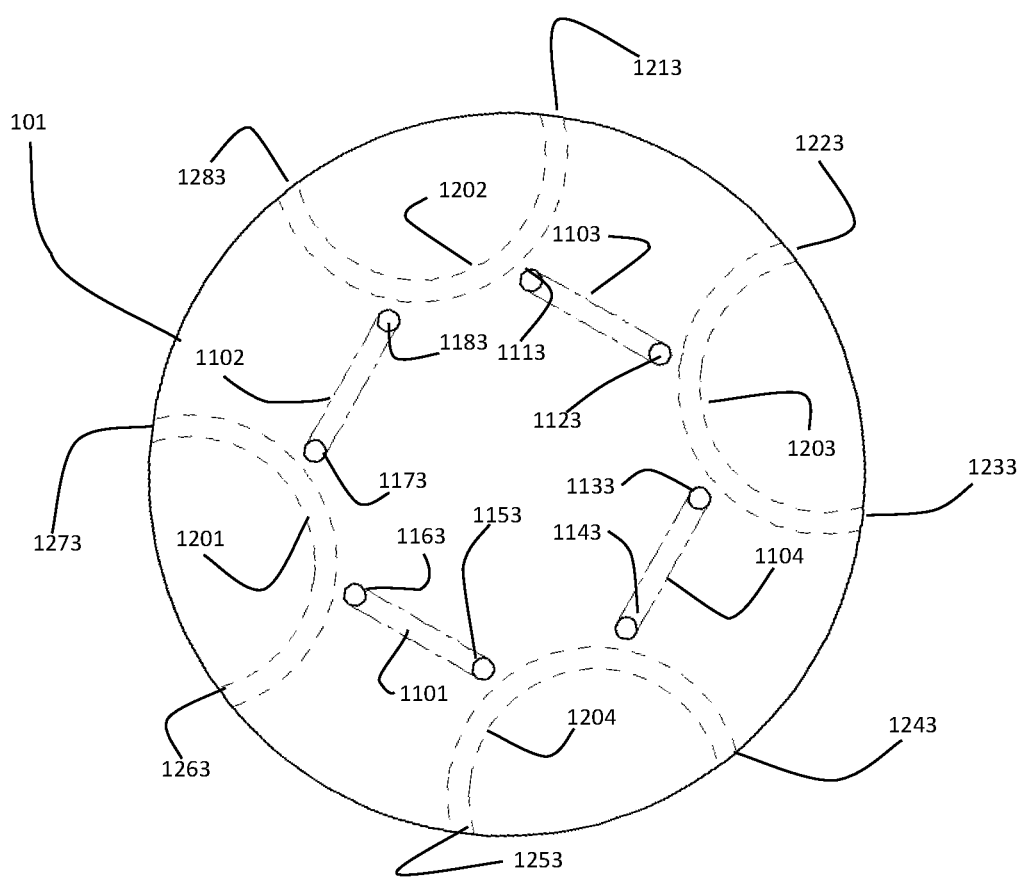
FIG. 18 is a top-down cross-sectional POV of the rotor of the fluid diverting device of FIG. 10. The rotor is moved by an angle of 45° clock-wise from the position shown in FIG. 17.

Referring to FIG. 18, an eighth position of valve 1*b* is shown. The rotor has been moved by 45° clockwise (or 315° anti-clockwise) from the position shown in FIG. 17 to establish an eighth set of fluid communications.

Referring still to FIG. 18, in the eighth valve position, movable flow-paths 1101, 1102, 1103, and 1104 establish fluid communications between 115 and 116, 117 and 118, 111 and 112, and 113 and 114 respectively. Also, in this position, movable flow-paths 1201, 1202, 1203, and 1204 establish fluid communications between 126 and 127, 128 and 121, 122 and 123, and 124 and 125, respectively. Inner ring flow-paths are shown as linear cavities following simplicity as described above for FIG. 10.

Figure 19:
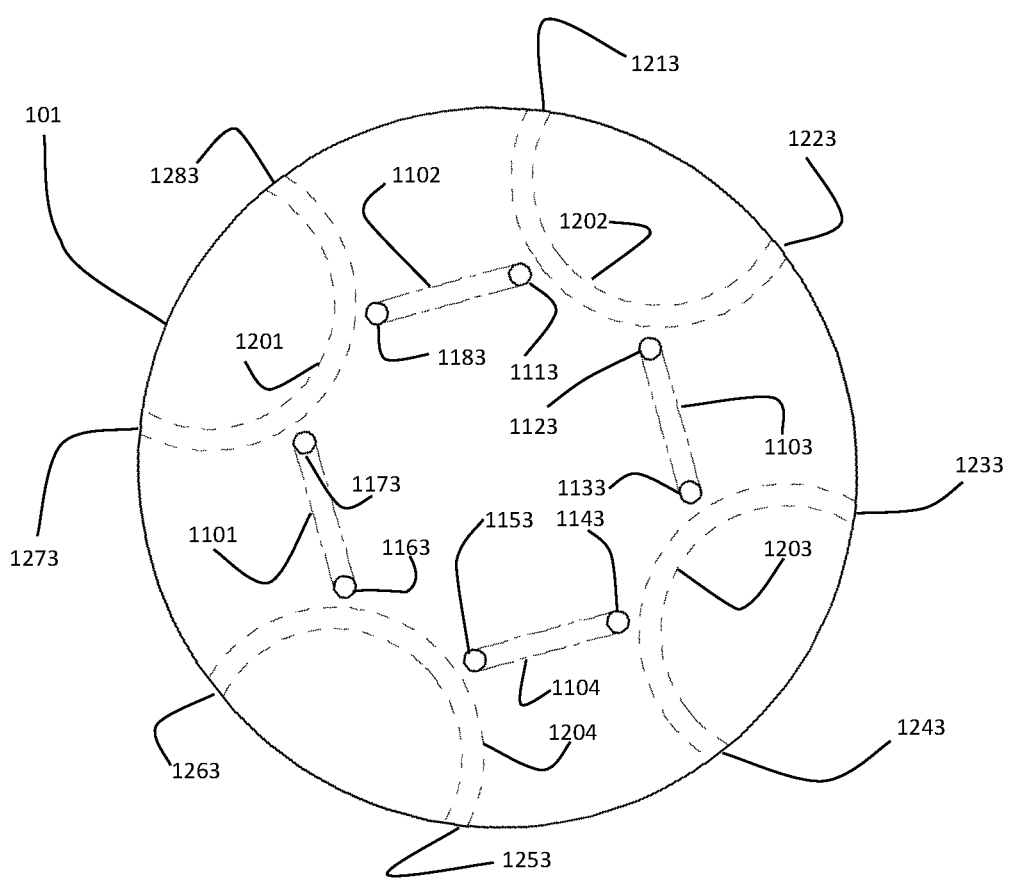
FIG. 19 is a top-down cross-sectional POV of the rotor of the fluid diverting device of FIG. 10. The rotor is moved by an angle of 45° clock-wise from the position shown in FIG. 18. It is important to note that FIG. 19 represents a position identical to FIG. 10. In other words.

Referring to FIG. 19, valve 1b has returned to the first position. The rotor has been moved by 45° clockwise (or 315° anti-clockwise) from the position shown in FIG. 18 and the valve has achieved the first set of fluid communications. Inner ring flow-paths are shown as linear cavities following simplicity as described above for FIG. 10. FIGS. 10 and 19 represent the identical valve positions.

Figure 20A:
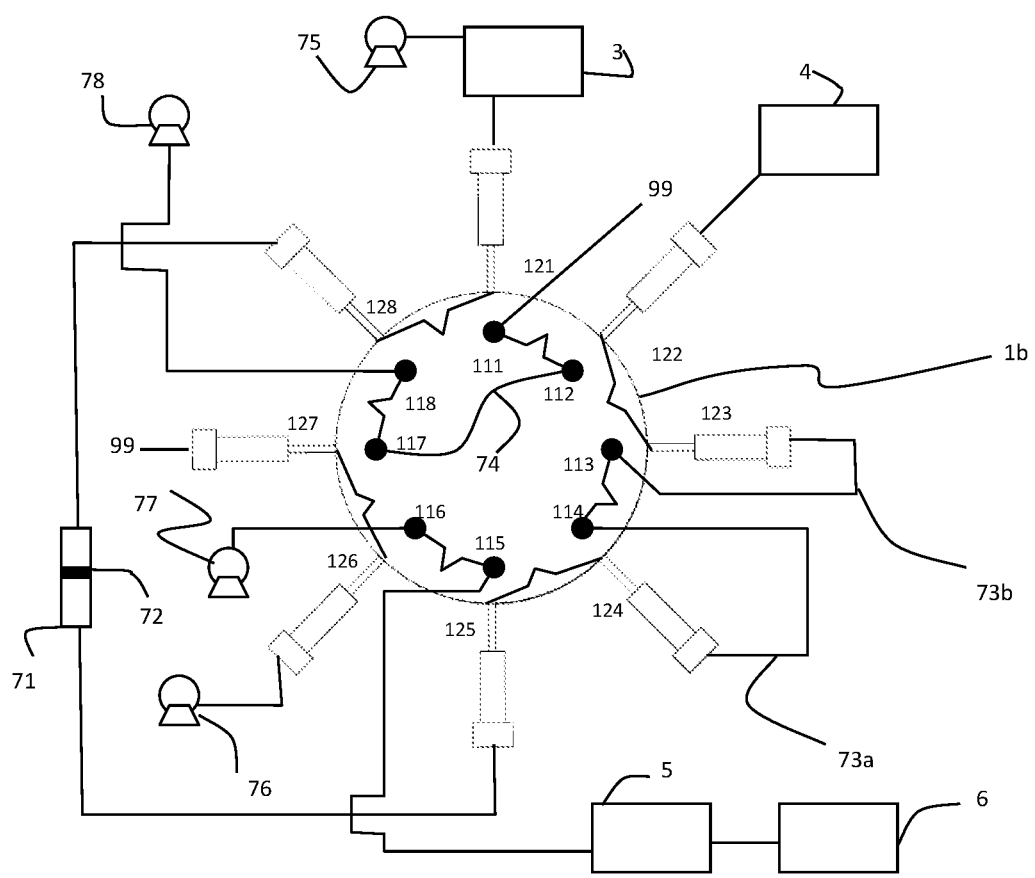
FIGS. 20a and 20b are flow diagrams of the fluid diverting module of FIG. 1; the fluid diverting device is in a load position. Movable flow-paths are shown as jagged lines to indicate that the movable flow-paths are three-dimensional arcuates. Connectors for all ports on the outer ring are shown. Connectors to the inner ring ports are not visible from the top-down POV. The first fluid moving device, which is in a fluid communication with the first and the second fluid holding devices, is upstream of the fluid diverting device in FIG. 20a and downstream of the fluid diverting device in FIG. 20b.
Figure 20B:
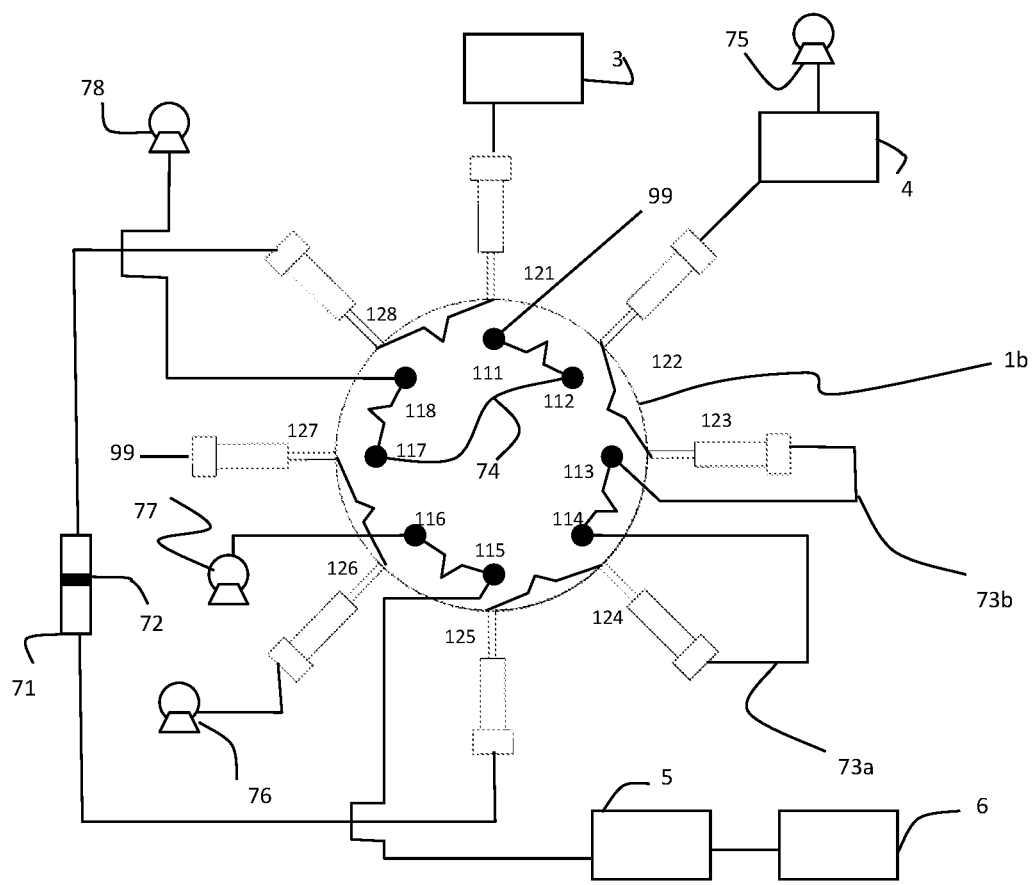

Referring to FIGS. 20a and 20b, flow diagrams of a fluid diverting device of the fluid diverting module of the present invention are shown. The fluid diverting device is valve 1b. Connectors of the outer ring of valve 1b (121 to 128), which are on the plane of the valve, are shown. Connectors of the inner ring of valve 1b (111 to 118), which are perpendicular to the plane of the valve, are shown as black dots.

Referring still to FIGS. 20a and 20b, sample source 3 is in a fluid communication with sample collection module 4 via fluid holding devices 73a and 73b. This is one of the four 'load' positions of the 'load' configuration. The positions in FIG. 12, FIG. 14, FIG. 16, and FIG. 18 represent four load positions of valve 1b.

Referring to FIG. 20a, fluid moving device 75, which is located upstream of valve 1b, pushes fluid from sample source 3 to valve 1b.

Referring to FIG. 20b, fluid moving device 75, which is located downstream of valve 1b, pulls fluid from sample source 3 to valve 1b.

Figure 21A:
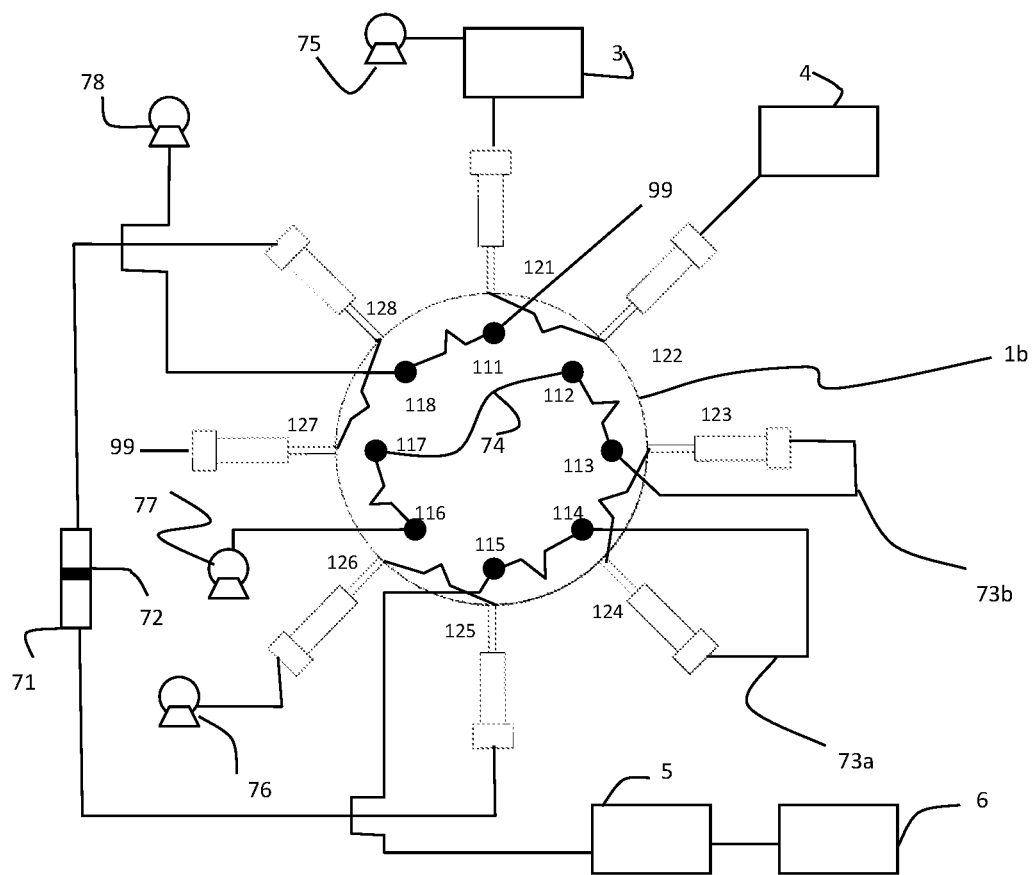
FIGS. 21a and 21b are flow diagrams of the fluid diverting module of FIG. 1; the fluid diverting device is in an inject position. Movable flow-paths are shown as jagged lines to indicate that the movable flow-paths are three-dimensional arcuates. Connectors for all ports on the outer ring are shown. Connectors to the inner ring ports are not visible from the top-down POV. The first fluid moving device, which is not in fluid communication with the first and the second fluid holding devices, is upstream of the fluid diverting device in FIG. 21a and downstream of the fluid diverting device in FIG. 21b.
Figure 21B:
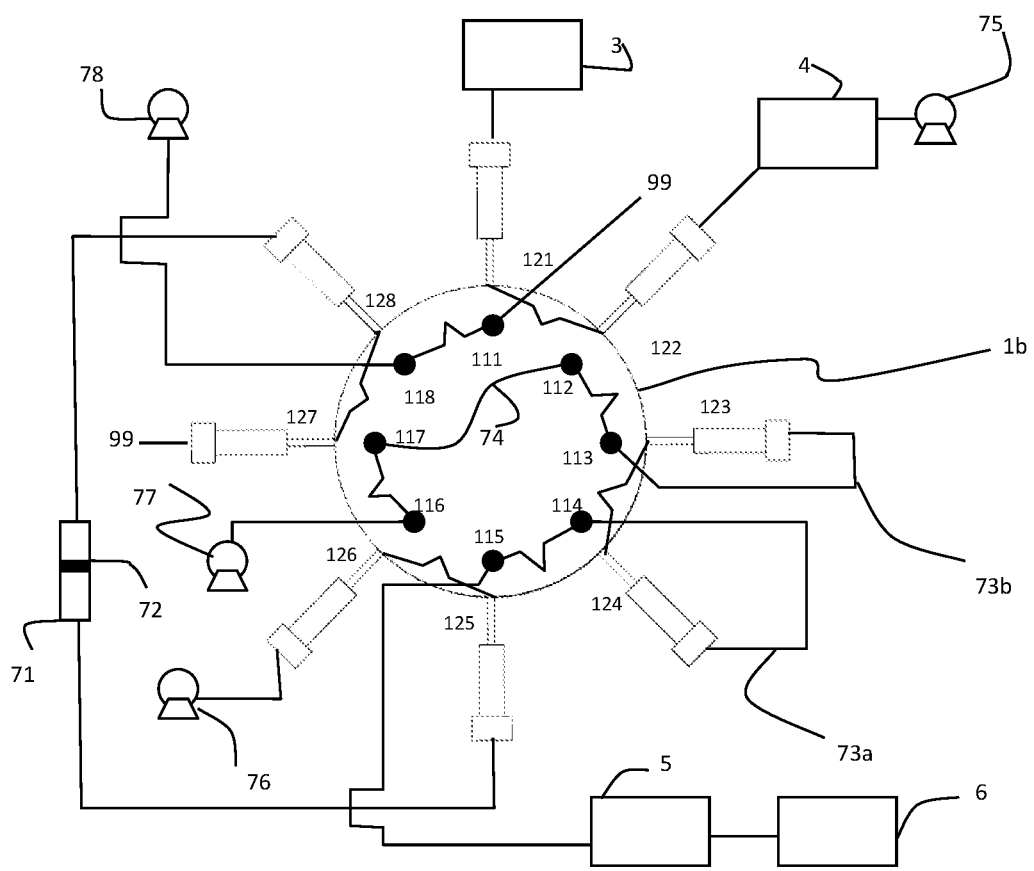

Referring to FIGS. 21a and 21b, the 'inject' configuration of valve 1b are shown. Fluid moving device 75 is upstream and downstream of valve 1b in FIGS. 21a and 21b respectively.

Referring still to FIGS. 21a and 21b, sample source 3 is in a fluid communication with sample collection module 4 bypassing fluid holding devices 73a and 73b. This is an 'inject' position. The configuration is achieved from one of the four 'inject' positions shown in FIG. 10, FIG. 13, FIG. 15, and FIG. 17.

Referring back to FIG. 20a or 20b, when sample source 3 contains solid particulates, the fluid containing solids flows into the movable flow-path between connectors 121 and 128. For simplicity, ports of valve 1b are not labeled. Denominations of individual connectors which lead to specific ports are used to as the denominations of individual ports from hereon. In other words, a reference of ports 121 or 128 means a reference of respective ports which connectors 121 or 128 are connected to.

Referring still to FIG. 20a or 20b, flow-path 1201 (FIG. 12), flow-path 1204 (FIG. 14), flow-path 1203 (FIG. 16), and flow-path 1202 (FIG. 18) are the movable flow-paths that receive fluids containing solids from the sample source during the load configuration of valve 1b.

Referring still to FIG. 20a or 20b, if valve 1b is moved to one 'load' position from one other 'load' position (i.e., the valve holds its 'load' configuration in the next position), the movable flow-path which received fluids containing solids in the last position is moved between ports 126 and 127. Fluid moving device 76 moves at least a portion of the solids out of the movable flow-path in question during this time.

Referring back to FIG. 21a or 21b, when sample source 3 contains solid particulates, the fluid containing solids flows into the movable flow-path between ports 121 and 122.

Referring still to FIG. 21a or 21b, flow-path 1201 (FIG. 13), flow-path 1204 (FIG. 15), flow-path 1203 (FIG. 17), and flow-path 1202 (FIG. 19) are the movable flow-paths which receive fluids containing solids from the sample source.

Referring still to FIG. 21a or 21b, if valve 1b is moved to one 'inject' position from one other 'inject' position (i.e., the valve holds its 'inject' configuration in the next position), the movable flow-path which received fluids containing solids in the last position is moved between ports 127 and 128. Fluid moving device 76 moves at least a portion of the solids from the movable flow-path in question during this time.

Referring to FIGS. 20a and 21a or 20b and 21b, if valve 1b is moved from a 'load' position to an 'inject' position (i.e., the valve moves from its 'load' configuration to the 'inject' configuration in the next position), the movable flow-path which received fluid containing solids in the last position is moved between ports 127 and 128. Fluid moving device 76 moves at least a portion of the solids from the movable flow-path in question during this time.

Referring still to FIGS. 20a and 21a or 20b and 21b, if valve 1b is moved from an 'inject' position to a 'load' position (i.e., the valve moves from its 'inject' configuration to the 'load' configuration in the next position), the movable flow-path which received fluid containing solids in the last position is moved between ports 126 and 127. Fluid moving device 76 moves at least a portion of the solids from the movable flow-path in question during this time.

Figure 22A:
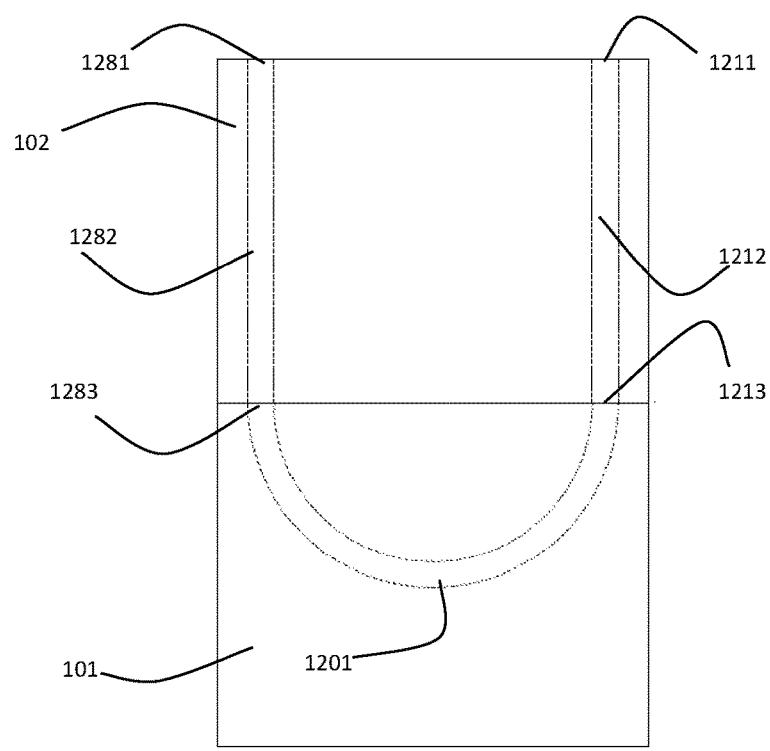
FIGS. 22a and 22b are cross-sectional POV (side and top-side) of a single arcuate inside the rotor; alignment of the arcuate to two adjacent stationary flow-paths of the stator is shown; internal diameter of the arcuate is same as those of the stationary flow-paths.

Referring to FIG. 22a, a cross-sectional POV of a three-dimensional movable flow-path forming a lumen with two stationary flow-paths is shown.

Referring back to FIGS. 9a, 12 and 22a, movable flow-path 1201 establishes a fluid communication between stationary flow-paths 1212 and 1282. Flow-paths 1212 and 1282 connects ports 121 and 128 via contact points 1213 and 1283, respectively, at the junction between the stator and the rotor.

Referring still to FIG. 22a, stationary flow-paths 1212 and 1282 form a lumen with movable flow-path 1201 whereby fluidic motion in and out of the movable flow-path experience minimal tortuosity due to the tangential alignments of flow-path 1212 and 1282 to 1201 at the junction.

Figure 22B:
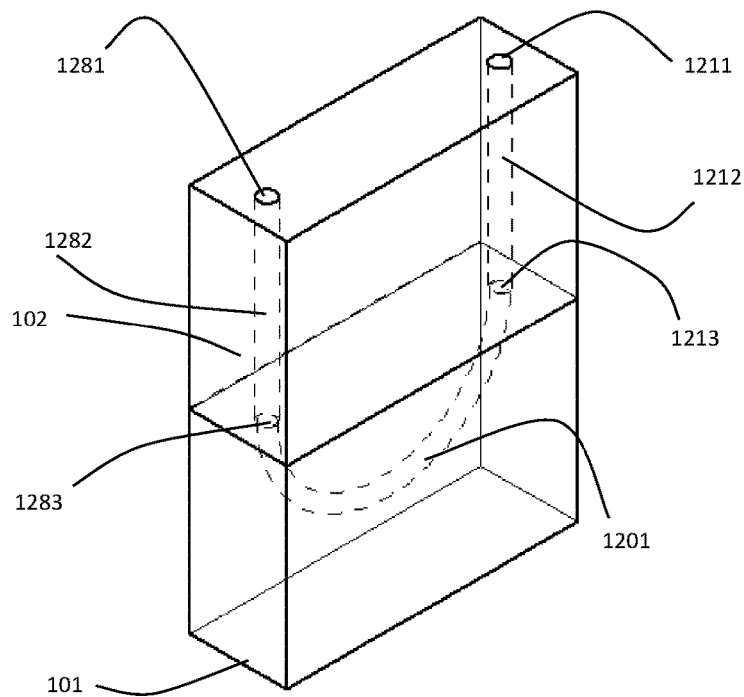

Referring to FIG. 22b, a side POV of the same lumen of FIG. 22a is shown for visual understanding of the three-dimensional lumen formed by the aligned flow-paths.

Referring back to FIGS. 12, 20a, and 22a or 12, 20b, and 22a, valve 1b is in one of the four available load positions. In this position, fluids containing solids pass through movable flow-path 1201 with less difficulty. Accumulation of solids inside the formed lumen is less since there is no corner-bends, where a slurry experiences difficulty in its journey through the movable flow-path.

Referring back to FIG. 21a or 21b, when the same movable flow-path (1201) is placed between ports 127 and 128 in one of the four inject positions of the valve, fluid moving device 76 drives solids out of 1201 with less difficulty.

Referring back to FIG. 22a, internal radii of the stationary flow-paths and the movable flow-path are same. In other words, cross-sectional areas of the stationary flow-paths and the movable flow-path at the points of contact, which are 1283 and 1213, are the same.

Figure 23A:
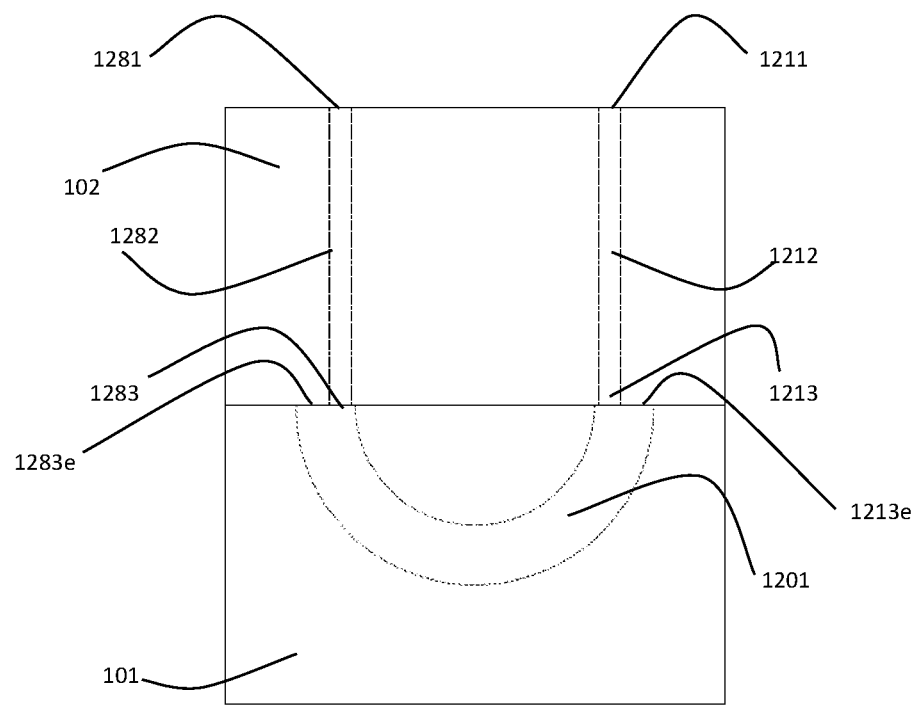
FIGS. 23a and 23b are cross-sectional POV (side and top-side) of a single arcuate inside the rotor; alignment of the arcuate to two adjacent stationary flow-paths of the stator is shown; internal diameter of the arcuate is greater than that of both stationary flow-paths.
Figure 23B:
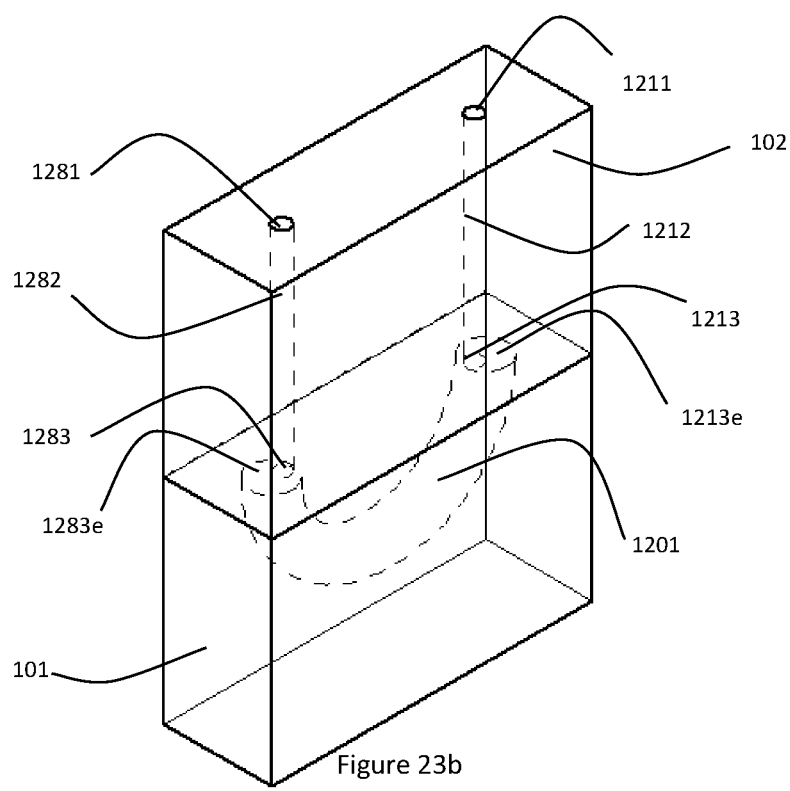

Referring to FIGS. 23a and 23b, an embodiment of a movable flow-path which has a larger internal diameter than that of the connecting stationary flow-paths is shown. A cross-sectional and a side POV of the movable flow-path (1201) are shown. Movable flow-path 1201 has a larger internal diameter than that of stationary flow-paths 1282 and 1212.

Figure 23C:
FIG. 23c is the cross-sectional POV (top-down) of the arcuate of FIG. 23a; the interface where the rotor and the stator meets is shown; internal diameter of the arcuate is greater than that of both stationary flow-paths.

Referring to FIG. 23c, a cross-sectional POV of the junction where movable flow-path 1201 meets stationary flow-paths 1282 and 1212 is shown. Area 1283e and 1213e represent the cross-sectional areas covered by the larger movable flow-path; the cross-sectional area (1283e or 1213e) of movable flow-path 1201 is greater than the cross-sectional areas (1283 or 1213) of the stationary flow-paths 1282 and 1212. In this example, cross-sectional areas (1283 and 1213) of the stationary flow-paths 1282 and 1212 are the same.

Referring still to FIG. 23a or 23b, internal radius of the movable flow-path is uniform across the arcuate.

Figure 23D:
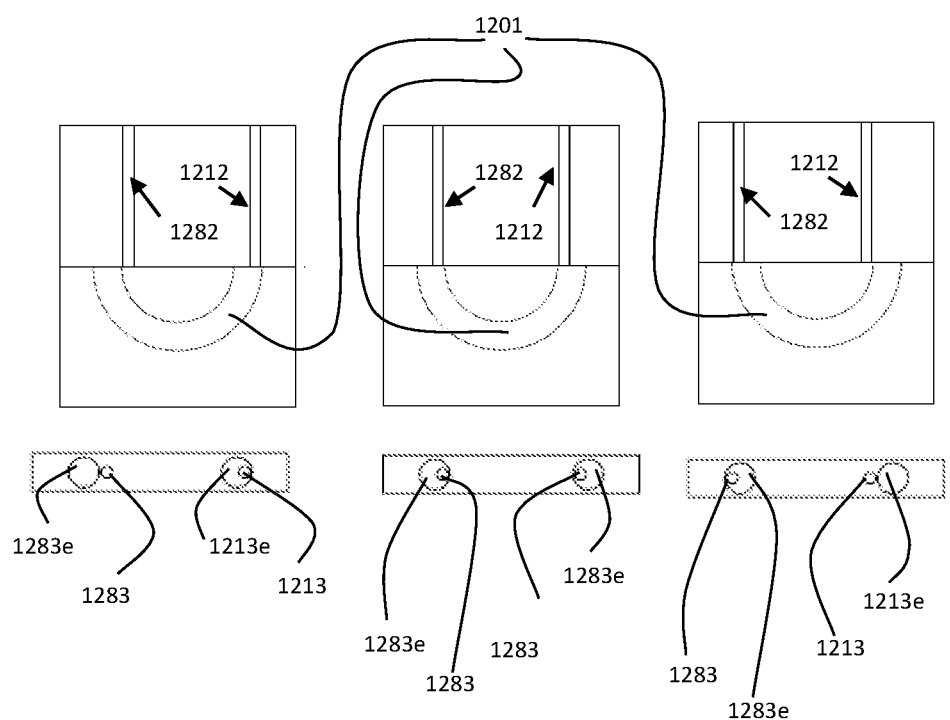
FIG. 23d represents the cross-sectional POV (side and top-down) of the arcuate of FIG. 23a; alignments of the arcuate to two adjacent stationary flow-paths (in the stator) are shown. Three functionally distinguishable relative positions are shown. Position 1 (center) indicates that the arcuate is in fluid communication with both stationary flow-paths (left and right). Position 1-L and 1-R represent functionally distinguishable positions ('isolation' configuration) where the arcuate is in fluid communication with only one of the two stationary flow-paths.

Referring to FIG. 23d, three cross-sectional POV of the movable flow-path representing three possible positions of valve 1b are shown. The central view (position 1) represents a position where both stationary flow-paths establish fluid communications with the movable flow-path. The POV on the left (position 1-L) represents a new position of valve 1b where stationary flow-path 1282 is not in fluid communication with the movable flow-path and stationary flow-path 1212. Similarly, the POV on the right (position 1-R) represents a second new position of valve 1b where stationary flow-path 1212 is not in fluid communication with the movable flow-path and stationary flow-path 1282. Both positions 1-L and 1-R represent a new configuration of valve 1b where the movable flow-path is connected to only one of the two consecutive stationary flow-paths. Positions 1-L or 1-R represents one of several 'isolation' positions of the 'isolation configuration' of valve 1b.

Referring still to FIG. 23d, when a device is connected to a stationary flow-path that is in a fluid communication with the movable flow-path in question, physical state of matter inside the movable flow-path is adjusted in this configuration using the device. The device does not communicate with the other stationary flow-path which is not connected to the movable flow-path in this position. For example, when a fluid moving device is connected to a stationary flow-path that is in fluid communication with the movable flow-path in question, pressure inside the movable flow-path is adjusted in this configuration before the movable flow-path establishes fluid communication with the adjacent stationary flow-path.

Referring still to FIG. 23d, when valve 1b is used for handling fluids containing solids, a multiple number of such a position is used until the entire cross-sectional area of the movable flow-path is in contact with a stationary flow-path for the easy passage of the entire content of the movable flow-path.

Referring still to FIG. 23d, corresponding three cross-sectional POV of the junction where the movable flow-path meets the stationary flow-paths at all three positions (1-L, 1, and 1-R) are shown.

Figure 24:
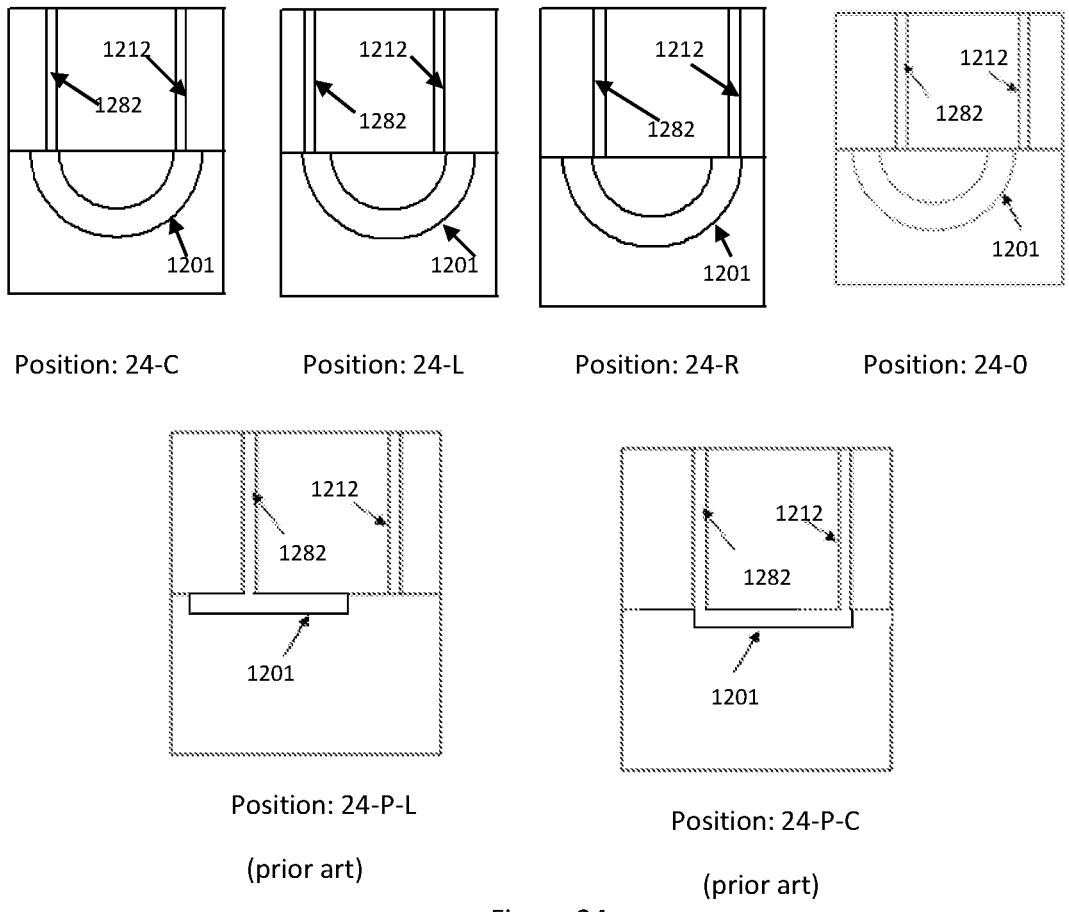
FIG. 24 is a comparison of connectivity of the movable flow-path to the stationary flow-paths between the subject invention (top 4 cross-sectional POV) and the prior art (bottom 2 cross-sectional POV) of the fluid diverting device from a cross-sectional POV (side). Depending on the relative positions of the rotor and the stator, the movable flow-path is in fluid communication with both stationary flow-paths (position: 24-C), only the left stationary flow-path (24-L), only the right stationary flow-path (24-R), or none (24-0).

Referring to FIG. 24, all functionally distinguishable available positions of the present invention and those of prior arts are shown. The present invention adopts at least four functionally distinguishable positions.

Referring still to FIG. 24, position 24-C is a valve position wherein both adjacent stationary flow-paths (1212 and 1282) are in a fluid communication with the movable flow-path 1201.

Referring still to FIG. 24, position 24-L and 24-R are valve positions wherein only stationary flow-path 1282 and 1212 are in fluid communications with movable flow-path 1201 respectively. In other words, in these two positions of valve 1b, only one of the two adjacent stationary flow-path forms a lumen with a movable flow-path. This is one of the positions of valve 1b which belongs to the 'isolation configuration'.

Referring still to FIG. 24, position 24-0 is a valve position wherein neither of the two adjacent stationary flow-paths (1212 and 1282) is in a fluid communication with the movable flow-path 1201. This is one of the positions of valve 1b which belongs to the 'isolation configuration'.

Referring still to FIG. 24, available positions of prior art fluid diverting devices are shown. In position 24-P-C, both adjacent stationary flow-paths form a lumen with a two-dimensional (on-surface) movable flow-path. In position 24-P-L, only one (the left) stationary flow-path (1282) is in fluid communication with movable flow-path 1201.

Referring still to FIG. 24, position wherein a movable flow-path is isolated from both stationary flow-paths, is not available in the prior art devices. As soon as the movable flow-path begins to disengage its fluid communication with one of the two stationary flow-paths, a new lumen starts to form between the movable flow-path in question and one of the two adjacent stationary flow-paths on either side of the first stationary flow-path due to the on-surface (two dimensional) design of movable flow-paths.

Figure 25:
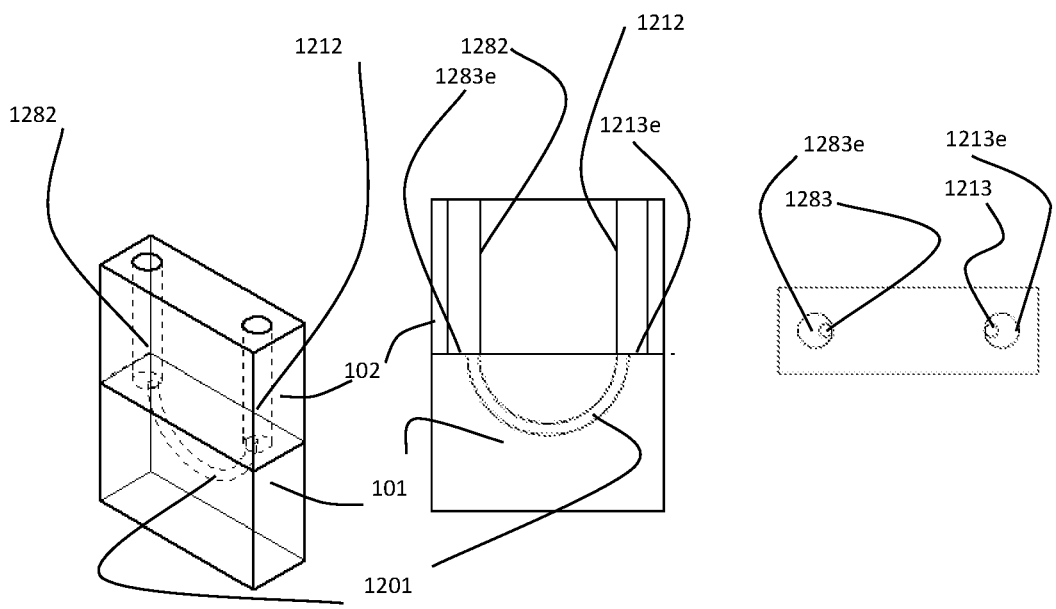
FIG. 25 represents different POV of a single arcuate (inside the rotor) and its alignment to two adjacent stationary flow-paths (in the stator); internal diameter of the arcuate is less than that of both stationary flow-paths.

Referring to FIG. 25, a cross-sectional (center) and a side (left) POV of movable flow-path 1201 forming a lumen with stationary flow-paths 1282 and 1212 are shown. A cross-sectional POV of the lumen at the junction where the movable flow-path meets the stationary flow-paths is shown on the right.

Referring still to FIG. 25, the cross-sectional areas 1283e or 1213e of stationary flow-paths 1282 and 1212 are greater than the cross-sectional area of movable flow-path 1201. In this example, cross-sectional areas (1283e and 1213e) of the stationary flow-paths 1282 and 1212 are same.

Referring still to FIG. 25, the rotor of valve 1b adopts positions wherein both stationary flow-paths (1282 and 1212) form a lumen with movable flow-path 1201 or one of the two stationary flow-paths (1282 and 1212) forms a lumen with movable flow-path 1201 or neither of the two stationary flow-paths establishes fluid communication with the movable flow-path 1201.

Referring still to FIG. 25, in some embodiments, stationary flow-paths 1282 and 1212 have different internal radii. In some other embodiments, internal radius of one of the two stationary flow-path is same as that of the movable flow-path in question.

Figure 26:
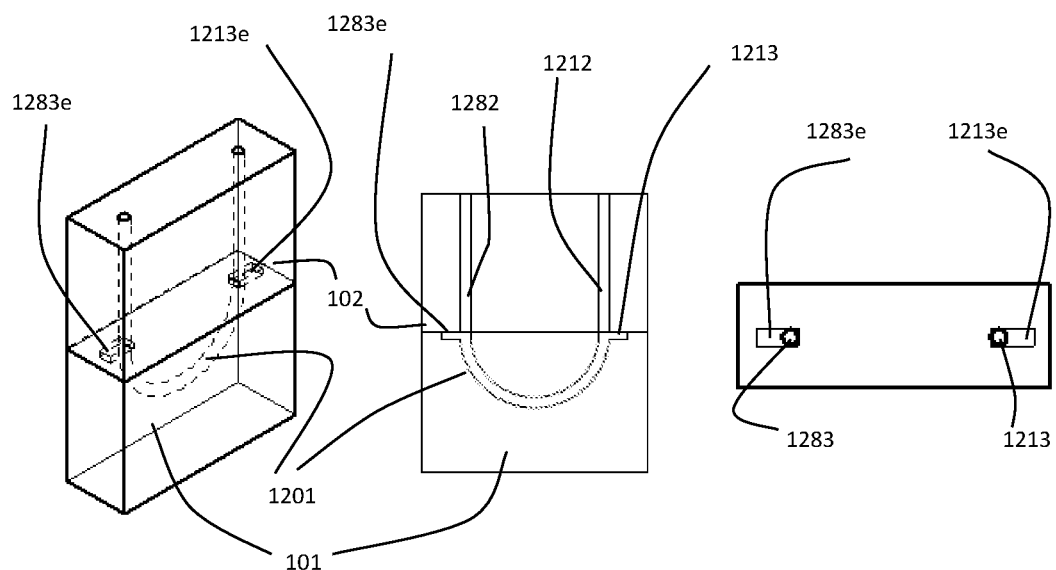
FIG. 26 represents different POV of a single arcuate (inside the rotor) and its alignment to two adjacent stationary flow-paths (in the stator); internal diameters of the arcuate and the stationary flow-paths are same; the 'U' shape of the arcuate is flanked by two on-surface grooves; the arcuate is capable of establishing fluid communications with both stationary flow-paths or one of the two stationary flow-paths or none depending on relative positions of the rotor and the stator.

Referring to FIG. 26, a cross-sectional (center) and a side (left) POV of movable flow-path 1201 forming a lumen with stationary flow-paths 1282 and 1212 are shown. A cross-sectional POV of the lumen at the junction of the rotor and the stator is shown on the right.

Referring still to FIG. 26, the movable flow-path in question is 'elongated' (larger cross-sectional area) with respect to its contacting stationary flow-paths (for example, 1282 and 1212). The elongated portion, which is situated in the two-dimensional surface at the junction between the rotor and the stator, belongs to the 'rotor' portion of valve 1b.

Referring still to FIG. 26, the rotor of valve 1b adopts positions where both stationary flow-paths (1282 and 1212) form a lumen with movable flow-path 1201 or one of the two stationary flow-paths (1282 and 1212) forms a lumen with movable flow-path 1201 or neither of the two stationary flow-paths establishes any fluid communication with the movable flow-path 1201.

Referring still to FIG. 26, in some embodiments, volumes of the two-dimensional extended portions are same. In some other embodiments, volume of one elongated side is larger than that of the other elongated side.

Referring still to FIG. 26, in some embodiments, geometric dimensions of the elongated sides are different, but the volumes are same.

Referring still to FIG. 26, in some embodiments, relative geometric orientation of the elongated sides is symmetrical. In other words, both elongated sides are spaced outward or inward with respect to the orientation of the combined lumen formed by the movable and the stationary flow-paths in question.

Figure 27:
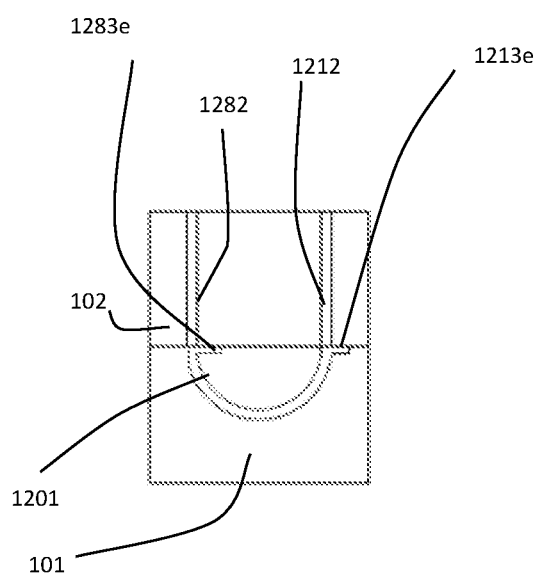
FIG. 27 represents a cross-sectional POV (side) of a single arcuate (inside the rotor) and its alignment to two adjacent stationary flow-paths (in the stator); the stationary flow-paths are connected to two unsymmetrical on-surface grooves; the arcuate is capable of establishing fluid communications with both stationary flow-paths or one of the two adjacent stationary flow-paths or none, depending on relative positions of the rotor and the stator.

Referring to FIG. 27, a cross-sectional POV of movable flow-path 1201 forming a lumen with stationary flow-paths 1282 and 1212 are shown.

Referring still to FIG. 27, relative geometric orientation of the elongated sides is unsymmetrical. In other words, one of the elongated sides is spaced away from the combined lumen formed by the movable flow-path and the stationary flow-paths in question, and the other, toward the lumen.

Referring still to FIG. 27, the rotor of valve 1b adopts positions where both stationary flow-paths (1282 and 1212) form a lumen with movable flow-path 1201 or one of the two stationary flow-paths (1282 and 1212) forms a lumen with movable flow-path 1201 or neither of the two stationary flow-paths establishes any fluid communication with the movable flow-path 1201.

Figure 28:
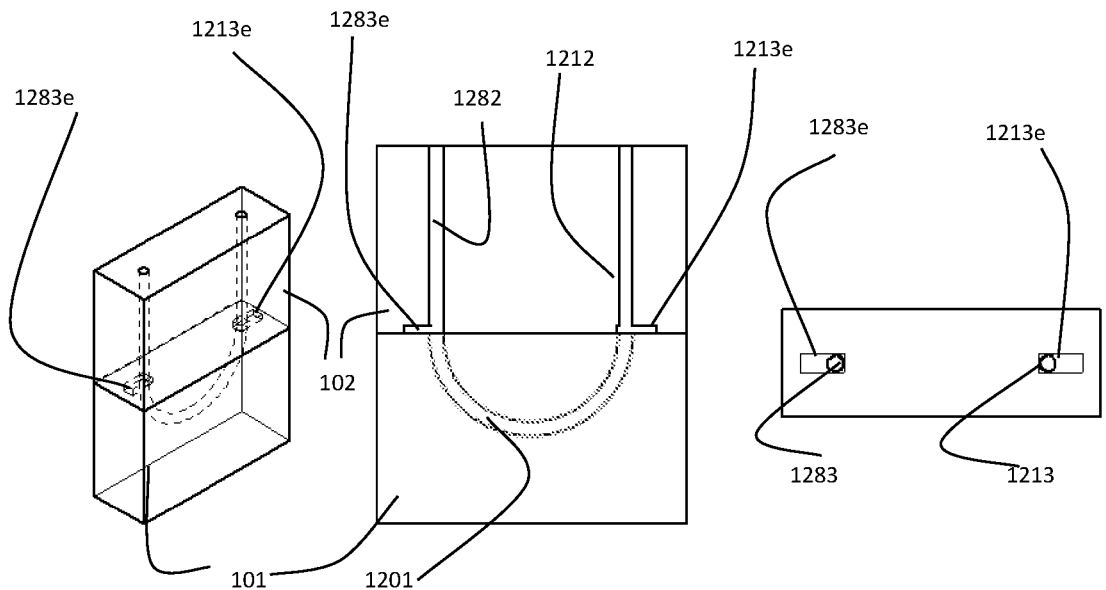
FIG. 28 represents different POVs of a single arcuate (inside the rotor) and its alignment to two adjacent stationary flow-paths (in the stator); internal diameters of the arcuate and the stationary flow-paths are same; the stationary flow-paths are connected to two on-surface grooves; the arcuate is capable of establishing fluid communications with both stationary flow-paths or one of the two adjacent stationary flow-paths or none, depending on relative positions of the rotor and the stator.

Referring to FIG. 28, a cross-sectional (center) and a side (left) POV of movable flow-path 1201 forming a lumen with stationary flow-paths 1282 and 1212 are shown. A cross-sectional view of the lumen at the junction of the rotor and the stator is shown on the right.

Referring still to FIG. 28, the stationary flow-paths (1212 and 1282) in question are 'elongated' (larger cross-sectional area) with respect to its contacting movable flow-path (1201). The elongated portion, which is situated in the two-dimensional surface at the junction between the rotor and the stator, belongs to the 'stator' portion of valve 1b.

Referring still to FIG. 28, in some embodiments, relative geometric orientation of the elongated sides is symmetrical. In some other embodiments, relative geometric orientation of the elongated sides is unsymmetrical. In another embodiment, only one of the two termini of the movable flow-path in question has an elongated side.

Referring still to FIG. 28, in some embodiments, volumes of the two-dimensional elongated sides are same. In some other embodiments, volume of one elongated side is larger than that of the other elongated side.

Referring still to FIG. 28, in some embodiments, geometric dimensions of the elongated sides are different, but the volumes are same.

Referring still to FIG. 28, the rotor of valve 1b adopts positions where both stationary flow-paths (1282 and 1212) form a lumen with movable flow-path 1201 or one of the two stationary flow-paths (1282 and 1212) forms a lumen with movable flow-path 1201 or neither of the two stationary flow-paths establishes any fluid communication with movable flow-path 1201.

Figure 29:
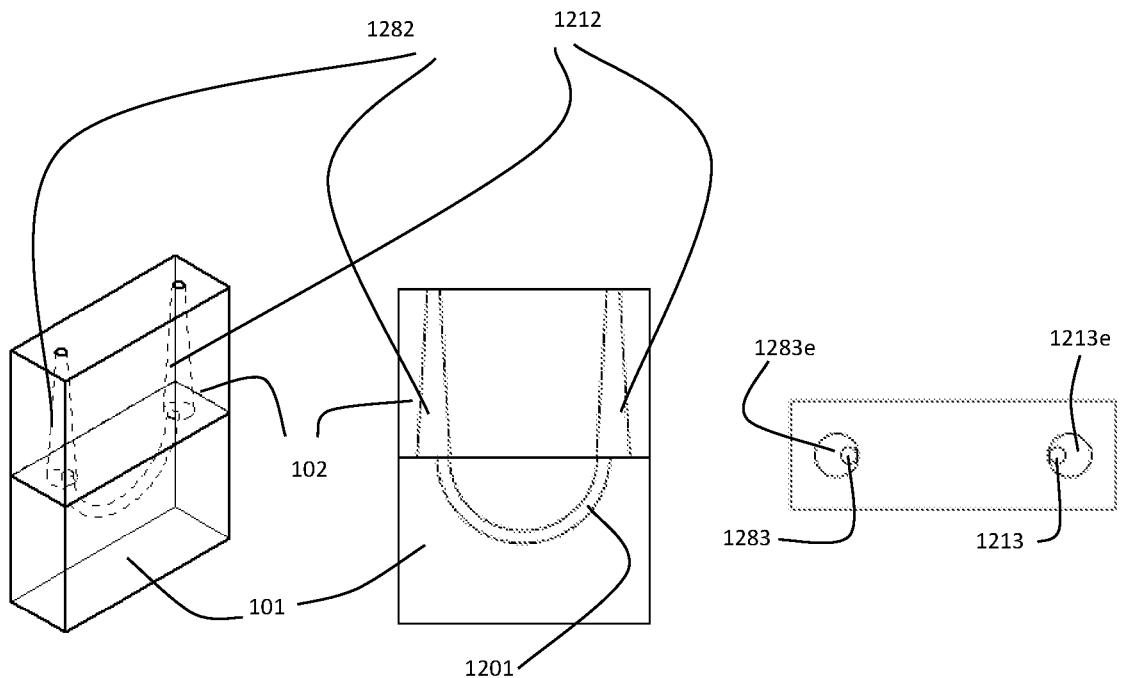
FIG. 29 represents various POVs of a single arcuate (inside the rotor) and its alignment to two adjacent stationary flow-paths in the stator; the internal diameter of the stationary flow-paths is variable; the arcuate is capable of establishing fluid communication with both stationary flow-paths or either one of the two stationary flow-paths or none, depending on relative positions of the rotor and the stator.

Referring to FIG. 29, a cross-sectional (center) and a side (left) POV of movable flow-path 1201 forming a lumen with stationary flow-paths 1282 and 1212 are shown. A cross-sectional POV of the lumen at the junction of the rotor and the stator is shown on the right.

Referring still to FIG. 29, internal diameter of the stationary flow-path is not fixed, but variable along the longitudinal axis of the flow-paths in question.

Referring still to FIG. 29, the rotor of valve 1b adopts positions where both stationary flow-paths (1282 and 1212) form a lumen with movable flow-path 1201 or one of the two stationary flow-paths (1282 and 1212) forms a lumen with movable flow-path 1201 or neither of the two stationary flow-paths establishes any fluid communication with the movable flow-path 1201.

Figure 30:
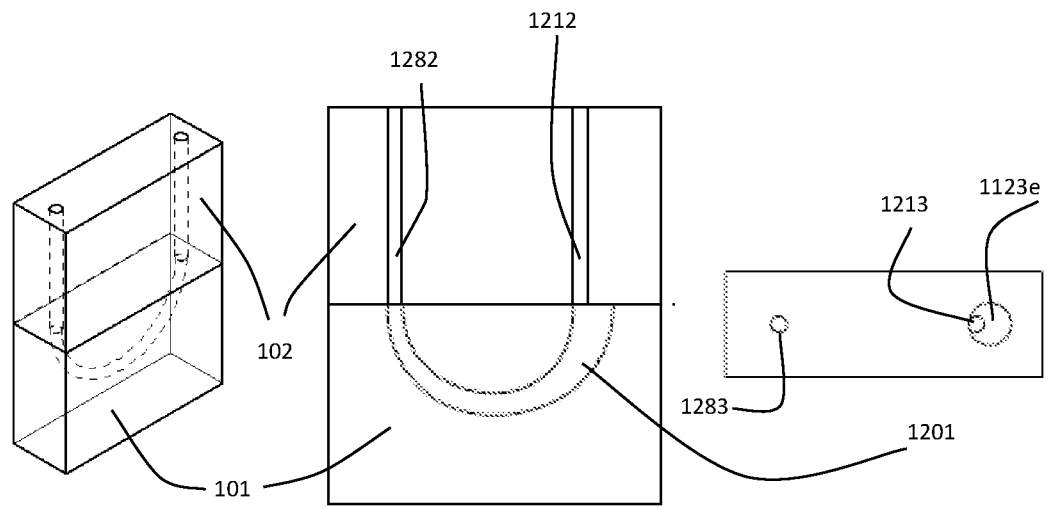
FIG. 30 represents various POVs of a single arcuate (inside the rotor) and its alignment to two adjacent stationary flow-paths in the stator; the internal diameter of the arcuate is variable; the arcuate is capable establishing fluid communication with both stationary flow-paths or the right stationary flow-path or none, depending on relative positions of the rotor and the stator.

Referring to FIG. 30, in some embodiments, internal dimeter of the movable flow-path forming the lumen with the stationary flow-paths is not uniform throughout the length of the movable flow-path. In some cases, the cross-sectional area of the movable flow-path at one end is larger than that of the other end at the junction.

Referring to FIGS. 22 to 30, a temporary lumen, which is formed out of a specific combination of two stationary flow-paths and a three-dimensional movable flow-path, is capable of adopting four functionally different configurations of valve 1b: the 'load' configuration, the 'inject' configuration, one of the 'isolation' positions of the 'isolation' configuration wherein one of the two adjacent ports do not maintain fluid communication to the movable flow-paths while the second one does, and another 'isolation' position wherein both ports are in isolation from the movable flow-path.

Referring still to FIGS. 22 to 30, the mismatch in the cross-sectional area at the junction where the movable flow-path in question meets the stationary flow-paths is created using the extension (elongation) of corresponding flow-paths (grooves) either from the rotor, or from the stator, or from some combination of both the rotor and the stator.

Referring still to FIGS. 22 to 30, in some embodiments, the three-dimensional movable flow-paths of the rotor establish fluid communications between two non-consecutive stationary flow-paths of the stator. In other words, the three-dimensional movable flow-paths of the rotor establish fluid communications between two stationary flow-paths of the stator that are not adjacent.

Referring still to FIGS. 22 to 30, in some embodiments, at least one three-dimensional movable flow-path of the rotor establishes fluid communication with more than two stationary flow-paths. In other words, the movable flow-path is branched inside the three-dimensional boundary of the rotor and connects to more than two stationary flow-paths at the same time.

Figure 31:
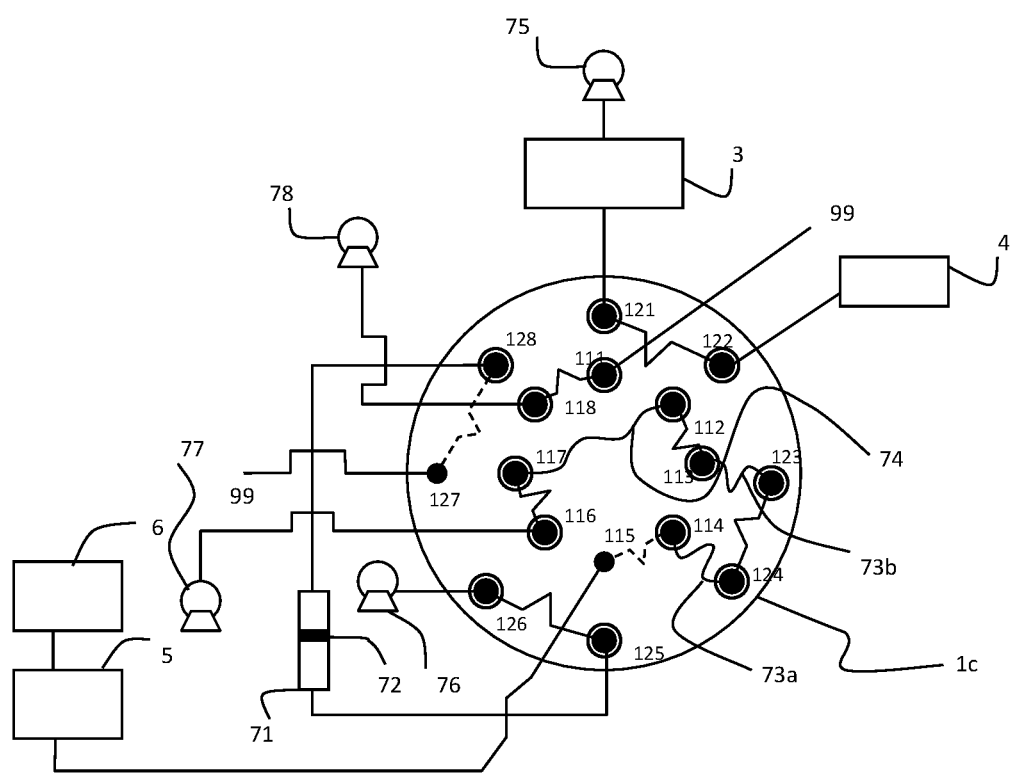
FIG. 31 represents an example of a flow diagram of an isolation position of the 'isolation configuration' of the fluid diverting module of FIG. 1. The flow-paths of the rotor and the stator are constructed in a way so that all but two ports on the stator maintain fluid communications with movable arcuates at both termini. The ports that maintain fluid communications at both termini are labeled in double-circles and the fluid communications are shown as solid lines. Ports which do not maintain fluid communications at both termini at the 'isolation' configuration are shown in dashed lines. Connectors to the ports are not shown.
Figure 32:
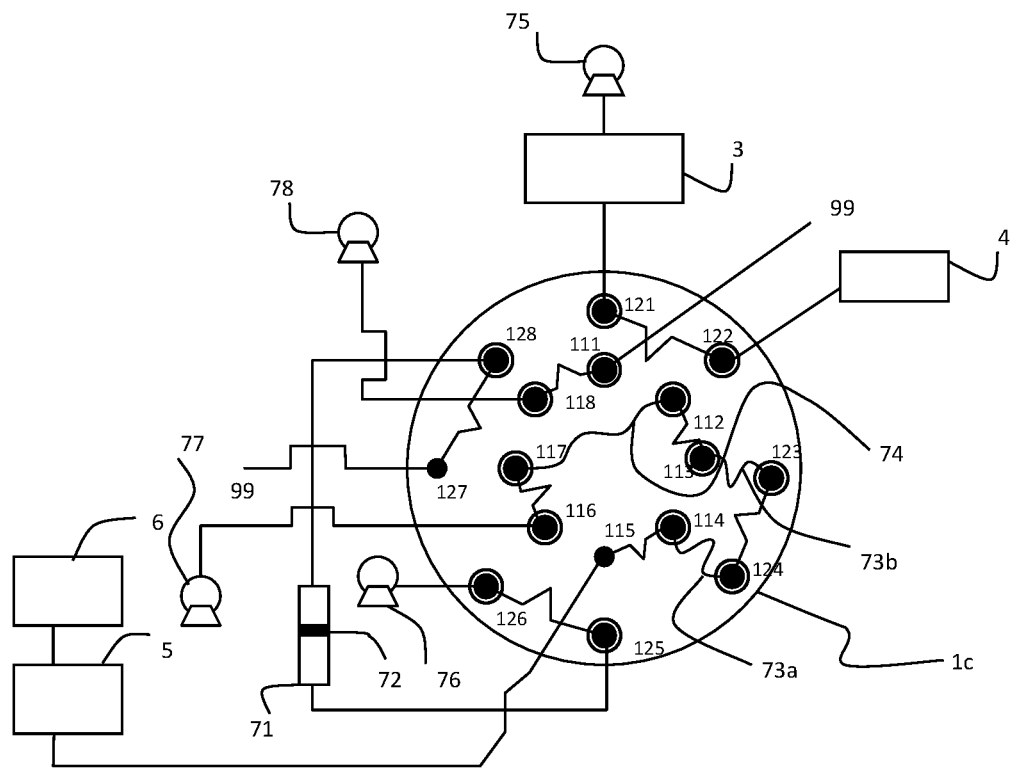
FIG. 32 represents an example of a flow diagram of an inject position of the inject configuration of the fluid diverting device of FIG. 1. In this position, all ports maintain fluid communications with movable arcuates. Connectors to the ports are not shown.
Figure 33:
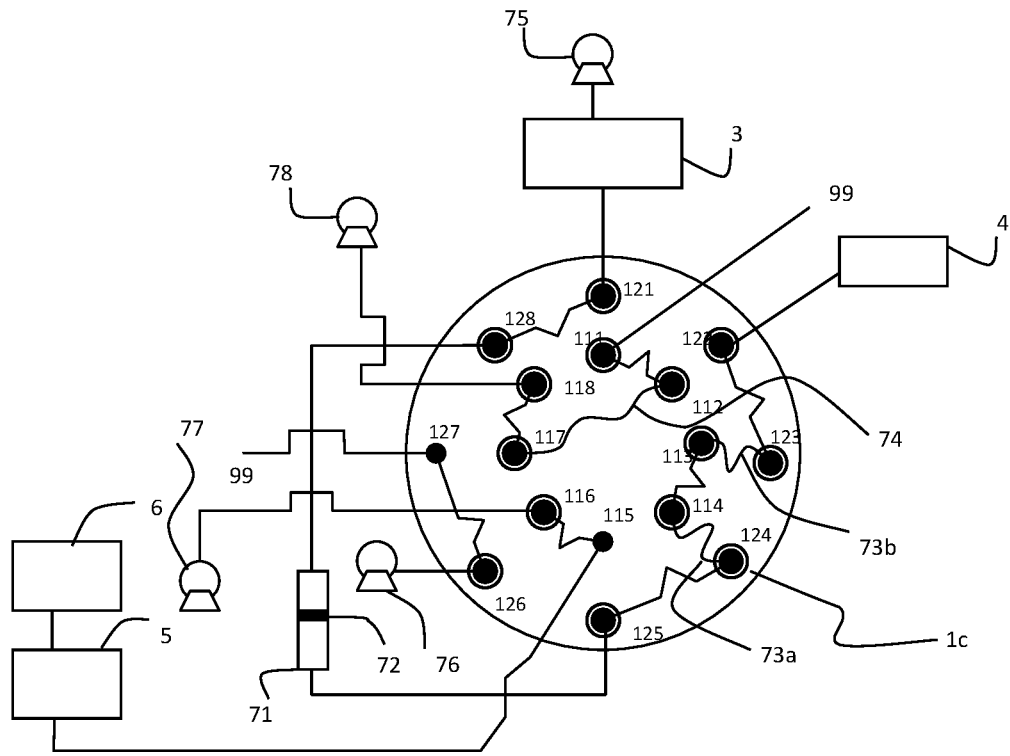
FIG. 33 represents an example of a flow diagram of a load position of the load configuration of the fluid diverting device of FIG. 1. In this position, all ports have fluid communications with movable arcuates. Connectors to the ports are not shown.

Referring to FIGS. 31 to 33, flow diagrams of a fluid diverting device (1c) are shown; valve 1c comprises of stationary and three-dimensional movable flow-paths some of which are equipped with elongated grooves.

Referring still to FIGS. 31 to 33, in some embodiments wherein valve 1c is a two-position valve, elongated grooves are in the rotor of valve 1c. In some other embodiments wherein, valve 1c is a multi-position valve, elongated grooves are in the stator of valve 1c.

Referring still to FIGS. 31 to 33, all ports excepting ports 115 and 127 are equipped with elongated grooves of types described in FIGS. 22 to 30. Ports that are equipped with the elongated grooves are labeled in double-circles. All peripheral modules connected to valve 1c for sampling are shown.

Referring to FIG. 31, a flow diagram of valve 1c, which is in one of the 'isolation' positions of the 'isolation configuration', is shown. In this configuration, ports 121 and 122, 123 and 124, 125 and 126, 111 and 118, 112 and 113, 116 and 117 are in fluid communications. Ports 127 and 128 are not in a fluid communication. Similarly, ports 114 and 115 are not in a fluid communication. Movable flow-paths which do not establish fluid communications are shown by dashed lines. The remaining movable flow-paths which establish fluid communications between two adjacent ports are shown by solid lines.

Referring to FIGS. 32 and 33, flow diagrams of valve 1c in the 'inject' (FIG. 32) and the 'load' (FIG. 33) configurations are shown. All adjacent ports including 114-115 and 127-128 are in fluid communications. All fluid communications are shown by solid lines.

Referring to FIG. 33, when a portion of a fluidic stream is flowed from a pressurized sample source (3) to fluid holding device(s) 73a (or 73a and 73b) in the 'load' configuration of valve 1c, the entire lumen between sample source 3 and sample collection module 4, which includes the fluid holding devices, is pressurized.

Referring back to FIG. 32, when valve 1c is moved to the 'inject' configuration, fluid holding device(s) (73a and 73b) are exposed to sample delivery module 5, which is not pressurized in this example. The fluidic content in 73a (or 73a and 73b) experiences a pressure drop when fluid holding devices 73a and 73b are in fluid communication with sample delivery module 5. Sudden drop in pressure causes the fluidic content in the fluid holding devices to advance forward toward the sample delivery module in an uncontrolled manner.

Referring back to FIG. 31, the 'isolation configuration' of valve 1c establishes a fluid communication between fluid moving device 77 and the fluid holding devices (73a and 73b). No fluid communication between the fluid holding devices (73a and 73b) and sample delivery module 5 is established in the 'isolation configuration'. Fluid moving device 77 conducts a pressure adjustment action by retracting pressurizing components of the fluid moving device to reduce pressure inside the fluid holding devices before the fluidic content is exposed to the sample delivery module pressure during the 'inject' configuration.

Referring still to FIG. 31, in some other example, pressure in sample delivery module 5 is greater than that of sample source 3. In those cases, the fluidic content in 73a (or 73a and 73b) experiences a pressure increase when valve 1c is moved to the 'inject' configuration from the 'load' configuration. This causes the fluidic content of the fluid holding devices to retreat backward away from the sample delivery module in an uncontrolled manner. Fluid moving device 77 conducts a pressure adjustment action by advancing the pressurizing components of the fluid moving device to increase pressure inside the fluid holding devices first before the fluidic content is exposed to the sample delivery module pressure during the 'inject' configuration.

Referring still to FIG. 31, fluid moving device 77 conducts similar pressure adjustment actions to prevent uncontrolled fluidic motions during load-to-inject or inject-to-load configurational change of valve 1c.

Figure 34:
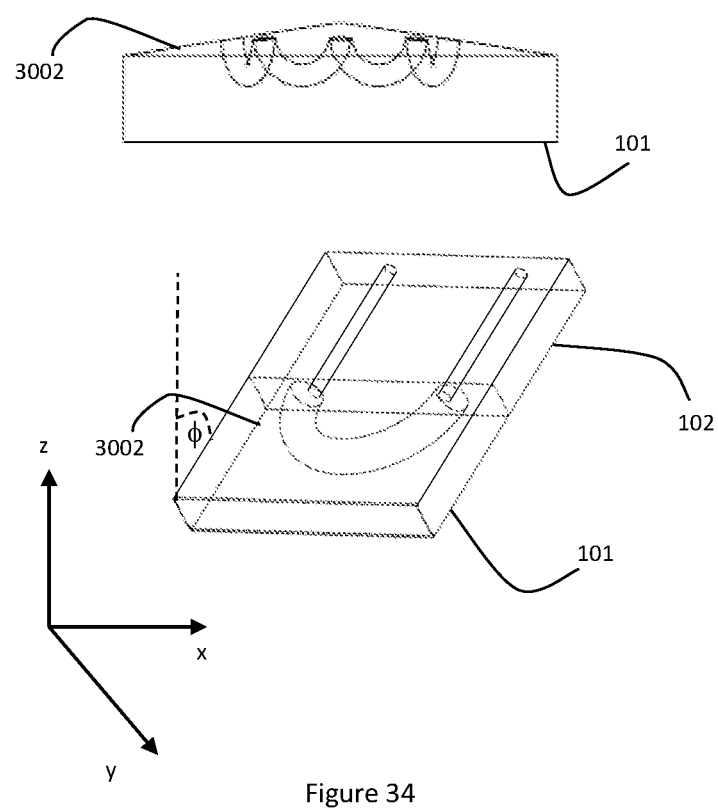
FIG. 34 represents an example of a fluid diverting device of FIG. 1 with a rotor and a stator which have matching curved surfaces. The plane of the arcuate is slanted.

Referring to FIG. 34, in some embodiments, contacting surface between the stator and the rotor is curved.

Referring still to FIG. 34, in some embodiments, relative orientation of the plane of the curved movable flow-paths (i.e., the plane of the arcuate) is not perpendicular or parallel to the axis of rotation but inclined at an angle.

Figure 35:
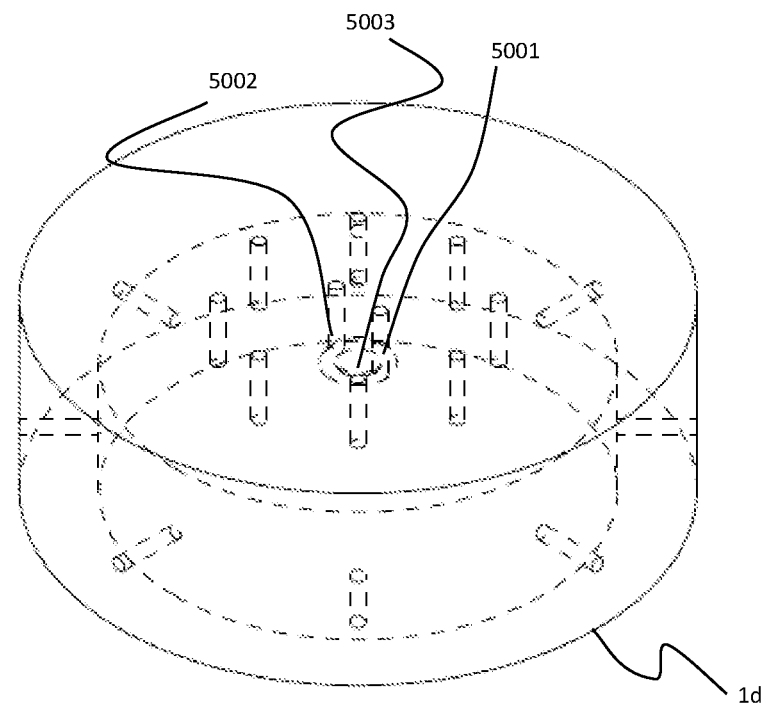
FIG. 35 represents a top-side POV of the fluid diverting device of FIG. 1 with a set of secondary flow-paths; A set of secondary stationary flow-paths, which maintain a permanent fluid communication with a circular movable flow-path in the rotor in all position of the fluid diverting device, is shown.
Figure 36:
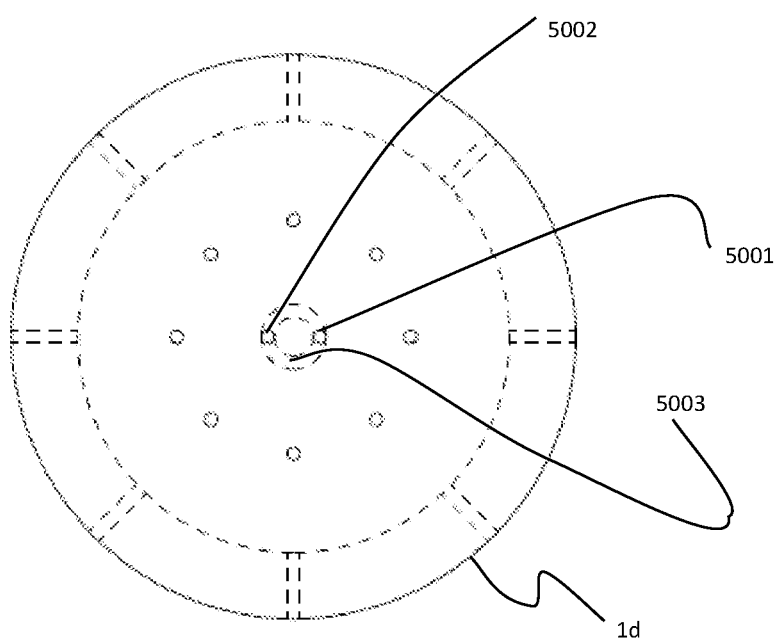
FIG. 36 represents a top-down POV of the fluid diverting device of FIG. 35.

Referring to FIGS. 35 and 36, side and top-down POV of a fluid diverting device (1d) of the present invention are shown; the fluid diverting device comprises of a secondary set of flow-paths, which do not have any fluid communication to the primary flow-paths responsible for the sampling operations, is shown.

Referring still to FIGS. 35 and 36, stationary flow-paths 5001 and 5002 maintains fluid communications to a circular movable flow-path 5003. In all possible configurations of valve 1d, the fluid communication between 5001 and 5002 are not broken.

Referring still to FIGS. 35 and 36, a fluid capable of transferring heat to and from rotor 101 is circulated through the lumen formed among 5001, 5002, and 5003.

Referring still to FIGS. 35 and 36, when the fluid from sample source 3 causes the temperature of rotor 101 of valve 1d to rise, the resulting heat is dissipated using the heat-transferring fluid to maintain rotor 101 at an isothermal state. When the fluid from sample source 3 causes the temperature of rotor 101 of valve 1d to drop, heat is supplied using the heat-transferring fluid to maintain rotor 101 at an isothermal state.

Referring to FIGS. 37 to 41, flow diagrams of a fluid diverting device of the present invention are shown; the fluid diverting device is valve 1e; the valve comprises of stationary and the three-dimensional movable flow-paths some which are equipped with elongated grooves. In this embodiment, all ports excepting ports 115 are equipped with elongated grooves of types described in FIGS. 22 to 30. Ports that are equipped with the elongated grooves are labeled in double-circles. All peripheral modules connected to valve 1e for sampling are shown. In addition, valve 1e is also equipped with a secondary lumen comprising flow-paths 5001, 5002, and 5003 which are not connected to the primary flow-paths as per FIGS. 35 and 36.

Referring still to FIGS. 37 to 41, sample source 3 is kept at an elevated temperature and pressure.

Figure 37:
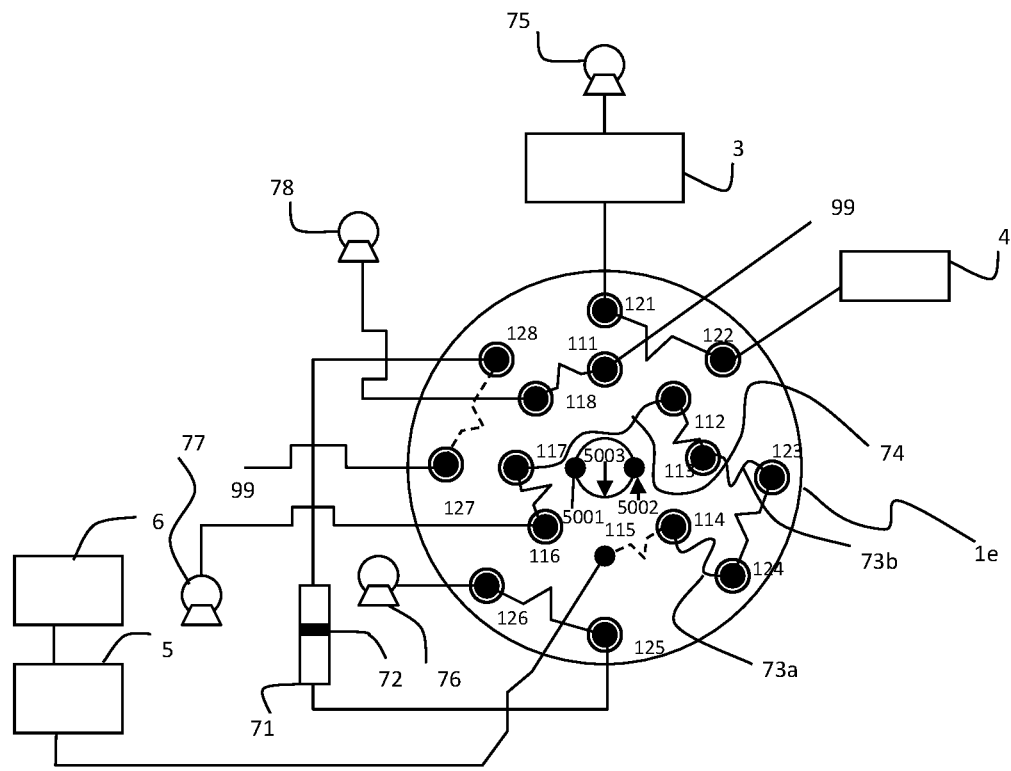
FIG. 37 represents an example of a flow diagram of an isolation position of the 'isolation configuration' of the fluid diverting device of FIG. 1 with two independent streams (primary and secondary) of flow. In this position, all but one port has fluid communications with the movable arcuates; all devices and modules, which are connected to the respective ports, function as if the fluid diverting device is in an inject position; ports labeled with double-circles are equipped with extended grooves.

Referring to FIG. 37, the 'isolation' configuration of valve 1e is shown. In this configuration, ports 121 and 122, 123 and 124, 125 and 126, 111 and 118, 112 and 113, 114 and 115, 116 and 117 are in fluid communications. Ports 127 and 128 are not in a fluid communication.

Figure 38:
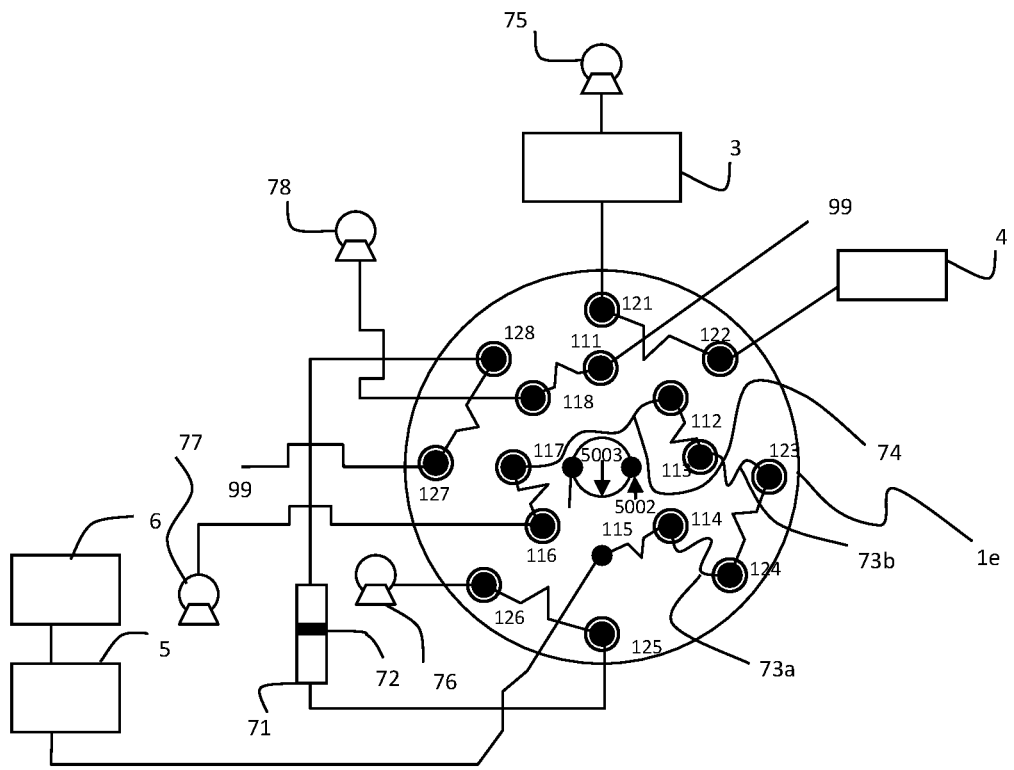
FIG. 38 represents an example of a flow diagram of an inject position of the inject configuration of the fluid diverting device of FIG. 1 with two independent streams (primary and secondary) of flow. In this position, all ports have fluid communications with the movable arcuates; ports labeled with double-circles are in fluid communications to flow-paths equipped with extended grooves.

Referring to FIG. 38, the flow diagram of valve 1e, which is in the 'inject' configuration is shown. In this configuration, all ports (121 and 122, 123 and 124, 125 and 126, 127 and 128, 111 and 118, 112 and 113, 114 and 115, 116 and 117) are in fluid communications; all devices and modules are in fluid communications in accordance with the 'inject' configuration of valve 1e.

Referring to FIGS. 37 and 38, all devices and modules except fluid moving device 76 are in fluid communications in accordance with the 'inject' configuration of valve 1e.

Figure 39:
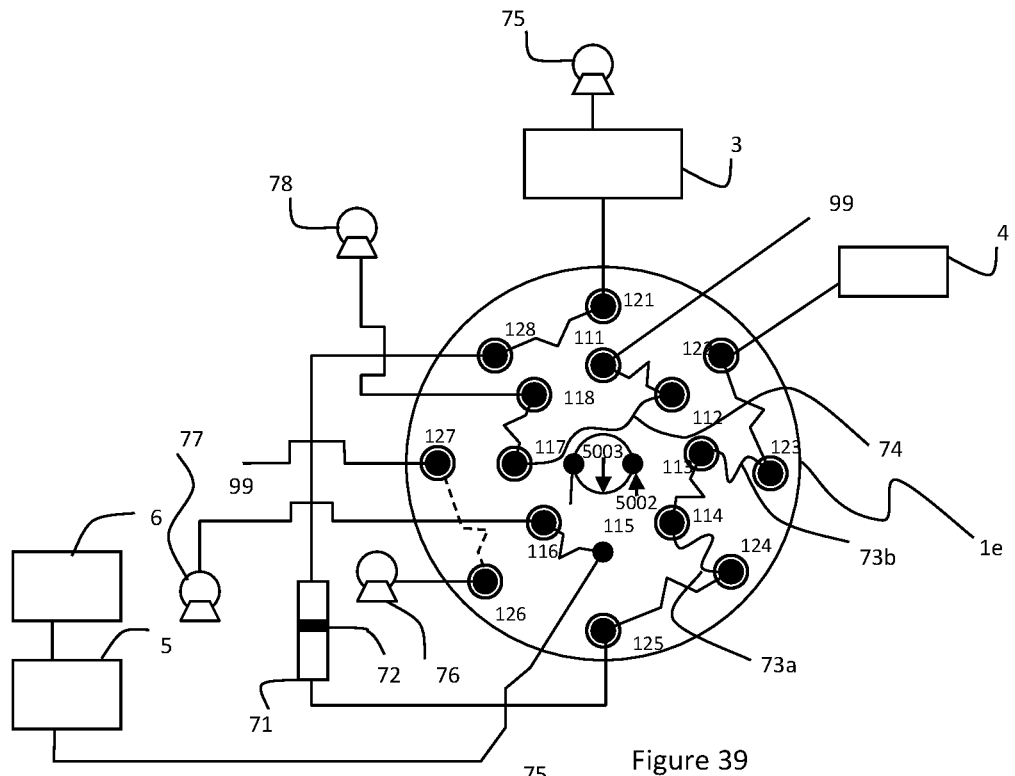
FIG. 39 represents an example of a flow diagram of a load position of the load configuration of the fluid diverting device of FIG. 1 with two independent streams (primary and secondary) flow. In this position, all ports have fluid communications with the movable arcuates; ports labeled with double-circles are equipped with extended grooves.

Referring to FIG. 39, the flow diagram of valve 1e, which is in the 'isolation' configuration is shown. In this configuration, ports 121 and 128, 122 and 123, 124 and 125, 111 and 112, 113 and 114, 115 and 116, 117 and 118 are in fluid communications. Ports 126 and 127 are not in a fluid communication.

Figure 40:
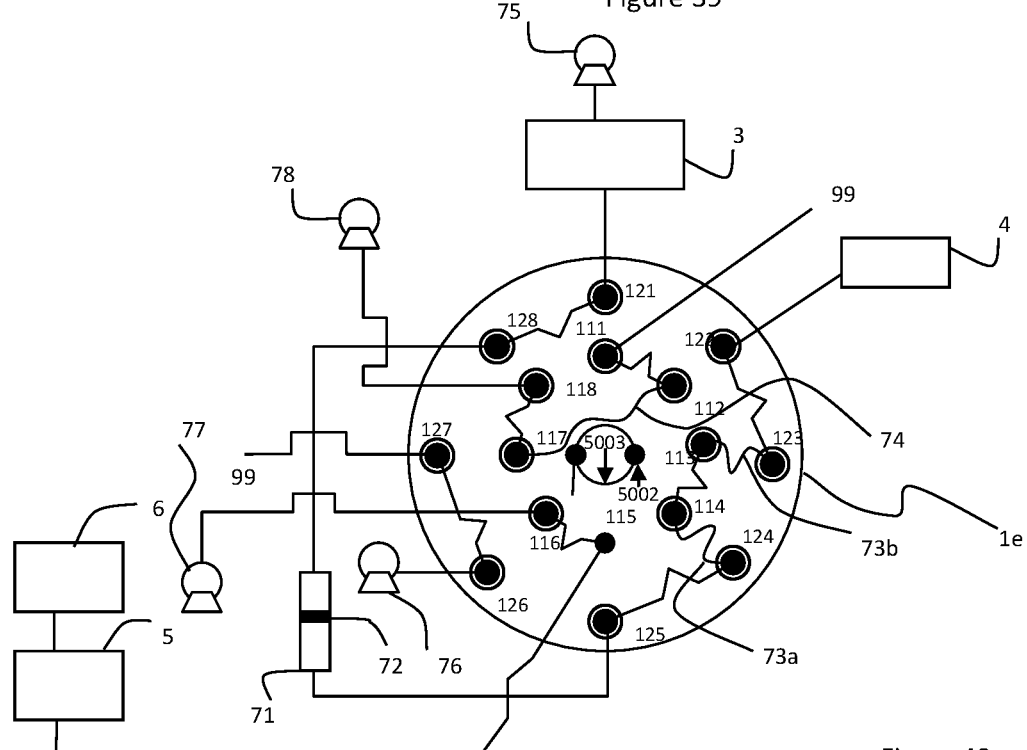
FIG. 40 represents an example of a flow diagram of an isolation position of the 'isolation configuration' of the fluid diverting device of FIG. 1 with two independent streams (primary and secondary) of flow. In this position, all but one port has fluid communications with the movable arcuates; all devices and modules, which are connected to the respective ports, function as if the fluid diverting device is in a load position; ports labeled with double-circles are equipped with extended grooves.

Referring to FIG. 40, the flow diagram of valve 1e, which is in the 'load' configuration is shown. In this configuration, all ports (121 and 128, 122 and 123, 124 and 125, 126 and 127, 111 and 112, 113 and 114, 115 and 116, 117 and 118) are in fluid communications; all devices and modules are in fluid communications in accordance with the 'load' configuration of valve 1e.

Referring to FIGS. 39 and 40, all devices and modules except fluid moving device 76 are in fluid communications in accordance with the 'load' configuration of valve 1e.

Referring to FIG. 40, when a portion of a fluid is flowed from a pressurized hot sample source (3) to fluid holding device(s) 73a (or 73a and 73b) in the 'load' configuration of valve 1e, the lumen between sample source 3 and sample collection module 4 is pressurized. Also, rotor 101 experiences an increase in temperature of the rotor due to the dissipation of heat from the fluid originating from sample source 3.

Referring back to FIG. 38, when valve 1e is moved to the 'inject' configuration, fluid holding device(s) (73a and 73b) are exposed to sample delivery module 5, which is not pressurized in this example. The fluidic content in 73a (or 73a and 73b) experiences a pressure drop when fluid holding devices 73a and 73b are in fluid communication with sample delivery module 5. Sudden drop in pressure causes the fluidic content in the fluid holding devices to advance forward toward the sample delivery module in an uncontrolled manner.

Referring back to FIG. 37, the 'isolation' configuration of valve 1e establishes a fluid communication between fluid moving device 77 and the fluid holding devices (73a and 73b). No fluid communication between the fluid holding devices (73a and 73b) and sample delivery module 5 is established in the 'isolation' configuration. Fluid moving device 78 conducts a pressure adjustment action by retracting pressurizing components of the fluid moving device to reduce pressure inside the fluid holding devices before the fluidic content is exposed to the sample delivery module pressure during the 'inject' configuration.

Referring still to FIG. 37, in some other example, pressure in sample delivery module 5 is greater than that of sample source 3. In those cases, the fluidic content in 73a (or 73a and 73b) experiences a pressure increase when valve 1e is moved to the 'inject' configuration from the 'load' configuration. This causes the fluidic content of the fluid holding devices to retreat backward away from the sample delivery module in an uncontrolled manner. Fluid moving device 77 conducts a pressure adjustment action by advancing the pressurizing components of the fluid moving device to increase pressure inside the fluid holding devices first before the fluidic content is exposed to the sample delivery module pressure during the 'inject' configuration.

Figure 41:
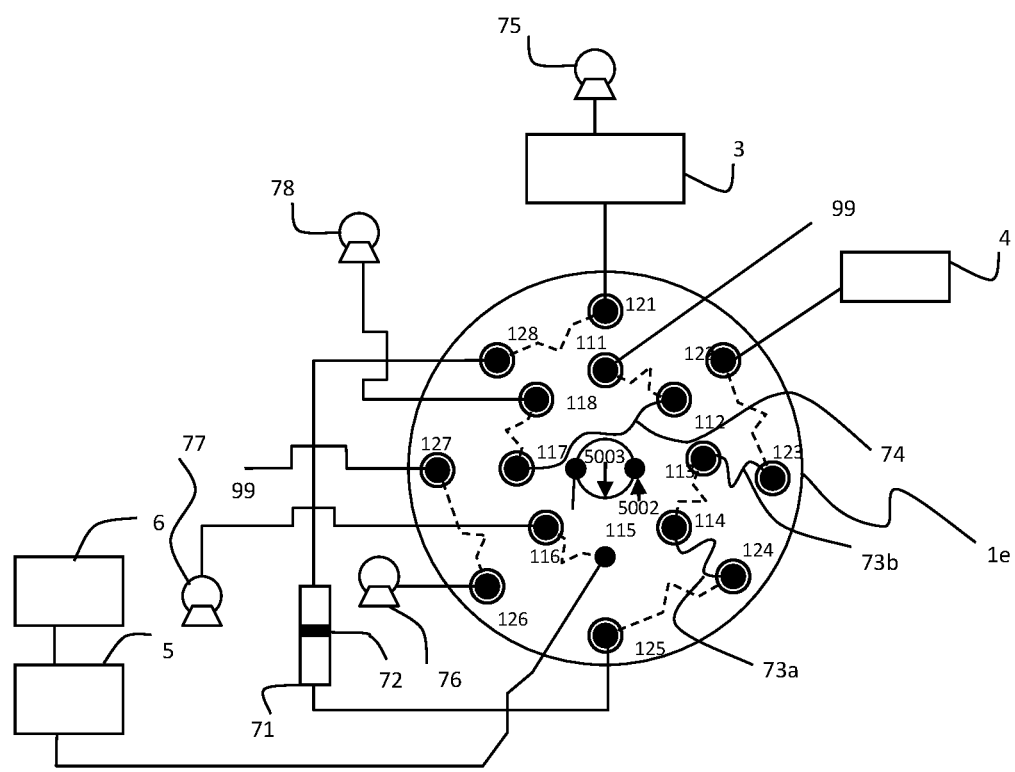
FIG. 41 represents an example of a flow diagram of an isolation position of the 'isolation configuration' of the fluid diverting device of FIG. 1 with two independent streams (primary and secondary) of flow. In this position, no port has fluid communication with any of the movable arcuates; ports labeled with double-circles are equipped with extended grooves.

Referring to FIG. 41, the 'isolation' configuration of valve 1e is shown wherein no fluid communication between the stationary and movable flow-paths is established. In this configuration, the fluid inside the movable flow-paths is stored for a period of time and the movement of the devices and the modules connected to the stationary flow-paths do not impact physical state (for example, pressure) of the fluid inside the movable flow-paths.

Referring back to FIGS. 37 to 41, fluid inside the secondary lumen is flowed through flow-paths 5001, 5002, and 5003. The secondary flow allows for a heat-transfer action to keep rotor 101 of valve 1e at an optimal thermal state. In this example, sample source 3 is at an elevated temperature. The secondary fluid absorbs heat which is transmitted to the rotor body by the fluid from sample source 3. In some other example, when sample source is kept at a temperature less than the ambient condition, the secondary fluid, which is heated, dissipates the heat into the rotor body to maintain the rotor at an optimal thermal state.

Figure 42:
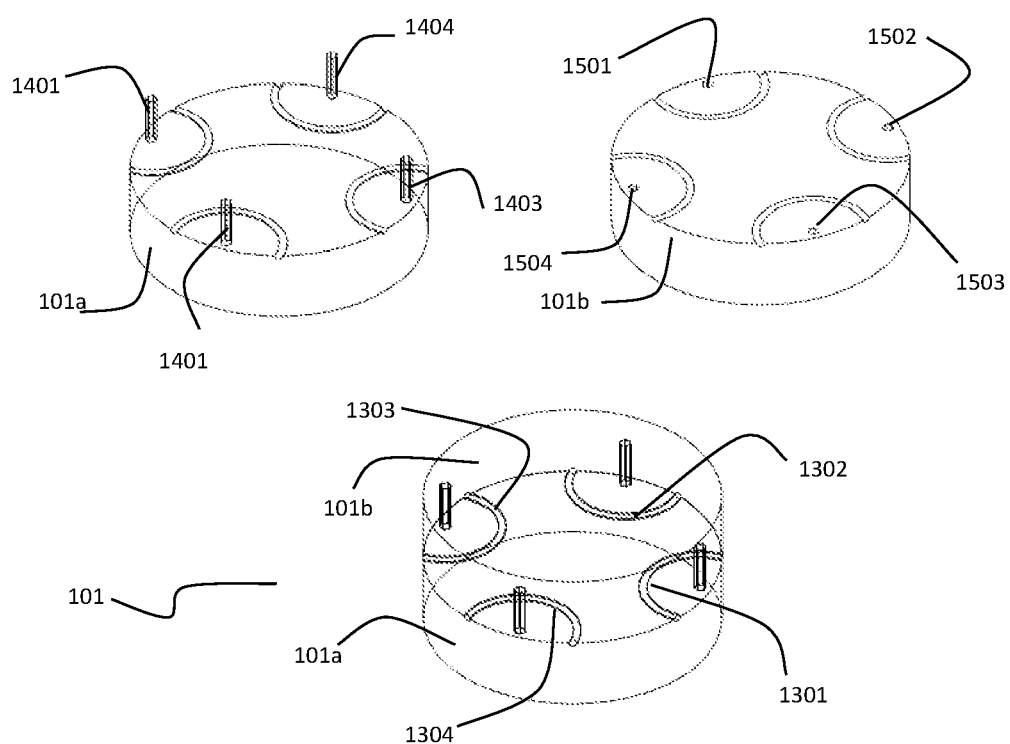
FIG. 42 represents an embodiment of a rotor equipped with the three-dimensional movable arcuates of the fluid diverting device of FIG. 1. The rotor comprises two separate bodies embossed into each other to give a single-bodied rotor with curved arcuates embedded inside the three-dimensional boundary of the rotor. In this illustration, the fluid diverting device hosts a single ring of ports.

Referring to FIG. 42, in some embodiments, rotor 101 is not a single three-dimensional body, but a plurality of bodies (for example, 101a and 101b) with appropriate embossed and debossed templates which, when adjoined tightly, constitute the single body of rotor 101.

Referring still to FIG. 42, in some embodiments, some other material of suitable malleability is sandwiched between part 101a and 101b to form seals around the arcuates (1301, 1302, 1303, and 1304).

Referring still to FIG. 42, in some embodiments, embossed (1401, 1402, 1403, and 1404) and debossed (1501, 1502, 1503, and 1504) templating objects are cylindrical in shape.

Referring still to FIG. 42, in some embodiments, any combination of the embossed and debossed templating objects aligns the arcuates.

Figure 43:
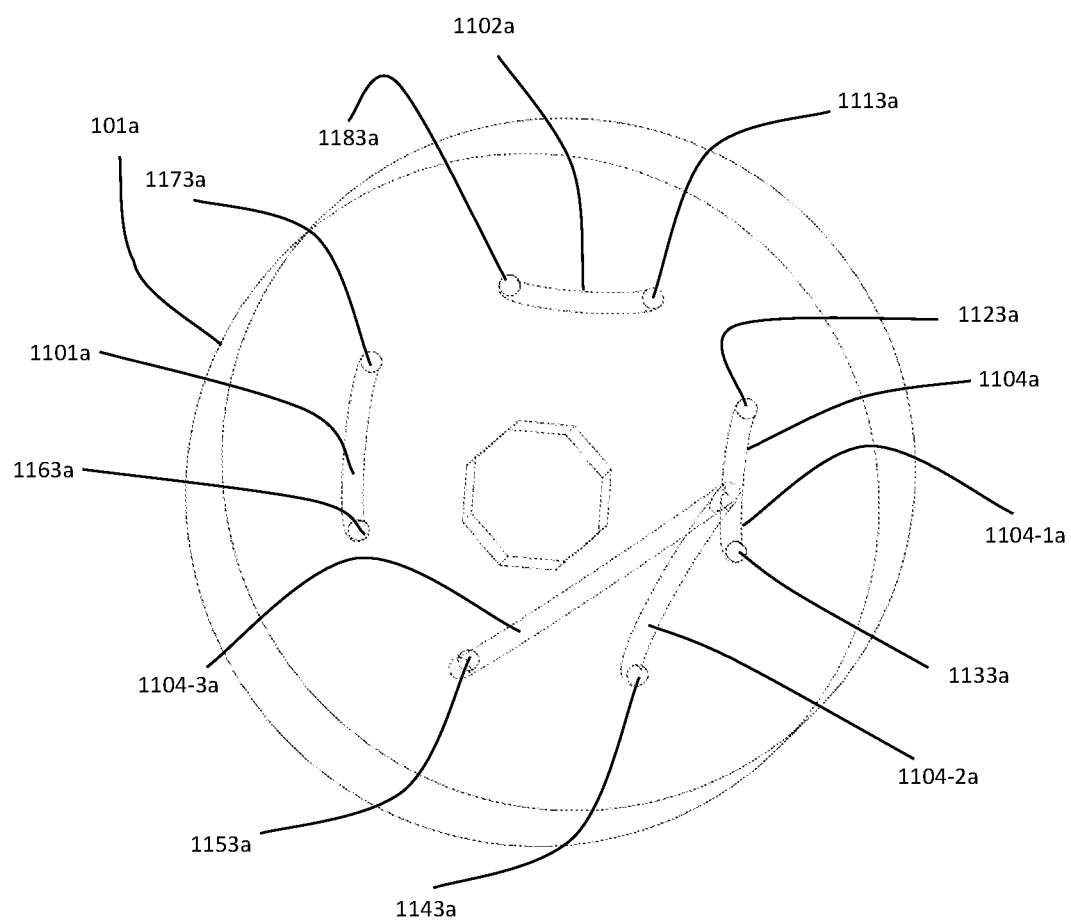
FIG. 43 represents an embodiment of a rotor equipped with the three-dimensional movable arcuates of the fluid diverting device of FIG. 1. The rotor comprises at least one arcuate that is split into three branched arcuates that establish fluid communication between the port that meets the first arcuate to three ports that meet each of the three branched arcuates.

Referring to FIG. 43, in some embodiment, configurable arcuates 1101a and 1102a make fluid communication between ports 1163a and 1173a, and between 1183a and 1113a, respectively. Configurable arcuate 1104a is branched in a manner so that a fluid stream from port 1123a is split among ports 1133a, 1143a, and 1153a via branched flow-path 1104-1a, 1104-2a, and 1104-3a, respectively. The branched embodiment of the arcuate 1104a is fixed. In other words, arcuate 1104a always establishes fluid communication among the nearest three adjacent ports (clockwise) in this embodiment. In some other embodiment, an arcuate establishes fluid communication among another set of ports through branching.

The invention claimed is:

1. A fluid diverting device for a fluid processing and analysis system, comprising:
 a stator comprising a first stationary flow-path; and
 a rotor comprising a first movable flow-path configured to be in fluid communication with the first stationary flow-path in at least one configuration of the fluid diverting device, wherein:
  the stator and the rotor are in contact at an interface,
  the first stationary flow-path extends from an opening in the stator at the interface,
  the first movable flow-path extends from a first opening in the rotor at the interface to a second opening in the rotor at the interface as a continuous arc,
  an entirety of the continuous arc has bend radius that is greater than zero
  the opening in the stator has a first diameter and at least one of the openings in the rotor has a second diameter, and
  the first diameter is larger than the second diameter or the second diameter is larger than the first diameter.

2. The fluid diverting device of claim 1 wherein the bend radius of the first movable flow-path is constant.

3. The fluid diverting device of claim 1, further comprising a second movable flow path that extends from a third opening in the rotor to a fourth opening in the rotor, wherein:
 the second movable flow path is curved so that an entirety of the second movable flow path has a bend radius that is greater than zero,
 the bend radius of the first movable flow path lies in a first plane,
 the bend radius of the second movable flow path lies in a second plane, and
 the first plane and the second plane are not parallel.

4. A fluid diverting module comprising:
 a) a fluid diverting device which receives at least a portion of a fluid from a sample source from load and inject configurations;
 b) a sample collection module which is in fluid communication with the fluid diverting device in both configurations;
 c) a filtration module which is equipped with a semipermeable flow-path which allows at least a portion of a liquid to pass through and prevents at least a portion of solids to permeate through;

d) at least one fluid holding device which is in fluid communication with the sample source and the filtration module when the fluid diverting device is in the load configuration;
e) a fluid moving device, which moves fluid from the sample source directly to the sample collection module in the inject configuration of the fluid diverting device and via the filtration module and the fluid holding device in the load configuration of the fluid diverting device;
f) a second fluid moving device, which is in fluid communication with the filtration module when the fluid diverting device is in the inject configuration;
g) a third fluid moving device which is in fluid communication both with the fluid holding device(s) and a sample delivery module when the fluid diverting device is in the inject configuration;
h) a stationary portion in the fluid diverting device, which hosts stationary flow-paths to connect the sample source, the sample collection module, the filtration module, the fluid holding device(s), and the fluid moving devices to the fluid diverting device; and
i) a movable portion in the fluid diverting device, which is equipped with a plurality of three-dimensional movable flow-paths capable of establishing fluid communications among the devices and modules of the stationary portion.

5. The fluid diverting module of claim 4, wherein the fluid diverting module is equipped with a fourth fluid moving device which moves fluid from a second sample source into an additional fluid holding device in the load configuration of the fluid diverting device.

6. The fluid diverting module of claim 4, wherein the third fluid moving device moves fluids from all fluid holding device(s) to the sample delivery module in the inject configuration of the fluid diverting device.

7. The fluid diverting device of claim 4 further comprising a second set of stationary and movable flow-paths for a second fluid stream which is not in fluid communication with the fluid streams of claim 4.

8. A method of using the fluid diverting module of claim 4 comprising:
a) configuring the fluid diverting device of the fluid diverting module to be in the load configuration using a load position of the fluid diverting device;
b) actuating the fluid moving device of 5e) to move at least a portion of a fluid from the sample source to at least one fluid holding device via the filtration module, which includes a semipermeable flow-path on stream, until at least a portion of the fluid enters the fluid holding device(s) from the load position;
c) actuating the fluid diverting device of the fluid diverting module from the current load position to at least one other load position wherein the movable flow-path, which was receiving fluid from the sample source in the first load position, is moved to a new position wherein the second fluid moving device establishes fluid communication with the movable flow-path and moves fluid through it, and the first fluid moving device of 5e) continues to move fluid from the sample source to the fluid holding device(s) via the filtration module;
d) configuring the fluid diverting device to be in an inject position;
e) actuating the fluid diverting device from the current inject position to at least one other inject position wherein the movable flow-path, which was receiving fluid from the sample source in the first inject position, is moved to a new inject position wherein the second fluid moving device establishes fluid communication with the movable flow-path and moves fluid through it;
f) actuating the second fluid moving device to move fluid through the filtration module to the sample delivery module from the inject position(s); and
g) actuating the third fluid moving device to move fluid from the fluid holding device(s) to the sample delivery module.

9. The method of claim 8, the fluid from the second fluid moving device is for cleaning of the movable flow-path(s) and the semipermeable flow-path of the filtration module.

10. The method of claim 8 further comprising configuring the fluid diverting device to adopt a configuration wherein at least one movable flow-path establishes fluid communication with at most one stationary flow-path.

11. The method of claim 8 further comprising flowing a second fluid from a fluid reservoir through a second flow-path, which is not in fluid communication with the flow-path of claim 8, in all configurations of the fluid diverting device of the fluid diverting module.

12. The method of claim 11, wherein the second fluid is a heat-transferring fluid that transfers heat to the fluid diverting device or vice versa.

13. A fluid diverting device for a fluid processing and analysis system, comprising:
a stator comprising a first stationary flow-path; and
a rotor comprising a first movable flow-path configured to be in fluid communication with the first stationary flow-path in at least one configuration of the fluid diverting device, wherein:
the stator and the rotor are in contact at an interface,
the first stationary flow-path extends from an opening in the stator at the interface,
the first movable flow-path extends from a first opening in the rotor at the interface to a second opening in the rotor at the interface as a continuous arc,
an entirety of the continuous arc has bend radius that is greater than zero,
the opening in the stator has a first diameter and at least one of the openings in the rotor has a second diameter,
the first diameter is larger than the second diameter or the second diameter is larger than the first diameter,
the fluid diverting device further comprises a second opening in the stator
the second opening in the stator has a third diameter
the second opening in the rotor has a fourth diameter, and
the third diameter is equal to the fourth diameter.

14. A fluid diverting device for a fluid processing and analysis system, comprising:
a stator comprising a first stationary flow path; and
a rotor comprising a first movable flow path configured to be in fluid communication with the first stationary flow path in at least one configuration of the fluid diverting device, wherein:
the stator and the rotor are in contact at an interface,
the first stationary flow path extends from an opening in the stator at the interface,
the rotor comprises a first groove and a second groove at the interface, the first and second grooves defining first and second recessed surfaces, respectively,
the first movable flow path extends from a first opening in the rotor to a second opening in the rotor,
the first opening is in the first recessed surface,
the second opening is in the second recessed surface, the first movable flow path is curved so that an entirety of the first movable flow path has a bend radius that is greater than zero, the opening in the stator has a first area, at least one of the first groove and the second groove has a second area parallel to and at the interface, and the second area is larger than the first area.

15. The fluid diverting device of claim 14, further comprising a second movable flow path that extends from a third opening in the rotor to a fourth opening in the rotor, wherein:

the second movable flow path is curved so that an entirety of the second movable flow path has a bend radius that is greater than zero, the bend radius of the first movable flow path lies in a first plane, the bend radius of the second movable flow path lies in a second plane, and the first plane and the second plane are not parallel.

16. The fluid diverting device of claim 14, further comprising a second movable flow path that extends from a third opening in the rotor to a fourth opening in the rotor, wherein:

the second movable flow path is curved so that an entirety of the second movable flow path has a bend radius that is greater than zero, the bend radius of the first movable flow path lies in a first plane, the bend radius of the second movable flow path lies in a second plane, and the first plane and the second plane are not parallel.

17. A fluid diverting device for a fluid processing and analysis system, comprising:

a stator comprising a first stationary flow path; and a rotor comprising a first movable flow path configured to be in fluid communication with the first stationary flow path in at least one configuration of the fluid diverting device, wherein:

the stator and the rotor are in contact at an interface, the stator comprises a groove at the interface, the groove defining a recessed surface, the first stationary flow path extends from an opening in the stator, the opening in the stator is in the recessed surface, the first movable flow path extends from a first opening in the rotor at the interface to a second opening in the rotor at the interface, the first movable flow path is curved so that an entirety of the first movable flow path has a bend radius that is greater than zero, at least one of the first opening in the rotor and the second opening in the rotor has a first area, the groove in the stator has a second area parallel to and at the interface, and the second area is larger than the first area.

\* \* \* \* \*